United States Patent
Clark

(10) Patent No.: US 10,751,148 B2
(45) Date of Patent: Aug. 25, 2020

(54) DENTAL WEDGE

(71) Applicant: David J. Clark, Lakewood, WA (US)

(72) Inventor: David J. Clark, Lakewood, WA (US)

( * ) Notice: Subject to any disclaimer, the term of this patent is extended or adjusted under 35 U.S.C. 154(b) by 0 days.

(21) Appl. No.: 14/823,584

(22) Filed: Aug. 11, 2015

(65) Prior Publication Data
US 2016/0030137 A1    Feb. 4, 2016

Related U.S. Application Data

(62) Division of application No. 13/007,338, filed on Jan. 14, 2011, now abandoned.

(60) Provisional application No. 61/295,070, filed on Jan. 14, 2010.

(51) Int. Cl.
*A61C 5/88*      (2017.01)

(52) U.S. Cl.
CPC ..................................... *A61C 5/88* (2017.02)

(58) Field of Classification Search
CPC .................................. A61C 5/127; A61C 5/88
USPC .................................................. 433/149, 148
See application file for complete search history.

(56) References Cited

U.S. PATENT DOCUMENTS

| | | | |
|---|---|---|---|
| 154,867 A | 9/1874 | Jarvis |
| 243,105 A | 6/1881 | Chase |
| 309,709 A | 12/1884 | Genese |
| 350,150 A | 10/1886 | Parr |
| 351,065 A | 10/1886 | Miller |
| 368,988 A | 8/1887 | Williams |
| 388,620 A | 8/1888 | Booth |
| 421,952 A | 2/1890 | Marshall |
| 425,067 A | 4/1890 | Farrar |
| 426,253 A | 4/1890 | Elliott |
| 426,733 A | 4/1890 | Morey |

(Continued)

FOREIGN PATENT DOCUMENTS

| AU | 7620391 | 12/1991 |
|---|---|---|
| AU | 5385998 | 8/1998 |

(Continued)

*Primary Examiner* — Sean M Michalski
*Assistant Examiner* — Mirayda A Aponte
(74) *Attorney, Agent, or Firm* — Quarles & Brady LLP

(57) ABSTRACT

The present invention relates to dental wedges that may be used for creating space between adjacent teeth. In one form, the dental wedge includes an elongated body extending from an outer end to an opposite inner end. The body has a longitudinal intermediate wall, a longitudinal first side wall connected to the intermediate wall, and a longitudinal second side wall connected to the intermediate wall. The first side wall and the second side wall each flare away from the intermediate wall such that a first distal end of the first side wall and a second distal end of the second side wall are spaced apart creating an inverted generally V-shaped transverse section for the body. The body has a top surface formed by the intermediate wall, the first side wall and the second side wall. The body also has a bottom surface formed by the intermediate wall, the first side wall and the second side wall. The dental wedge includes a grasping section connected to the outer end of the body. A hollow region is defined by the bottom surface of the wedge and a first reference line extending from the first distal end of the first side wall to the second distal end of the second side wall. At least a first portion of the body comprises a first material that transmits light.

19 Claims, 51 Drawing Sheets

(56) References Cited

U.S. PATENT DOCUMENTS

| | | | |
|---|---|---|---|
| 427,338 A | 5/1890 | Marshall | |
| 436,603 A | 9/1890 | Ivory et al. | |
| 440,509 A | 11/1890 | Sawhill | |
| 442,107 A | 12/1890 | Davison | |
| 450,825 A | 4/1891 | Ivory | |
| 465,555 A | 12/1891 | Cross et al. | |
| 486,112 A | 11/1892 | Kuns | |
| 487,726 A | 12/1892 | Ellard | |
| 511,619 A | 12/1893 | Ivory | |
| 532,722 A | 1/1895 | Dennis | |
| 600,257 A | 3/1898 | Capwell | |
| 669,092 A | 3/1901 | Martin | |
| 777,821 A | 12/1904 | Walker | |
| 789,591 A | 5/1905 | Davis | |
| 791,859 A | 6/1905 | Barnes | |
| 819,136 A | 5/1906 | Herman | |
| 847,778 A | 3/1907 | Ivory | |
| 1,031,533 A | 7/1912 | Davison | |
| 1,133,379 A | 3/1915 | Hollingsworth | |
| 1,306,696 A | 6/1919 | Ivory | |
| 1,456,294 A | 5/1923 | Arrowsmith | |
| 1,464,532 A | 8/1923 | Ivory | |
| 1,568,054 A | 1/1926 | Burlew | |
| 1,702,869 A | 2/1929 | Ivory | |
| 1,806,718 A | 5/1931 | Spanier | |
| 1,829,898 A | 11/1931 | Ivory | |
| 2,150,005 A | 3/1939 | McNinch | |
| 2,311,141 A | 2/1943 | True | |
| 2,629,930 A | 3/1953 | Lane | |
| 2,782,503 A | 2/1957 | Thompson | |
| 2,867,905 A | 1/1959 | Meacham | |
| 2,891,313 A | 6/1959 | Crowley | |
| 2,897,598 A | 8/1959 | Kesling | |
| 3,096,585 A | 7/1963 | Dockum | |
| 3,193,094 A | 7/1965 | Schulstad | |
| 3,197,870 A | 8/1965 | Tofflemire | |
| 3,368,553 A | 2/1968 | Kirby | |
| 3,418,716 A | 12/1968 | Woods | |
| 3,473,226 A | 10/1969 | Arlers et al. | |
| 3,510,948 A | 5/1970 | Walthall | |
| 3,636,631 A | 1/1972 | Tofflemire | |
| 3,713,222 A | 1/1973 | Tofflemire | |
| 3,815,243 A * | 6/1974 | Eames | A61C 5/88 433/149 |
| 3,837,082 A | 9/1974 | Pool | |
| 3,890,714 A | 6/1975 | Gores | |
| 4,259,070 A | 3/1981 | Soelberg et al. | |
| 4,337,041 A * | 6/1982 | Harsany | A61C 5/88 433/149 |
| 4,425,093 A | 1/1984 | Lorenz | |
| 4,449,933 A | 5/1984 | Forni | |
| 4,468,199 A | 8/1984 | Weikel | |
| 4,578,035 A | 3/1986 | Pruitt | |
| 4,631,030 A | 12/1986 | von Weissenfluh | |
| 4,696,646 A | 9/1987 | Maitland | |
| 4,715,816 A | 12/1987 | Mogelof | |
| 4,878,508 A | 11/1989 | Durbin | |
| 5,199,869 A | 4/1993 | McGann | |
| 5,238,438 A * | 8/1993 | Glickman | A63H 33/101 446/120 |
| 5,314,331 A | 5/1994 | Brosius et al. | |
| 5,318,446 A | 6/1994 | Slone | |
| 5,347,996 A | 9/1994 | Huan | |
| 5,421,725 A | 6/1995 | von Weissenfluh | |
| 5,527,181 A | 6/1996 | Rawls et al. | |
| 5,573,400 A | 11/1996 | Asher | |
| 5,743,738 A | 4/1998 | Baffelli et al. | |
| 5,788,499 A | 8/1998 | Hoffman | |
| 5,797,740 A | 8/1998 | Lundvik | |
| 5,890,900 A | 4/1999 | Fischer et al. | |
| 5,890,901 A | 4/1999 | Fischer et al. | |
| 5,993,210 A | 11/1999 | Godfrey | |
| 6,007,334 A | 12/1999 | Suhonen | |
| 6,074,210 A | 6/2000 | Garrison | |
| 6,079,978 A | 6/2000 | Kunkel | |
| 6,142,781 A * | 11/2000 | Fischer | A61C 5/88 433/149 |
| 6,220,858 B1 | 4/2001 | McKenna et al. | |
| 6,234,793 B1 | 5/2001 | Brattesani et al. | |
| 6,375,463 B1 | 4/2002 | McLean et al. | |
| 6,402,514 B1 | 6/2002 | Fischer et al. | |
| 6,435,874 B1 | 8/2002 | Hughes | |
| 6,468,080 B1 | 10/2002 | Fischer et al. | |
| 6,482,007 B2 | 11/2002 | Stanwich et al. | |
| 6,589,053 B2 | 7/2003 | Bills | |
| 6,619,956 B1 | 9/2003 | Weir | |
| 6,666,683 B2 | 12/2003 | Mungcal | |
| 6,761,562 B2 | 7/2004 | Von Weissenfluh | |
| 6,890,176 B2 | 5/2005 | Hahn | |
| 7,175,432 B2 | 2/2007 | McDonald | |
| 7,223,101 B2 | 5/2007 | Garrison et al. | |
| 7,381,055 B2 | 6/2008 | Jabri | |
| 7,425,130 B2 | 9/2008 | Schaffner et al. | |
| 7,976,308 B2 | 7/2011 | Hegedus | |
| 8,047,843 B2 | 11/2011 | Clark | |
| 8,070,490 B1 | 12/2011 | Roetzer et al. | |
| 8,177,553 B2 | 5/2012 | Stoll | |
| 8,206,151 B2 | 6/2012 | McDonald | |
| 8,226,412 B1 | 7/2012 | Slone | |
| 8,425,228 B2 | 4/2013 | McDonald | |
| 8,435,035 B1 | 5/2013 | Fatiny | |
| 8,834,160 B1 | 9/2014 | Gottlieb et al. | |
| 2002/0055084 A1 | 5/2002 | Fischer et al. | |
| 2002/0081552 A1 | 6/2002 | Stanwich et al. | |
| 2002/0192619 A1 | 12/2002 | Besek | |
| 2003/0113688 A1 | 6/2003 | Weissenfluh | |
| 2003/0129562 A1 | 7/2003 | Mungcal | |
| 2003/0186186 A1 | 10/2003 | Hahn | |
| 2004/0014006 A1 | 1/2004 | Garrison et al. | |
| 2004/0248064 A1 | 12/2004 | Rodriguez del Val | |
| 2004/0265779 A1 | 12/2004 | McDonald | |
| 2005/0118554 A1 | 6/2005 | Kilcher et al. | |
| 2005/0244787 A1 | 11/2005 | Summer | |
| 2005/0272005 A1 | 12/2005 | Schaffner et al. | |
| 2005/0282113 A1 | 12/2005 | Fraiman | |
| 2006/0100370 A1 | 5/2006 | Wellisz et al. | |
| 2006/0134579 A1 | 6/2006 | Kilcher et al. | |
| 2007/0087310 A1 | 4/2007 | Giusti | |
| 2007/0254263 A1 * | 11/2007 | McDonald | A61C 5/88 433/149 |
| 2008/0113315 A1 | 5/2008 | Beggs | |
| 2008/0241787 A1 | 10/2008 | Hegedus | |
| 2009/0029324 A1 * | 1/2009 | Clark | A61C 5/85 433/226 |
| 2009/0104581 A1 | 4/2009 | Simon | |
| 2009/0258325 A1 | 10/2009 | Zand | |
| 2011/0171596 A1 | 7/2011 | Clark | |
| 2011/0250563 A1 | 10/2011 | Horvath et al. | |
| 2012/0045734 A1 | 2/2012 | Thai | |
| 2012/0058447 A1 | 3/2012 | Liener et al. | |
| 2012/0164597 A1 | 6/2012 | McDonald | |
| 2013/0004914 A1 | 1/2013 | Marteney et al. | |
| 2013/0122462 A1 | 5/2013 | Fatiny | |
| 2013/0149665 A1 | 6/2013 | Dragan | |
| 2013/0196285 A1 | 8/2013 | Effenberger et al. | |
| 2014/0120497 A1 | 5/2014 | Marteney et al. | |
| 2014/0356811 A1 | 12/2014 | Erskine-Smith | |

FOREIGN PATENT DOCUMENTS

| | | |
|---|---|---|
| AU | 2003206471 A1 | 9/2003 |
| CA | 2057069 A1 | 11/1990 |
| CA | 2195272 A1 | 7/1998 |
| CA | 2223359 A1 | 6/1999 |
| CA | 2312887 A1 | 6/1999 |
| CA | 2427760 A1 | 5/2002 |
| CA | 2443628 A1 | 10/2002 |
| CA | 2750593 A1 | 7/2010 |
| CA | 2838654 A1 | 12/2012 |
| CA | 2875395 A1 | 1/2014 |
| DE | 3816501 A1 | 11/1989 |
| DE | 4444305 A1 | 6/1996 |
| DE | 19751032 A1 | 5/1999 |
| DE | 19936461 A1 | 2/2001 |

(56) References Cited

FOREIGN PATENT DOCUMENTS

| | | |
|---|---:|---:|
| DE | 10119733 A1 | 10/2002 |
| DE | 10129518 A1 | 1/2003 |
| DE | 102010040414 A1 | 1/2011 |
| FR | 9901172 A1 | 4/2000 |
| GB | 435004 | 9/1935 |
| GB | 454711 | 10/1936 |
| GB | 2471904 A | 1/2011 |
| WO | 9216158 A1 | 10/1999 |
| WO | 03071977 A1 | 9/2003 |
| WO | 2004004591 A1 | 1/2004 |

\* cited by examiner

DENTAL WEDGE

CROSS-REFERENCES TO RELATED APPLICATIONS

This application is a divisional application of U.S. patent application Ser. No. 13/007,338 filed Jan. 14, 2011, which claims priority from U.S. Patent Application No. 61/295,070 filed Jan. 14, 2010.

STATEMENT REGARDING FEDERALLY SPONSORED RESEARCH

Not Applicable.

BACKGROUND OF THE INVENTION

1. Field of the Invention

The present invention relates to dental wedges that may be used in the restoration of a decayed portion of a tooth.

2. Description of the Related Art

Dental cavities that have spread to the dentin or have undergone cavitation are typically treated by removing the decayed portion of the tooth and thereafter filling the missing tooth structure with a restorative material such as silver (amalgam), white (resin), porcelain, or gold. Cavities that are located adjacent to neighboring teeth are called interproximal cavities.

When treating interproximal cavities, the dentist first removes the decayed portion of the side of the tooth. In order to properly deposit the restorative material on the side of the tooth without undesired leaking of the restorative material beyond the side of the tooth, the dentist places a dental matrix around at least a portion of the tooth. The dental matrix may be a metallic or plastic strip, and when the matrix is placed around at least a portion of the tooth, the matrix acts as a form for the desired shape of the restored tooth.

One or more dental wedges may be used when treating interproximal cavities. Various dental wedges are shown in U.S. Pat. Nos. 7,223,101, 6,890,176, 6,761,562, 6,482,007, 6,435,874, 6,425,760, 6,234,792, 6,074,210, 5,743,738, 5,527,181, 5,104,317, 4,468,199, 4,337,041, 4,259,070 and D439,667, and U.S. Patent Application Publication Nos. 2007/0254263 and 2003/0113688. Historically, traditional dental wedges have been used to perform two functions, the first and most important is to press the dental matrix (sectional or 360 degree wrap) against the tooth so that matrix seals the tooth and keeps the filling material inside of the desired space. The second purpose is to separate the teeth so that when the matrix is removed after placing and hardening the filling material, the gap that is formed when the matrix is removed is mitigated as the teeth "spring" back together and close the gap that was present when the matrix was removed, typically about a two mil thickness.

Wedging devices are typically inserted from the facial or lingual direction to stabilize the matrix, press the matrix, improve the adaptation of the matrix against the tooth surface, to lightly or aggressively separate the tooth to compensate for the thickness of the matrix, and to seal the gingival margin to keep excess fluid from squirting past the interface thru a gap, to discourage body fluids from entering the cavity space thru the interface, and to apply pressure to the gingiva to control bleeding.

Because the new composite dental filling materials are more delicate than silver amalgam and cannot be packed as aggressively, it is common today to see that many posterior and anterior composite fillings have poor contacts that allow food impaction, etc. Additionally, the typical triangular shape of most wedges press against the matrix at the top corner, causing a flat spot in the filling that becomes a harbor for food impaction and bacterial accumulation. Concave surfaces in the interproximal area create an uncleansable area as the floss arcs across the flat spot or concavity. In addition, the papilla or gum triangle that is present in healthy situations can become blunted without the static tension of a full, rounded interproximal tooth shape (see, Clark, "Restoratively Driven Papilla Regeneration: Correcting the Dreaded Black Triangle", *Canadian Journal of Restorative Dentistry and Prosthondontics*, August 2008). The ensuing "Black Triangle" can further compromise the interproximal health with plaque accumulation and food impaction along with esthetic compromise, as the dark spaces between teeth are considered to be unaesthetic and prematurely ages the smile.

Some dental wedges, such as that shown in U.S. Pat. No. 7,223,101, along with others, have a slightly concave gingival surface that does not nearly address the problem of the wedge "riding up" into the embrasure space resulting in the above mentioned concavity in the resultant filling shape and or black triangle issue, as the arc is x angle or may be 5% hollow. The very slight gingival concavity, is so minimal that it does little to allow the wedge to seat itself deeply into the gum area and therefore does not address the aforementioned problems that occur in some clinical situations such as deeper decay or hypertrophic gums (oversized interdental gum triangle).

The wedge of U.S. Patent Application Publication No. 2007/0254263 makes advancement in this problem with the wedge that is in essence hollow in the gum area which allows the wedge to be placed deeper into the gum area because it has space for the "triangle" of gum tissue that pushes other solid wedges "up" or "superiorly" against the matrix to create the problems heretofore mentioned. There are however five problems with the wedge of US 2007/0254263. First, the wedge's design is so flimsy that it does not create enough pressure to separate the teeth and is therefore marketed with the separate V3 and V ring separators. The disadvantage with this system is that the wedge cannot be used alone; necessitating the additional time required to place the separating ring in addition to placing the wedge. This becomes a more serious problem for the anterior teeth where the separating rings are typically not used because the shape of the front teeth is different than the posterior teeth. For anterior teeth, the dentist becomes limited to using only the wedge which, in the case of the wedge of US 2007/0254263, does very little wedging.

The second problem with the wedge of US 2007/0254263 is that the top angle or corner is pointed which can put unfavorable pressure on the matrix and create a flat spot on the matrix and the resultant filling shape.

The third problem is that the wedge of US 2007/0254263 is opaque, not allowing light transmission. Most composite restorations today require photo polymerization to harden and cure the filling material. It is an advantage to have both matrix and wedge that allows the curing light to transmit light through their structures without impediment.

The fourth problem is that the wedge of US 2007/0254263 along with most other wedges must be inserted from one side of the teeth or the other side, and that to be thin enough to pass through the narrow space disallows a wide and broad pressure to adequately press the matrix against the tooth in the outer curved area.

Another problem is that of translucency to allow the photons of the curing light to reach the composite material to initiate and complete the photopolymerization. An opaque wedge blocks any lateral transmission of light. That is important whenever a non metal, translucent matrix is used. A second consideration of the wedge is luminescence. A dark material will provide less luminescence than a white material. It may be of an advantage for an opaque reflectant wedge or a two part translucent/opaque wedge to indeed block the light, once the wedge portion engaging the tooth has extended beyond (below or in the gingival direction) of the termination or gingival margin of the filling; where it will block the travel of the unused photons, then luminesce to essentially reflect the light back toward the filling instead of wasting the photon light energy that is radiating in the gingival direction.

Furthermore, traditional dental wedges have historically had a poorly designed grip area. In addition, the common practice of first partially inserting the wedge with a typical grip with the tips of the pliers, meeting resistance, releasing the wedge, rotating the pliers to push against the wedge with the larger flat handle of the pliers. Worsening the problem of the poorly designed end of the wedge is that all plastic wedges to date have a vestige on the outer end surface that disadvantages the dentist further encouraging the back or handle end of the pliers to slip off the outer end surface and traumatize the gums or tooth in addition to requiring the dentist to waste time and energy.

During insertion, the dental wedge can inadvertently rotate without visual cues to the dentist because once the wedge is inserted the handle is the only visible portion of the wedge.

In addition, all previous wedges from top view were either concave in the areas were the wedge engages the teeth or flat (wedge shaped). The cervical or gum area of the teeth, especially bicuspids and molars can have a slight or significant concavity that is described as either fluting or a furcation. It is extremely common in these instances for excess of filling material to squirt through the gap present as the dental matrix arcs across the concavity as the matrix wants to remain flat as it cuts the shortest distance across two prominences. This is referred to as an overhang or excess of filling material and often results in chronically inflamed gum tissues and potential gum disease and aggravation to patient as the floss shreds and snags.

Thus, there is a need for improved dental wedges that may be used in the restoration of a decayed portion of a tooth.

SUMMARY OF THE INVENTION

The foregoing needs are met by the invention which provides an improved dental wedge that may be used for creating space between adjacent teeth. In one form, the dental wedge includes an elongated body extending from an outer end to an opposite inner end. The body has a longitudinal intermediate wall, a longitudinal first side wall connected to the intermediate wall, and a longitudinal second side wall connected to the intermediate wall. The first side wall and the second side wall each flare away from the intermediate wall such that a first distal end of the first side wall and a second distal end of the second side wall are spaced apart creating an inverted generally V-shaped transverse section for the body. The first side wall and the second side wall can have a thickness that varies from the inner to outer sections of the wedge and that varies from the top to the bottom of the wedge. The body has a top surface formed by the intermediate wall, the first side wall and the second side wall. The body also has a bottom surface formed by the intermediate wall, the first side wall and the second side wall. The dental wedge includes a grasping section connected to the outer end of the body. A hollow region is defined by the bottom surface of the wedge and a first reference line extending from the first distal end of the first side wall to the second distal end of the second side wall.

In one example form of the wedge, transverse hollow regions defined by transverse planes moving from the grasping section to the inner end vary in area.

In another example form of the wedge, the grasping section includes a first vertical land connected to the outer end of the body, a second vertical land spaced apart from the first vertical land, and an intermediate section connected to the first vertical land and the second vertical land.

In yet another example form of the wedge, a first surface section of the first side wall forms a first part of the top surface, and the first part of the top surface is convex to conform to a fluting or furcation in one of the adjacent teeth. Concave regions are on one or both sides of the first part of the top surface.

In still another example form of the wedge, at least a first portion of the body comprises a first material that transmits light.

The wedge according to the invention is between 10% and 90% hollow, has a variable thickness, thick in spine to allow greater strength for insertion and greater wedging pressure than the wedge of US 2007/0254263.

Among other things, a dental wedge according to the invention has the following features and/or advantages.

A dental wedge according to the invention has the advantage of being a luminescent wedge, using translucent and/or opaque reflectant wedge.

A dental wedge according to the invention has special lumination features created with surface texture, chemical light activated reflector luminescent chemicals or other modifications to allow greater luminescence than that occurring naturally in traditional resin or wooden wedges.

A dental wedge according to the invention is a two part translucent/opaque wedge to both allow lateral transmission of light energy and then to eventually reflect the light, once the wedge portion engaging the tooth has extended beyond (below or in the gingival direction) of the termination or gingival margin of the filling; where it will block the travel of the unused photons, then luminesce (glow) to essentially reflect the light back toward the filling instead of wasting the photon light energy that is radiating in the gingival direction.

A dental wedge according to the invention is a one piece wedge with a hollow tube area on the spine of wedge leading to an opening in the handle allowing light to pass into the tube and then be reflected into the spine area.

A dental wedge according to the invention can be a wedge with a light pipe that starts in an outer grasping section and extends to the body of the wedge.

A dental wedge according to the invention is a one piece wedge with a hollow tube near the spine that allows enough thinness to make the otherwise mostly opaque material constituting the wedge to become mostly translucent allowing the light if so directed from a more 45 degree angulation essentially from on top of the handle of the wedge to direct the light directly to the spine in lieu of through the handle to the spine, and conversely from the wedge tip area or preferably simultaneously.

A dental wedge according to the invention is between 0-90% or 10-90% or 25-90% or 30-70% hollow, has a variable thickness, thick in spine to allow greater strength for insertion and greater wedging pressure than wedges such as that shown in US 2007/0254263.

A dental wedge according to the invention is designed as "low profile" to allow a natural cervical embrasure shape to the matrix and consequent filling. "Low profile" means that the side to side dimension is greater than or equal to the top to bottom dimension.

A dental wedge according to the invention is designed as "low profile" to allow an exaggerated cervical embrasure shape to the matrix and consequent filling.

A dental wedge according to the invention has slip material in the wedge section that contacts the adjacent teeth and gingiva.

A dental wedge according to the invention has a handle area has matching splines to engage the serrations of the pliers.

A dental wedge according to the invention has a collapsing tip to avoid trauma or skewering of papilla.

A dental wedge according to the invention has a safe blunted tip to protect operator's finger from puncture wound and cross infection and to protect the patient's gingiva from being skewered.

A dental wedge according to the invention can be maximized with pre-wedging with a conventional wedge first.

A dental wedge according to the invention has an orientation component on the handle of the wedge so the dentist is aware of any rotation that could have occurred that would otherwise go unnoticed which would create the wrong pressure on the matrix subsequently resulting in a poor shape and or poor contact area of the filling being created.

A dental wedge according to the invention has a vestige that is moved away from typical position to allow a superior end surface for pressing against the end or handle end of the wedge with the opposite end of the dental pliers and placed on bottom or other area of wedge, i.e. anywhere but the end surface of the "handle cap" Alternatively, a dental wedge according to the invention has a recess or inverted dome, the depth of which is equal to or greater than the anticipated height of vestige.

A dental wedge according to the invention has a land area that is pushing surface that is an advantage when pushing the wedge with the tips or traditional use of pliers.

A dental wedge according to the invention has a land area that is triangular or equivalent to not interfere with a separator ring shape such that it fits a separator ring. The back of the handle is too far away to be a problem however the land area is close enough to the filling/tooth area so a complimentary triangular shape is advantageous.

A dental wedge according to the invention has a convexity (in top view) in mid wedge varying from slight to abrupt and in varying lengths, some at base only, some at top only and some with continuous convexity from top to bottom (of this middle [in top view] area) that is designed to approximate the mid tooth concavity present in some teeth. It is therefore an advantage to have a wedge that has a mid tooth convexity to properly adapt and seal the matrix where the tooth often has a corresponding concavity.

These and other features, aspects, and advantages of the present invention will become better understood upon consideration of the following detailed description, drawings and appended claims.

BRIEF DESCRIPTION OF THE DRAWINGS

FIG. 39a shows a cross-sectional view of the dental wedge of FIG. 39 taken along line 39a-39a of FIG. 39.

FIG. 39b shows a cross-sectional view of the dental wedge of FIG. 39 taken along line 39b-39b of FIG. 39.

FIG. 39c shows a cross-sectional view of the dental wedge of FIG. 39 taken along line 39c-39c of FIG. 39.

FIG. 39d shows a cross-sectional view of the dental wedge of FIG. 39 taken along line 39d-39d of FIG. 39.

FIG. 39e shows a cross-sectional view of the dental wedge of FIG. 39 taken along line 39e-39e of FIG. 39.

FIG. 39f shows a cross-sectional view of the dental wedge of FIG. 39 taken along line 39f-39f of FIG. 39.

FIG. 41a shows a cross-sectional view of the dental wedge of FIG. 41 taken along line 41a-41a of FIG. 41.

FIG. 41b shows a cross-sectional view of the dental wedge of FIG. 41 taken along line 41b-41b of FIG. 41.

FIG. 41c shows a cross-sectional view of the dental wedge of FIG. 41 taken along line 41c-41c of FIG. 41.

FIG. 41d shows a cross-sectional view of the dental wedge of FIG. 41 taken along line 41d-41d of FIG. 41.

FIG. 41e shows a cross-sectional view of the dental wedge of FIG. 41 taken along line 41e-41e of FIG. 41.

Like reference numerals will be used to refer to like parts from Figure to Figure in the following description of the drawings.

DETAILED DESCRIPTION OF THE INVENTION

Figure 1:
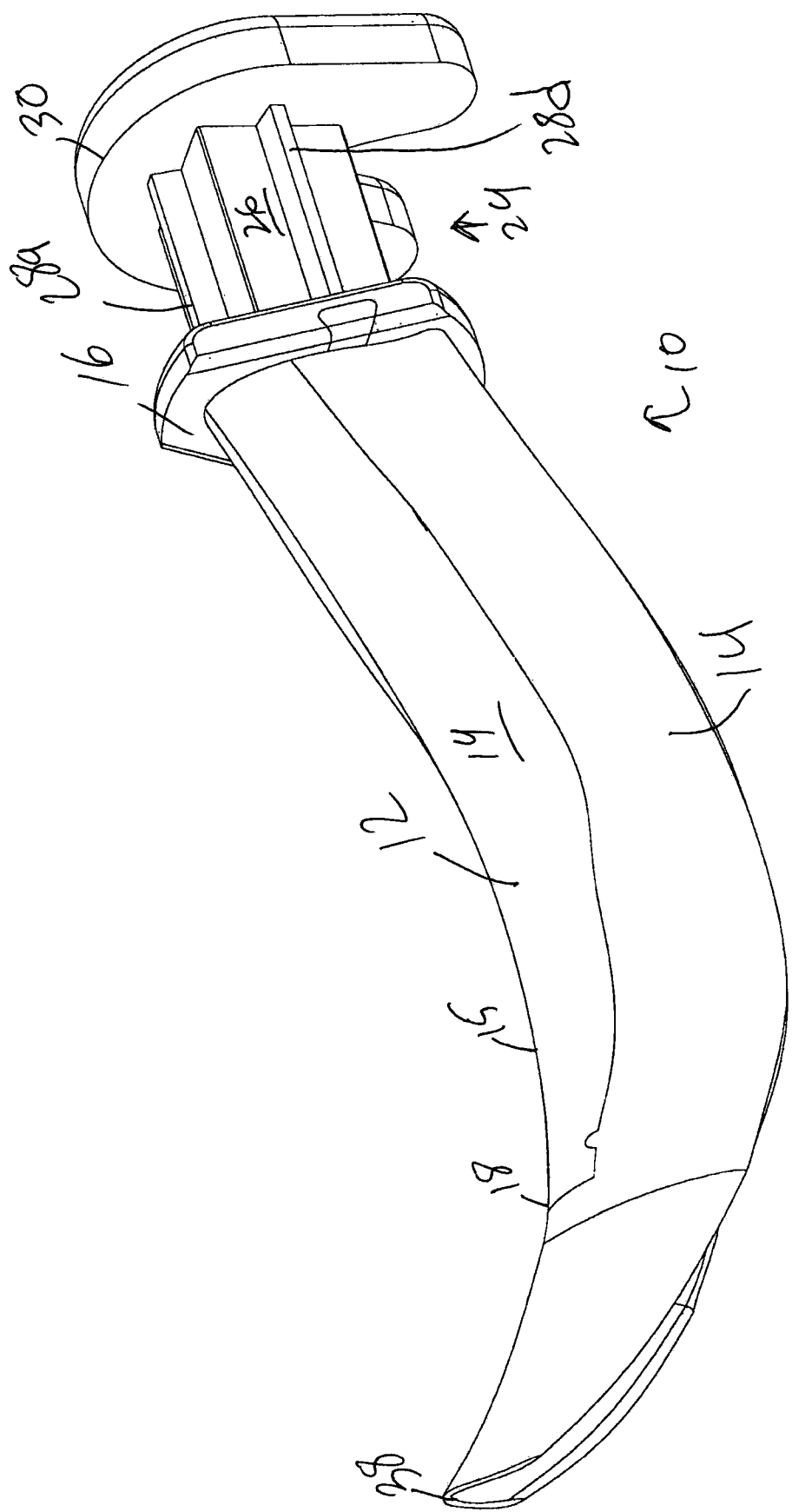
FIG. 1 is a top, front, left perspective view of a first embodiment of a dental wedge according to the invention.
Figure 2:
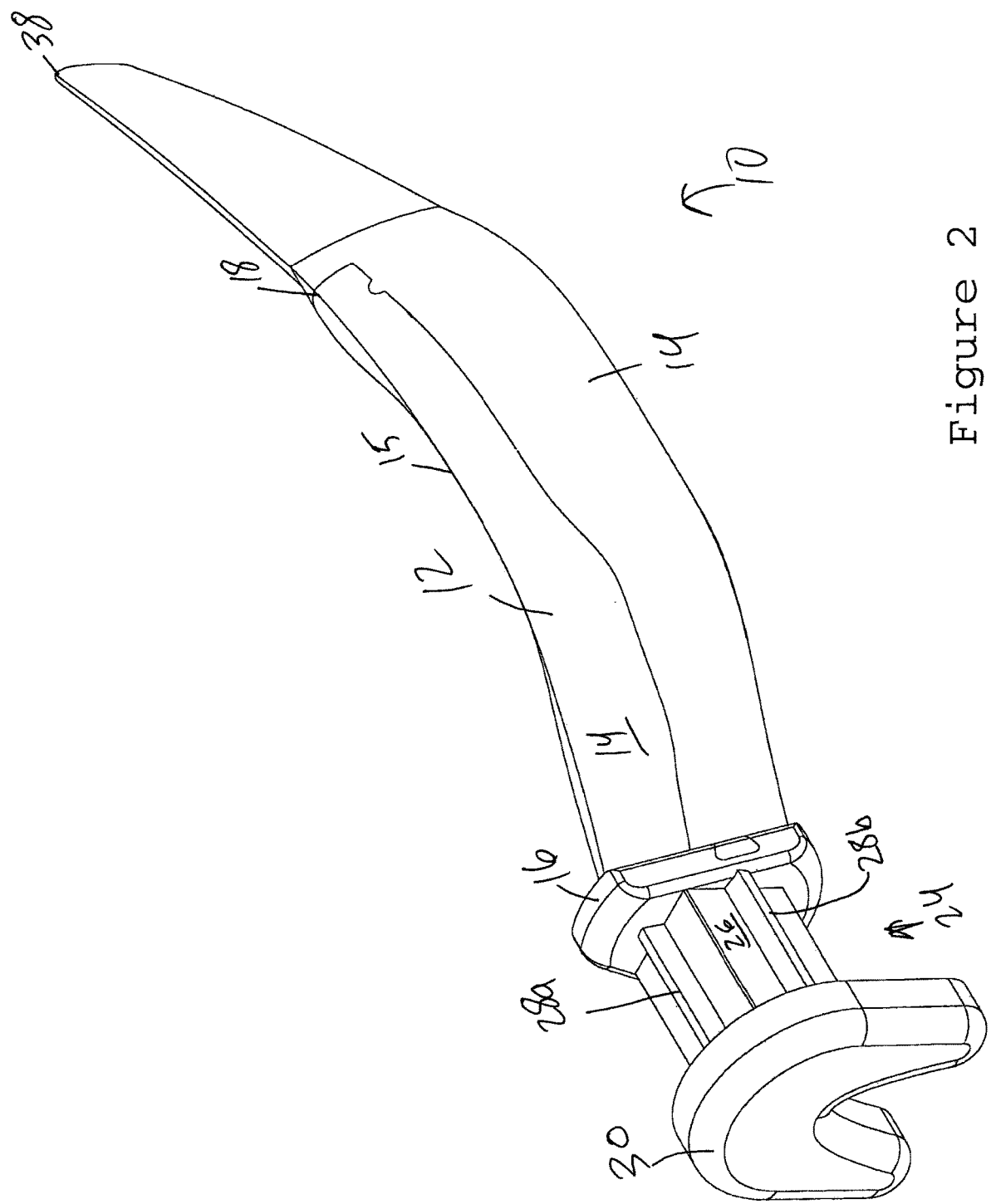
FIG. 2 is a top, rear, perspective view of the dental wedge of FIG. 1.
Figure 3:
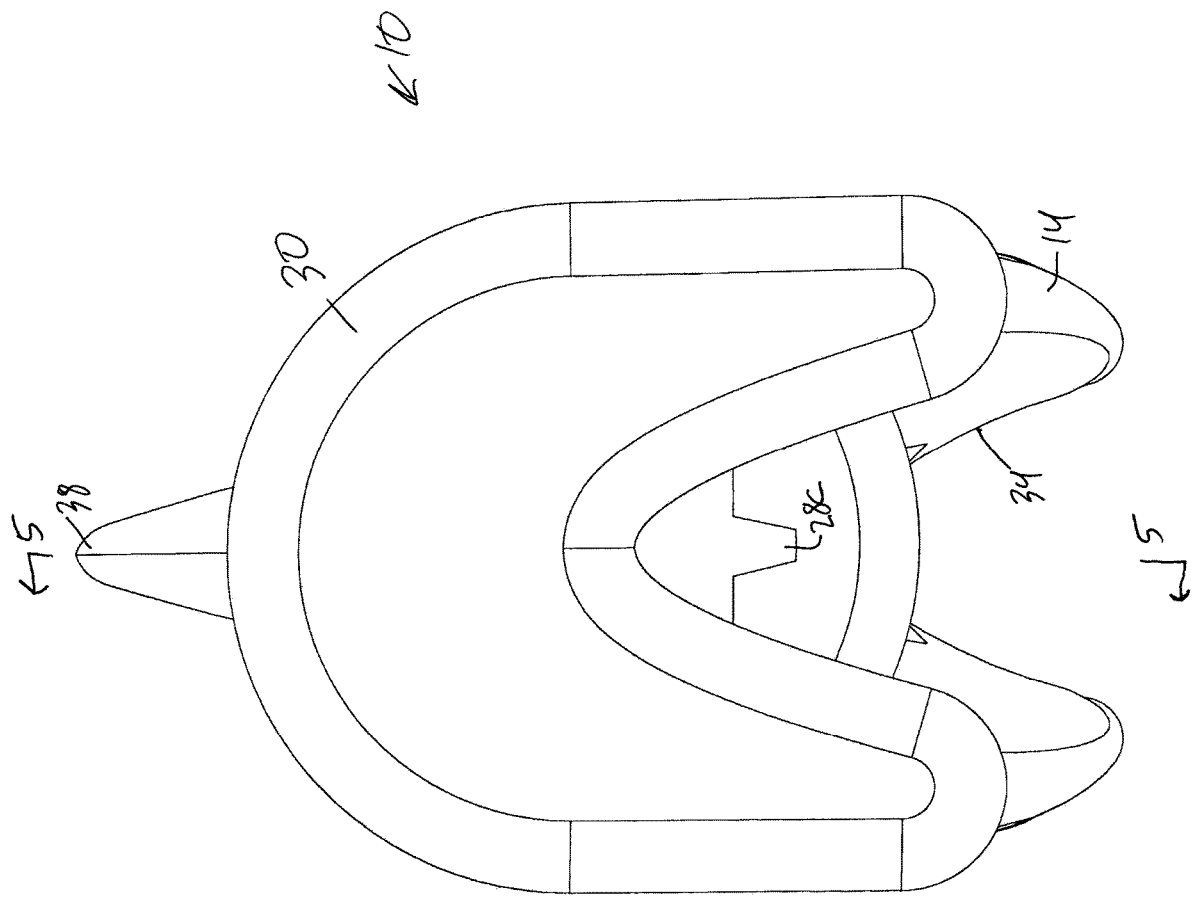
FIG. 3 is a right side view of the dental wedge of FIG. 1.
Figure 4:
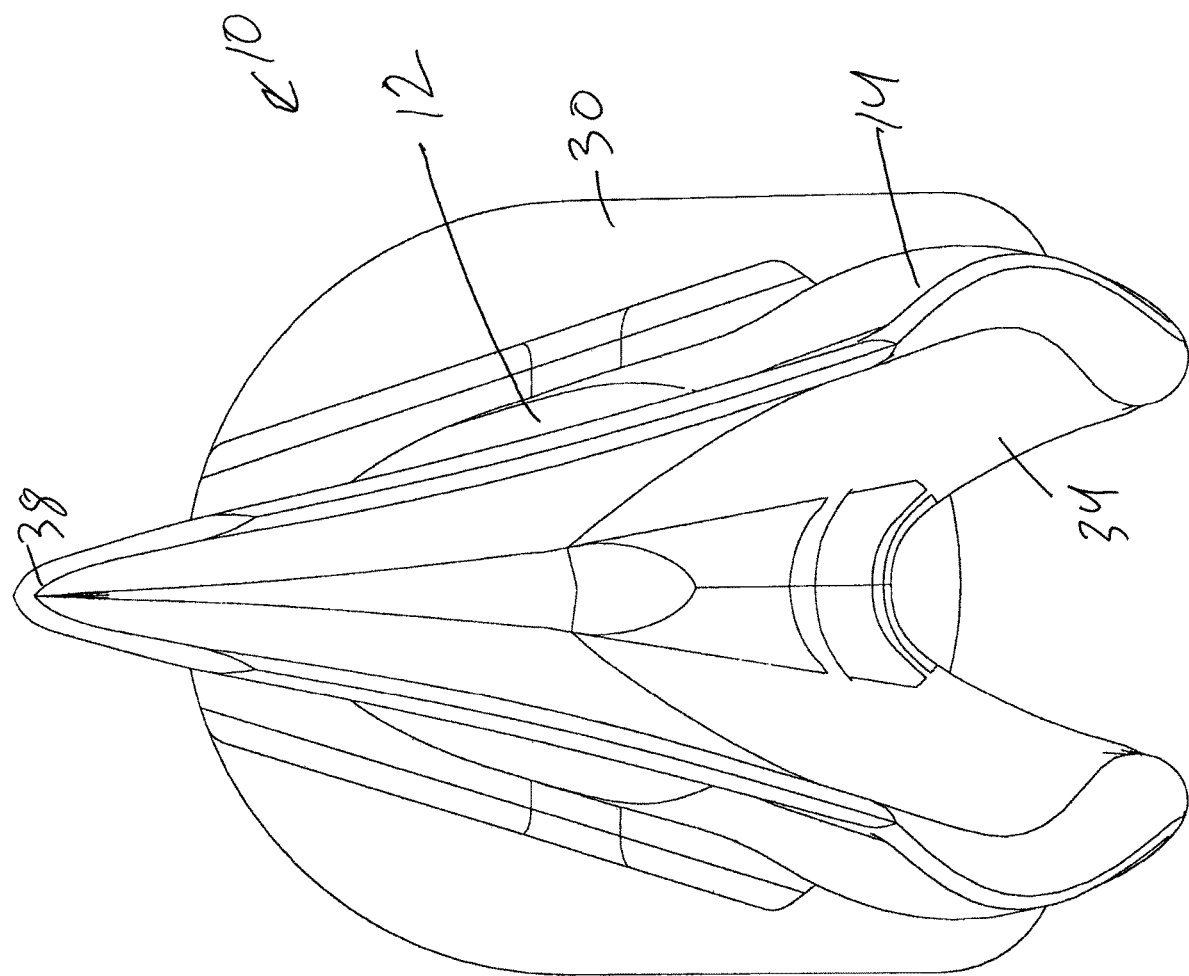
FIG. 4 is a left side view of the dental wedge of FIG. 1.
Figure 5:
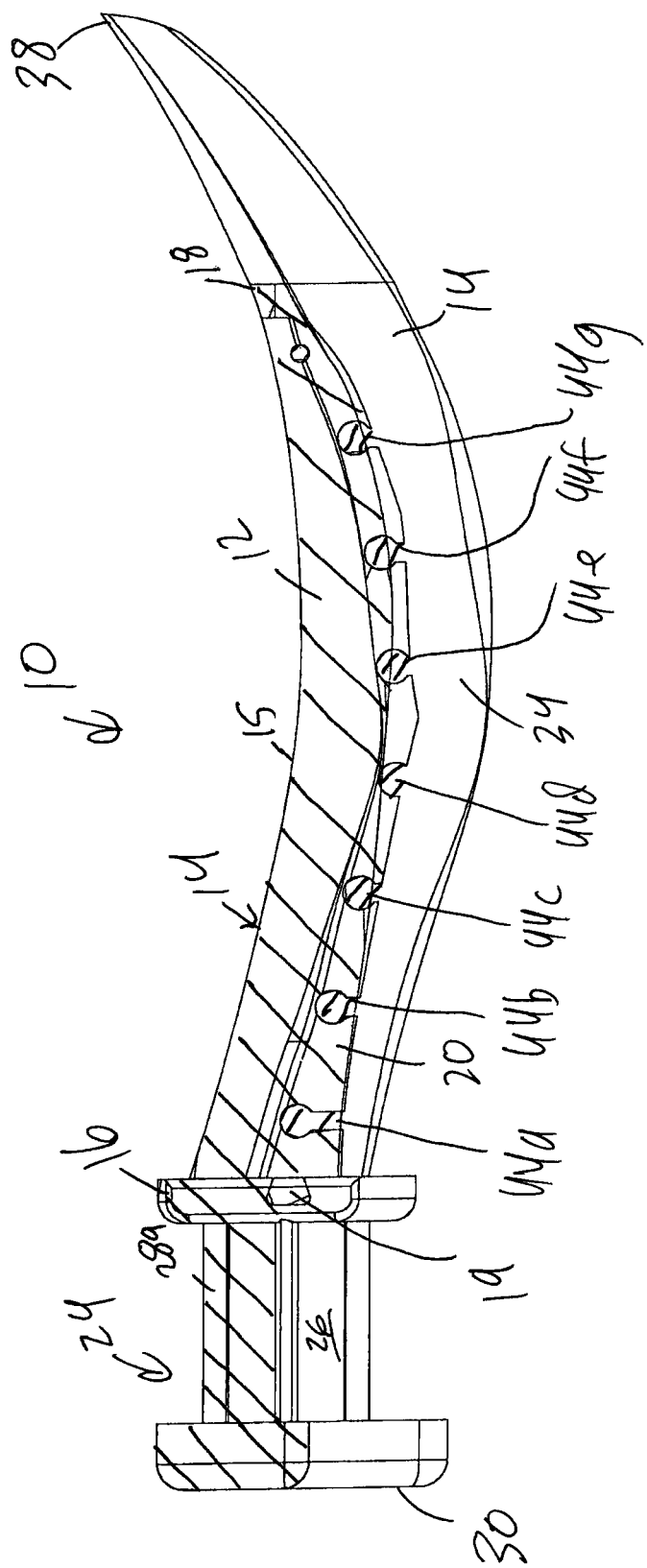
FIG. 5 is a cross-sectional view of the dental wedge of FIG. 1 taken along line 5-5 of FIG. 3.
Figure 6:
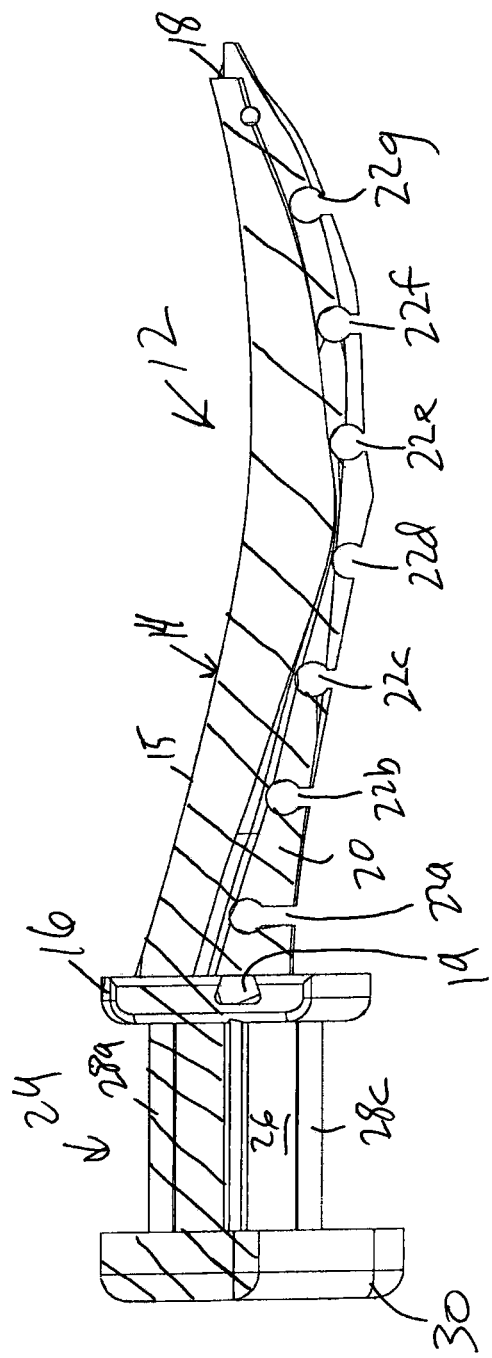
FIG. 6 is a cross-sectional view of the dental wedge of FIG. 1 taken along line 5-5 of FIG. 3 in which only the top section of the dental wedge is shown.
Figure 7:
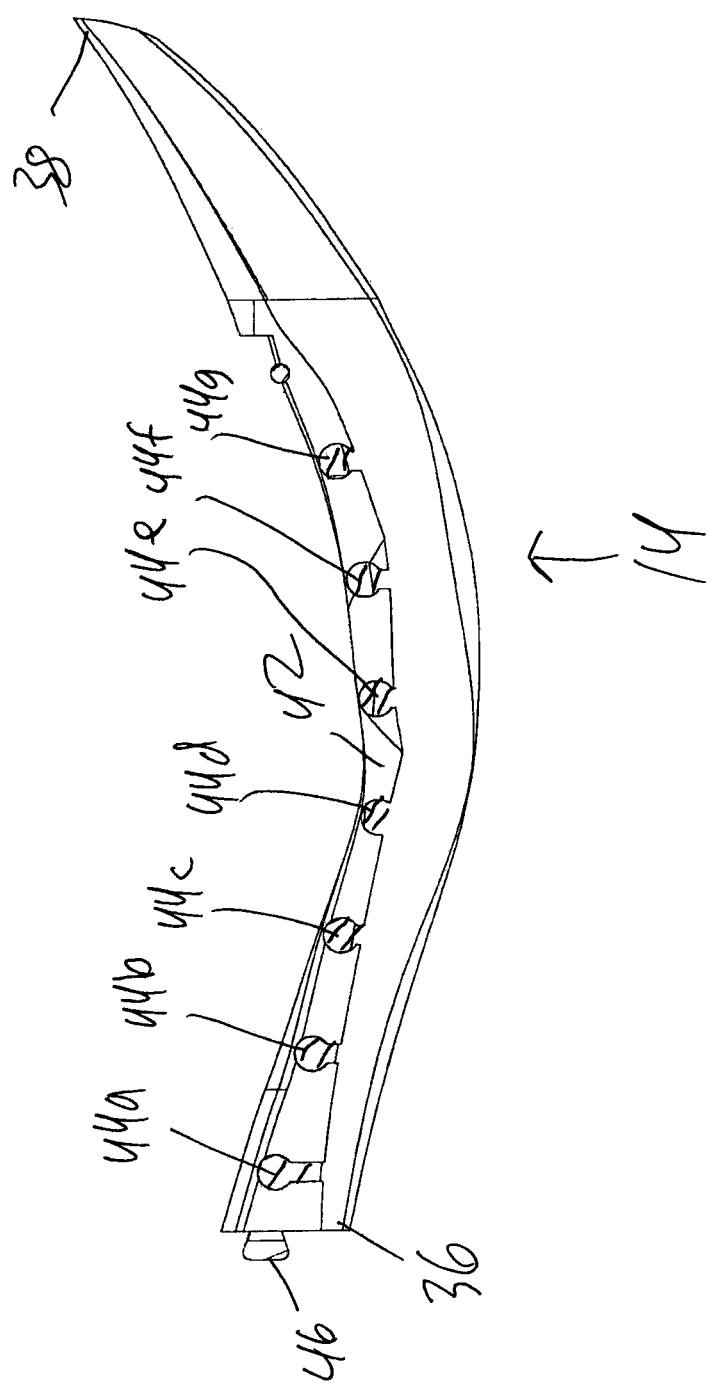
FIG. 7 is a cross-sectional view of the dental wedge of FIG. 1 taken along line 5-5 of FIG. 3 in which only the bottom section of the dental wedge is shown.
Figure 8:
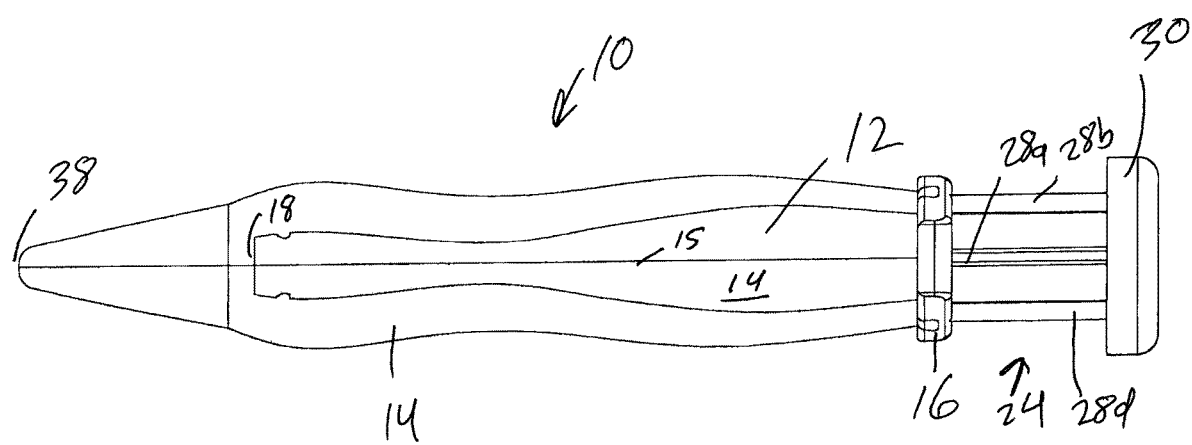
FIG. 8 is a top plan view of the dental wedge of FIG. 1.
Figure 9:
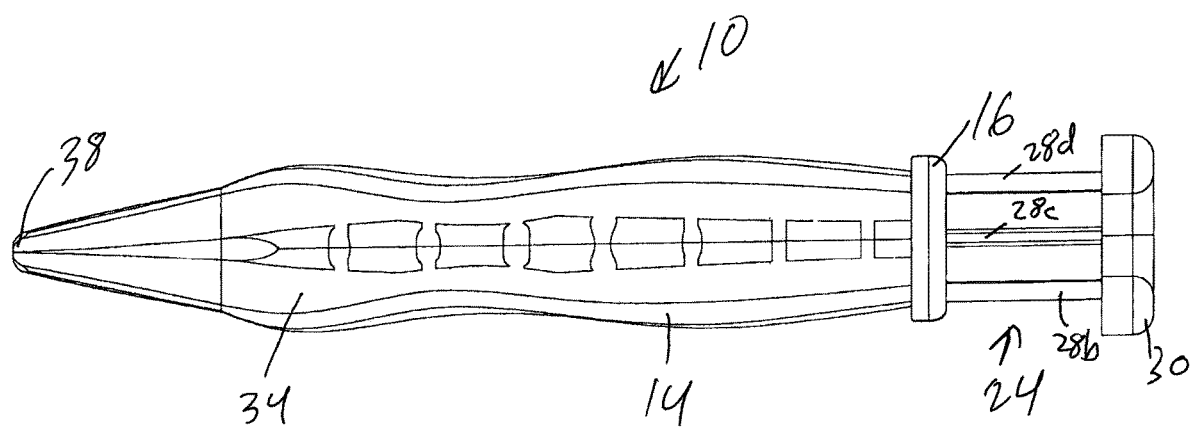
FIG. 9 is a bottom plan view of the dental wedge of FIG. 1.
Figure 10:
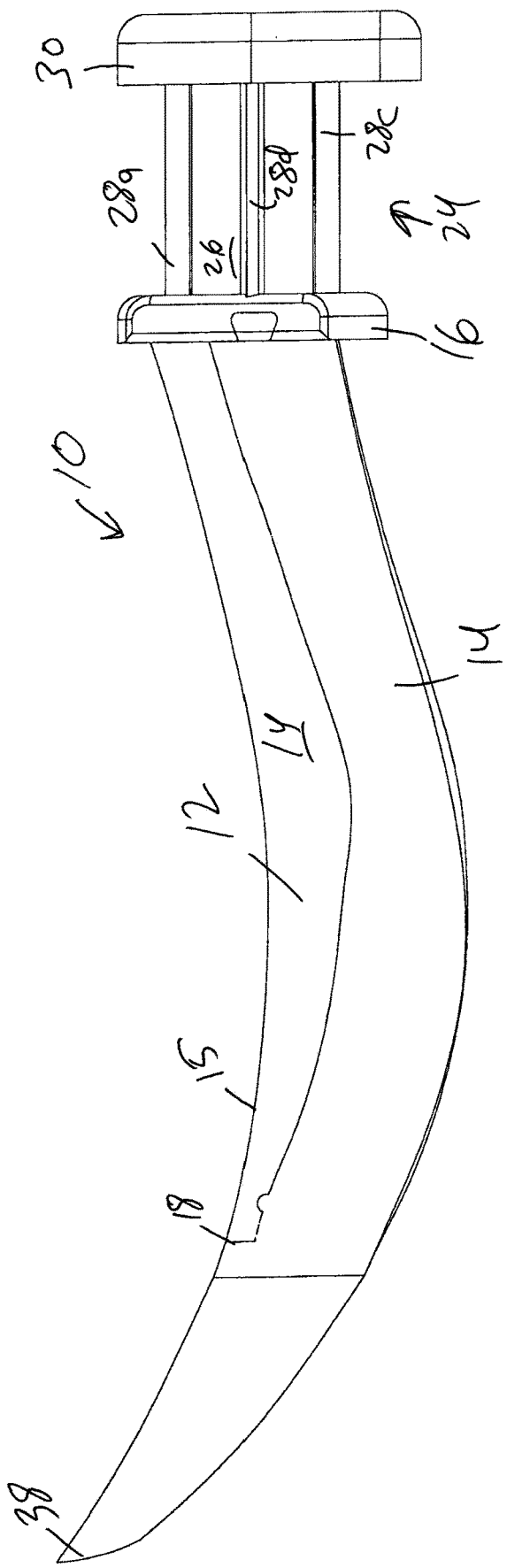
FIG. 10 is a front view of the dental wedge of FIG. 1.
Figure 11:
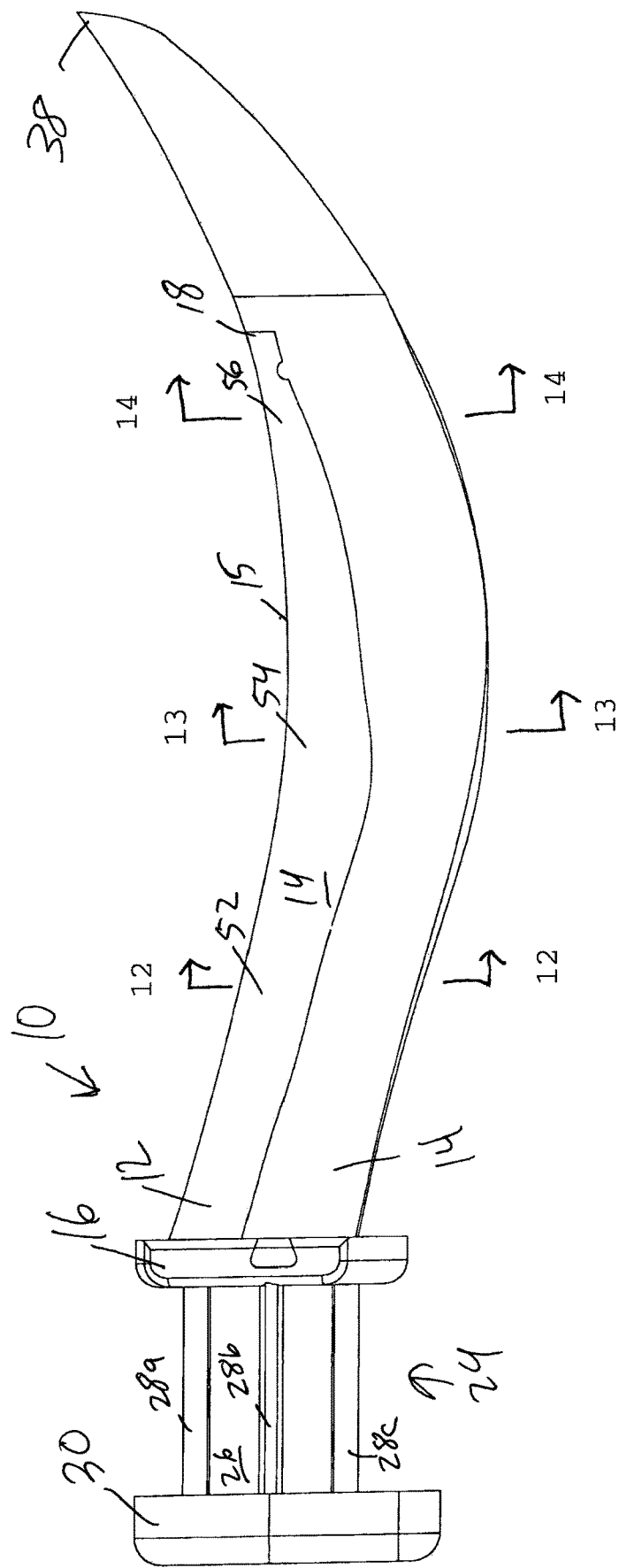
FIG. 11 is a rear view of the dental wedge of FIG. 1.

Turning to FIGS. 1 to 16, a first embodiment of a dental wedge 10 according to the invention is shown. The dental wedge 10 includes a top section 12 and a bottom section 14. The use of relative terms such as "top", "bottom", "front", "rear", "inner", "left", "outer", "right", and the like when describing the dental wedges of the invention is not intended to limit the orientation in which the dental wedge 10 may be used. Such relative terms merely serve to more conveniently describe the invention. Unless the context clearly indicates the contrary, "top" will refer to the direction toward the closed end of the dental wedge, "bottom" will refer to the direction toward the open end of the dental wedge, "inner" or "left" will refer to the direction toward the end of the dental wedge that is first inserted between adjacent teeth, "outer" or "right" will refer to the direction toward the end of the dental wedge that is grasped when the dental wedge is inserted between adjacent teeth, "front" will refer to the direction toward a viewer when the outer end of the dental wedge is on the right when viewed, and "rear" will refer to the direction away from a viewer when the outer end of the dental wedge is on the right when viewed.

The top section 12 has a generally arcuate top surface 14 and a rounded top edge 15 that extends from a first vertical land area 16 to an end 18 that is inward from the end of the wedge 10. The top section 12 has a central longitudinal body 20 that extends from the land area 16 to the end 18. The land area 16 includes a transverse inner channel 19. The body 20 is located below the top surface 14. The body 20 has arcuate tubular recesses 22a to 22g (see FIG. 6) that extend from the front to the rear of the body 20. Extending away from the vertical land area 16 opposite the end 18 is a first grasping section 24 having a base 26 and splines 28a, 28b, 28c and 28d that extend outwardly from the base 26. The splines 28a, 28b, 28c and 28d are generally plate-like but can also have other shapes. The splines 28a, 28b, 28c and 28d can provide visual cues of inadvertent wedge rotation to the dentist. Extending away from the first grasping section 24 opposite the first vertical land area 16 is a generally U-shaped second vertical land 30.

The bottom section 14 of the dental wedge 10 has a generally arcuate bottom surface 34 that extends from an outer end 36 to paper thin collapsing inner end distal tip 38. A body 42 of the bottom section 14 is located above the bottom surface 34. The body 42 has upwardly extending projections 44a to 44g, and a side projection 46.

Looking at FIGS. 11, 12, 13 and 14, the configuration of cross-sections of the wedge 10 is shown at an outer location 52, an intermediate location 54, and an inner location 56. Comparing FIGS. 12, 13 and 14, at outer location 52 of FIG. 12, the bottom surface 34 at position 58a has a lesser curvature (i.e, reciprocal of the radius) than the curvature at position 58b of the intermediate location 54. Also, the bottom surface 34 has a lesser curvature at position 58b at intermediate location 54 of FIG. 13 than the curvature at position 58c of the inner location 56 of FIG. 14.

Figure 12:
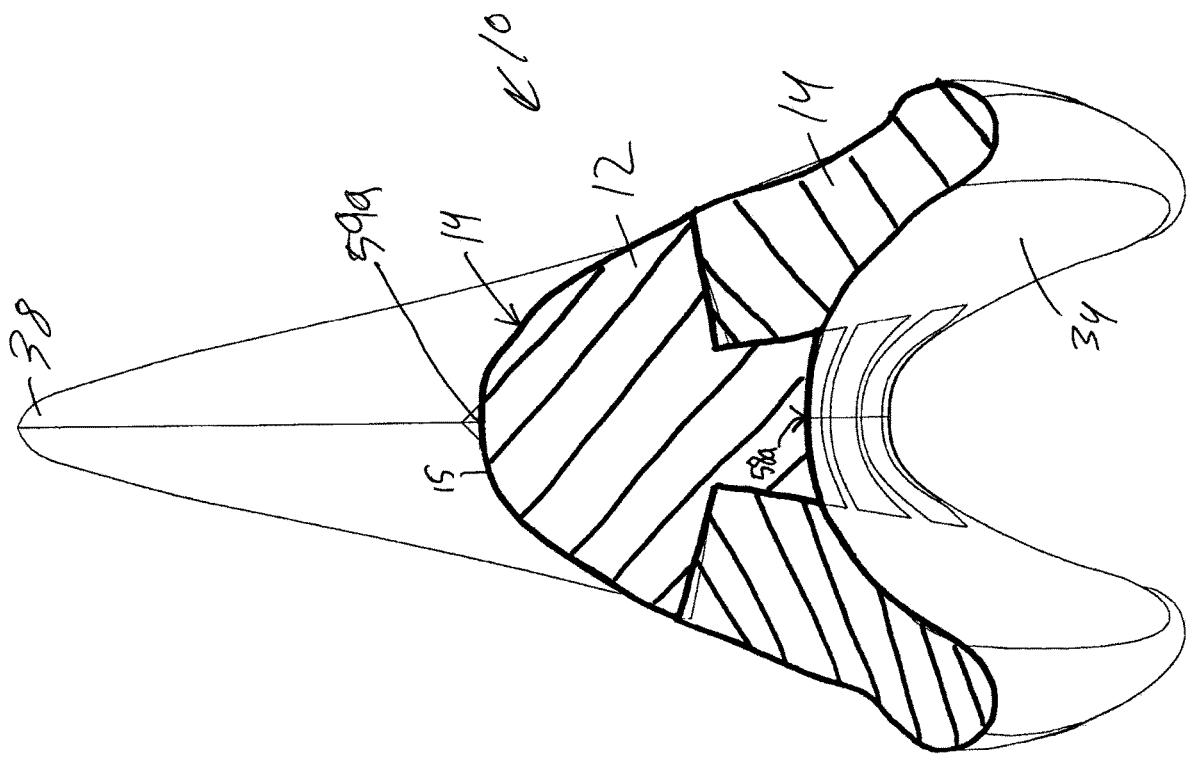
FIG. 12 is a cross-sectional view of the dental wedge of FIG. 1 taken along line 12-12 of FIG. 11.
Figure 13:
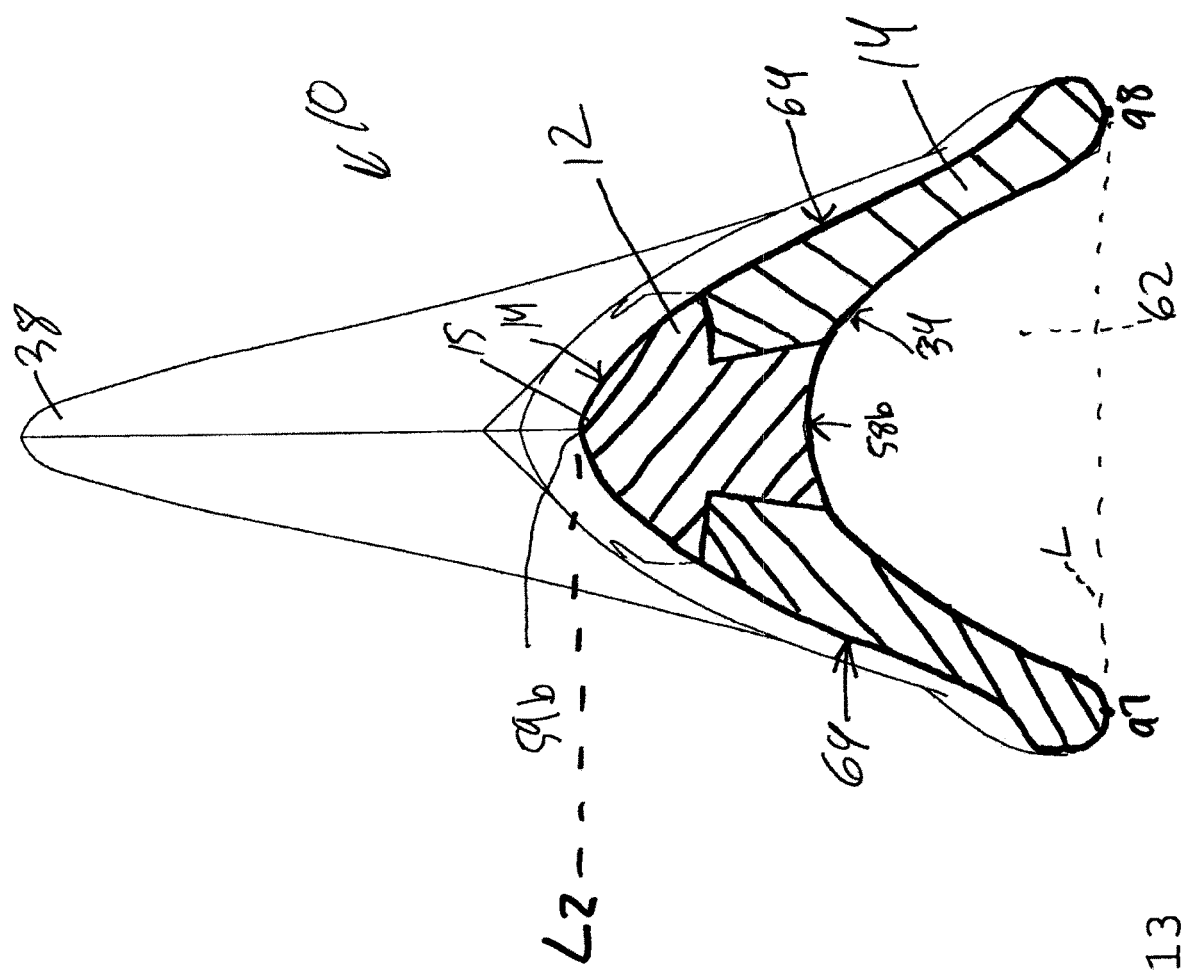
FIG. 13 is a cross-sectional view of the dental wedge of FIG. 1 taken along line 13-13 of FIG. 11.
Figure 14:
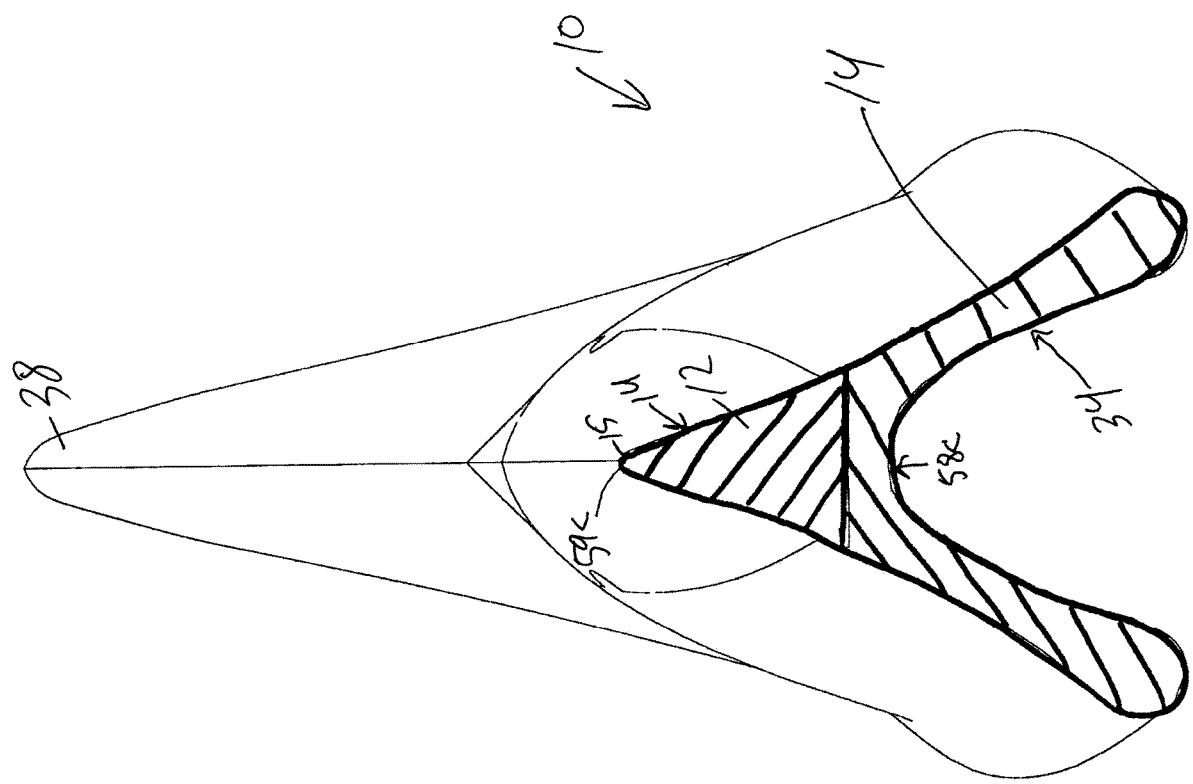
FIG. 14 is a cross-sectional view of the dental wedge of FIG. 1 taken along line 14-14 of FIG. 11.

Still looking at FIGS. 12, 13 and 14, at position 59a at outer location 52 of FIG. 12, the rounded top surface 14 has a lesser curvature (i.e, reciprocal of the radius) than the curvature at position 59b of the intermediate location 54. Also, the rounded top surface 14 has a lesser curvature at position 59b at intermediate location 54 of FIG. 13 than the curvature at position 59c of the inner location 56 of FIG. 14.

Referring to FIG. 13, it can be seen that the distance from the bottom of the wedge 10 to position 58b at intermediate location 54 is greater than half of the distance from the bottom of the wedge 10 to position 59b at intermediate location 54. A hollow region 62 is formed between the bottom surface 34 and a reference line L. The transverse hollow region 62 can have a cross-sectional area that is 0-90% or 10-90% or 25-90% or 30-70% or 40%-60% of the cross-sectional area of a region bounded by the outer surface 64 of the wedge and first reference line L. Also, as the transverse hollow region 62 is created in transverse planes moving from the land area 16 to the tip 38, the ratio of the transverse hollow region to the cross-sectional area of a region bounded by the outer surface 64 of the wedge and first reference line L can vary. For example, at an intermediate section of the wedge 10, the hollow region may be a greater percentage of the wedge, and at a inner and outer end sections of the wedge 10, the hollow region may be a lesser percentage of the wedge.

Still referring to FIG. 13, the vertical thickness of the top section 12 is greater than the lateral thickness of the bottom section 14. Also, the vertical thickness of the top section 12 and the lateral thickness of the bottom section 14 vary.

Still referring to FIG. 13, a wedge width is defined by a first distance of the first reference line L extending from the first distal end 97 of the first side wall to the second distal end 98 of the second side wall, and a wedge height is defined by a second distance between the first reference line L and a second reference line L2 that is tangent to the top edge 15 of the top surface of the wedge body. Preferably, the wedge width is greater than the wedge height. The wedge width may be greater than the wedge height by at least 25% or by at least 50% or by at least 75% or by at least 100%. Also, as the wedge width and the wedge height are calculated at selected points of the top edge 15, and the second distal end 98 in common transverse planes moving from the land area 16 to the tip 38, the ratio of the wedge width and the wedge height can vary. For example, at an intermediate section of the wedge 10, the wedge width may be less than the wedge height, and at a inner and outer end sections of the wedge 10, the wedge width may be greater than the wedge height.

Likewise, referring to FIG. 14, the distance from the bottom of the wedge 10 to position 58c at inner location 56 is greater than half of the distance from the bottom of the wedge 10 to position 59c at inner location 56.

The dental wedge 10 can be formed using an overmolding process. A suitable polymeric material is first molded into the bottom section 14. Then another polymeric material is overmolded on the bottom section 14 to form the top section 12 of the dental wedge 10. Alternatively, the top section 12 can be molded first and then the bottom section 14 can be overmolded. During the overmolding process, the fluid polymeric materials allow for the creation of mechanical interlocks between the top section 12 and the bottom section 14. Specifically, the projections 44a to 44g of the bottom section 14 are formed within the arcuate tubular recesses 22a to 22g of the top section 12 to form mechanical interlocks, and the side projection 46 of the bottom section 14 is formed within the transverse inner channel 19 of the top section 12 to form a mechanical interlock.

Various polymeric materials can be used to mold the top section 12 of the dental wedge 10. Preferably, the top section 12 is molded from a polymeric material that forms a transparent or translucent top section 12. Non-limiting examples of polymeric materials for forming a transparent or translucent top section 12 include polycarbonates (e.g., Lexan® polycarbonate), acrylics (e.g., polymethylmethacrylate), polyesters (e.g., polyethylene terephthalate) and polyolefins (e.g., polyethylene, polypropylene).

Various polymeric materials can be used to mold the bottom section 14 of the dental wedge 10. Preferably, the bottom section 14 is molded from a polymeric material that forms an opaque bottom section 14. "Opaque" means the polymeric material transmits very little light, and therefore reflects (as in specular reflection from the interface between the top section 12 and the bottom section 14), scatters (as in diffuse reflection from the interface between the top section 12 and the bottom section 14), or absorbs most of it. Non-limiting examples of polymeric materials for forming an opaque bottom section 14 include polyoxymethylene (e.g., Delrin® with a modulus of about 3,000 MPa).

The opacity of these polymeric materials for the bottom section 14 can be controlled by including within the polymeric material various amounts of a pigment having a high refractive index such as titanium dioxide. The pigment can be dispersed throughout the bottom section 14, or can be located at surface areas or at the interface of the top section 12 and the bottom section 14. Also, it can be beneficial to lower the coefficient of friction of the surface of the opaque bottom section 14. Slip additives can be added to the polymeric material to modify the surface properties of the opaque bottom section 14 and thus lower the coefficient of friction of the surface of the opaque bottom section 14. Fatty acid amides are suitable slip additives.

Figure 15:
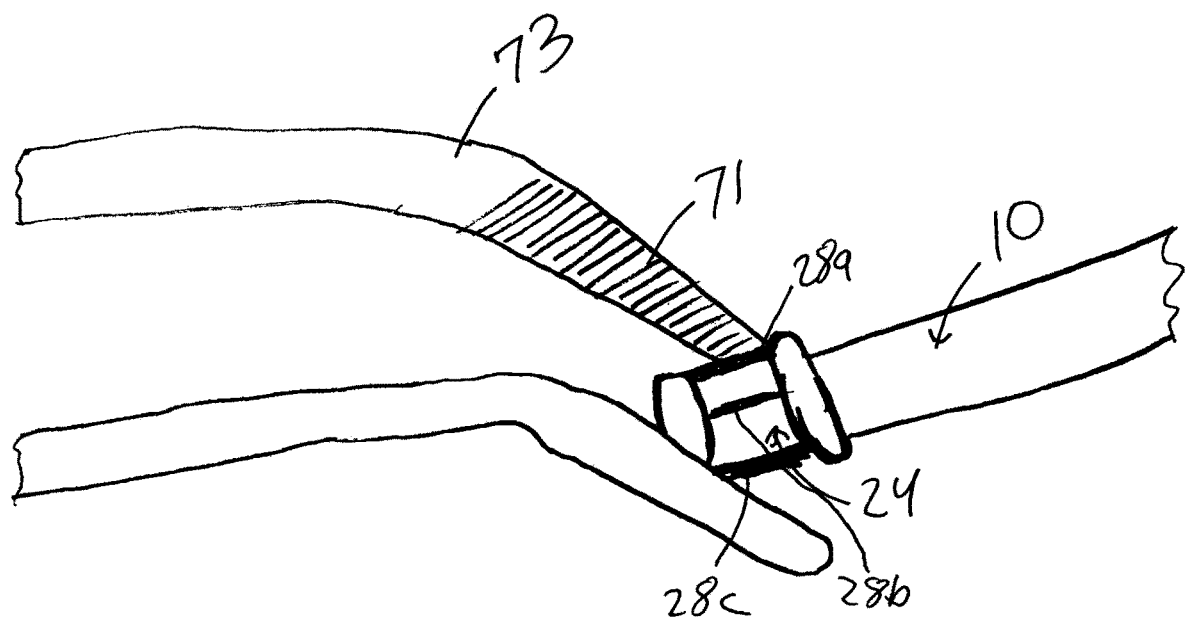
FIG. 15 is a perspective view of a cotton pliers about to grasp the outer end of the dental wedge of FIG. 1.
Figure 16:
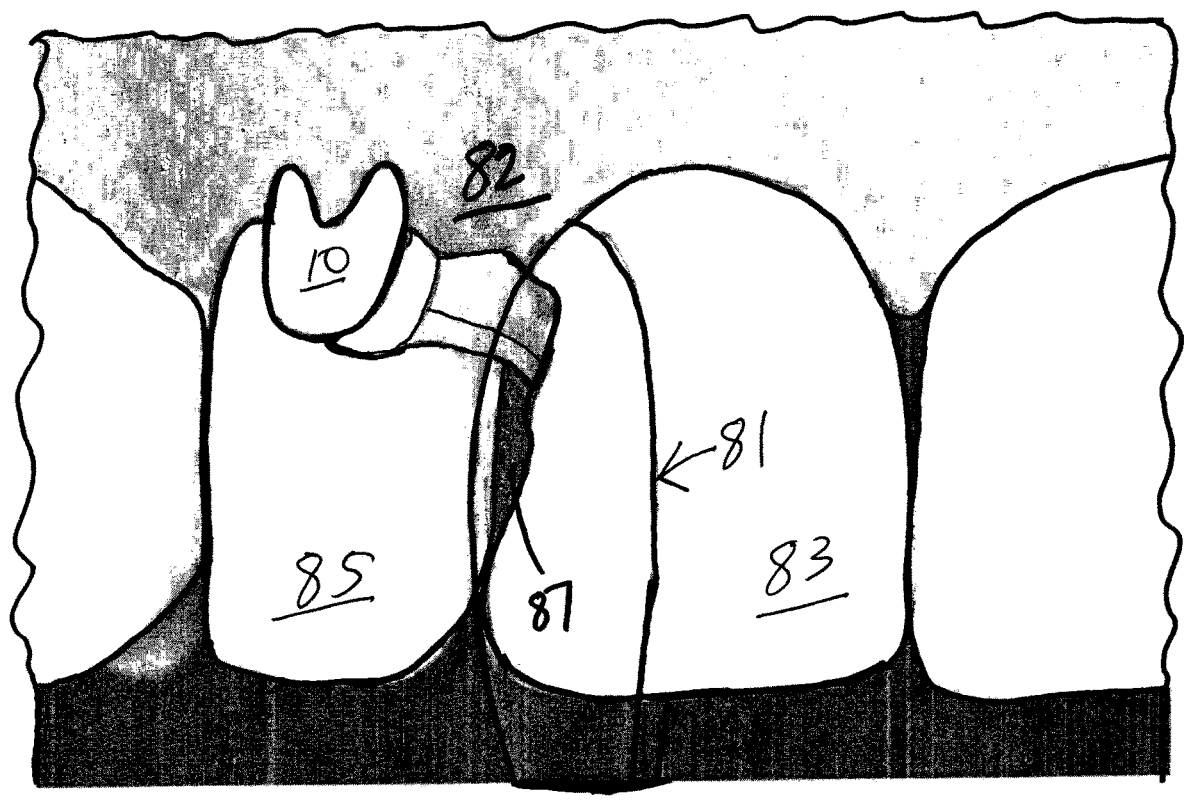
FIG. 16 shows the dental wedge of FIG. 1 pressing a sectional dental matrix against a tooth being restored.
Figure 17:
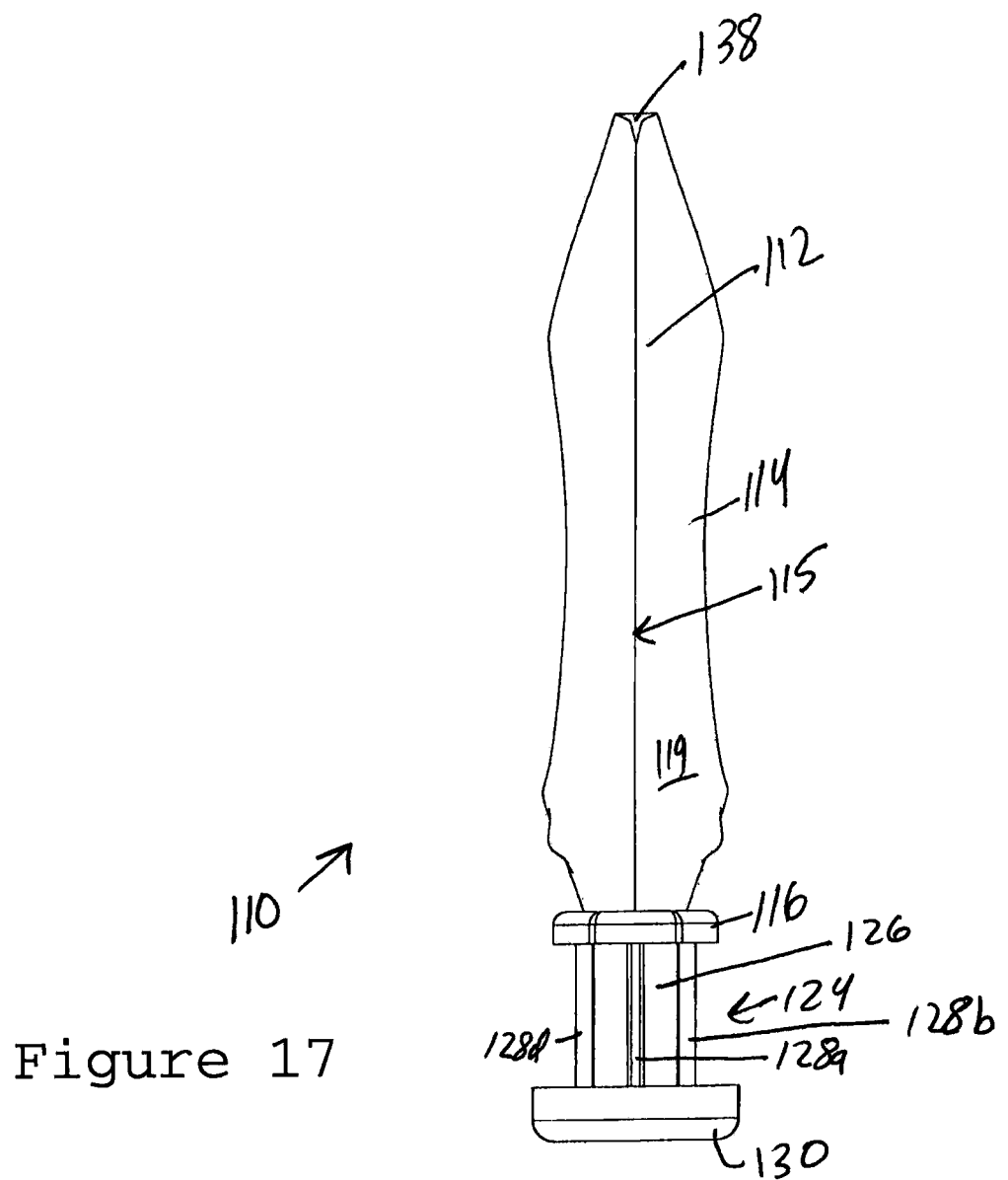
FIG. 17 is a top view of a second embodiment of a dental wedge according to the invention.
Figure 18:
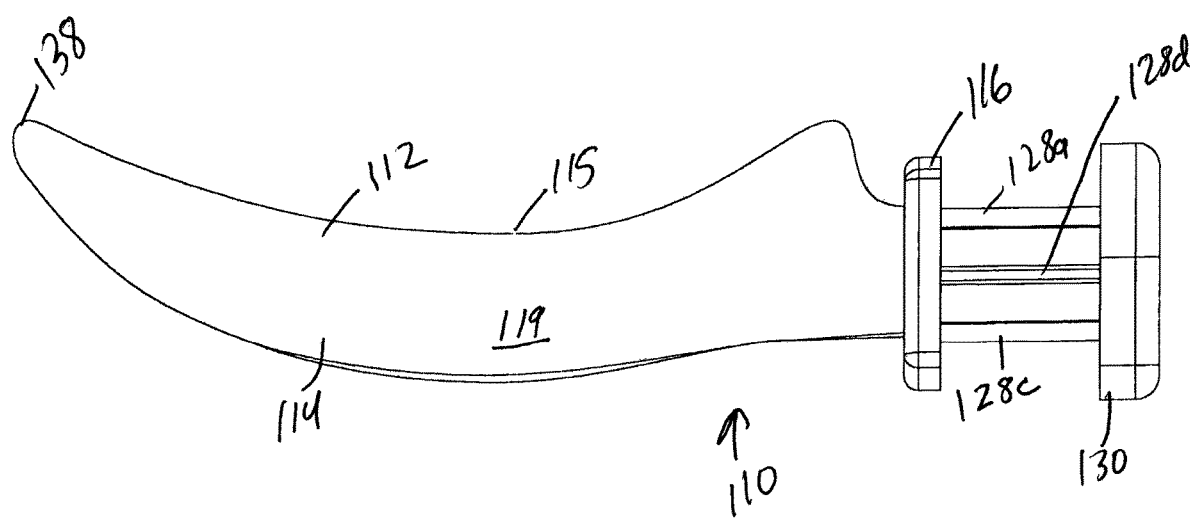
FIG. 18 is a left view of the dental wedge of FIG. 17.
Figure 19:
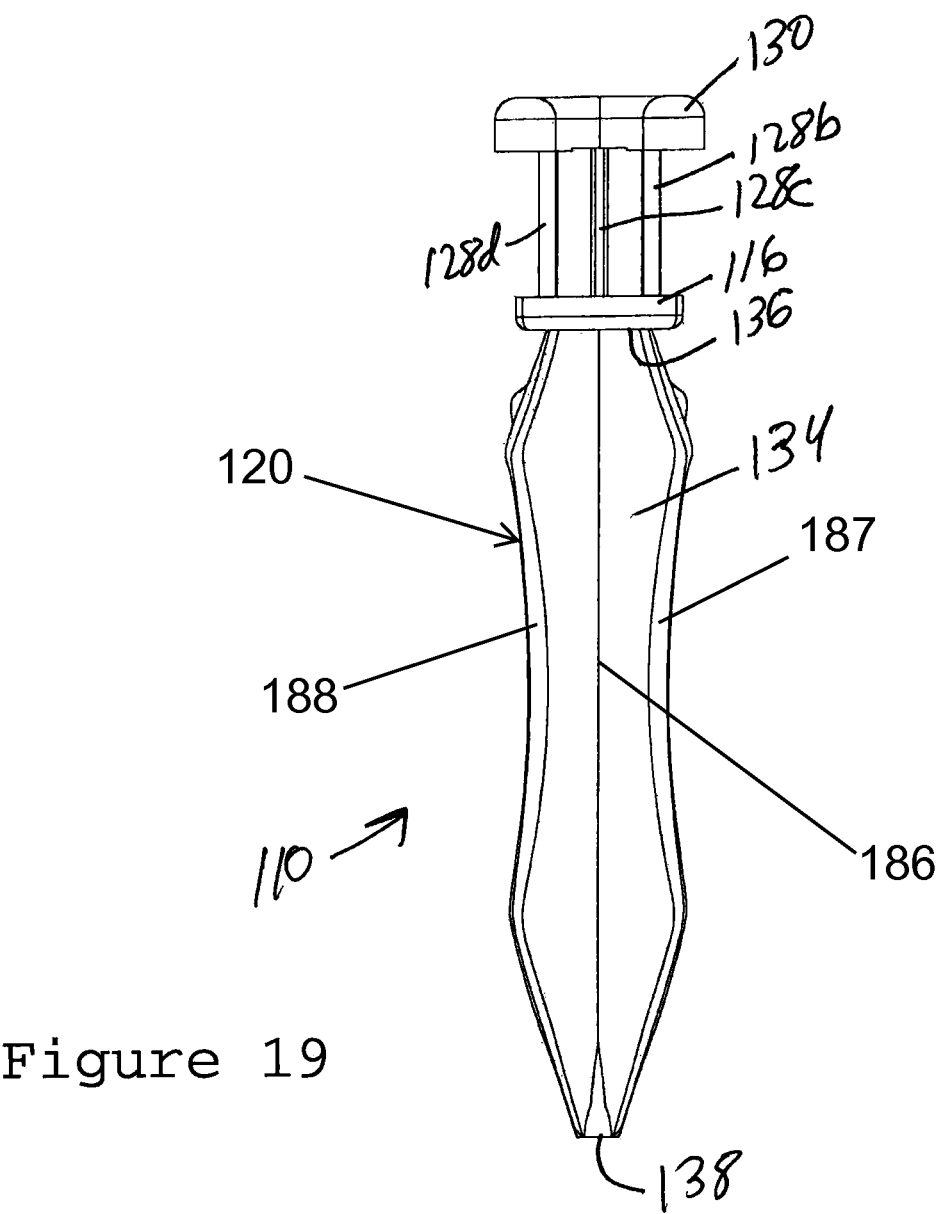
FIG. 19 is a bottom view of the dental wedge of FIG. 17.
Figure 20:
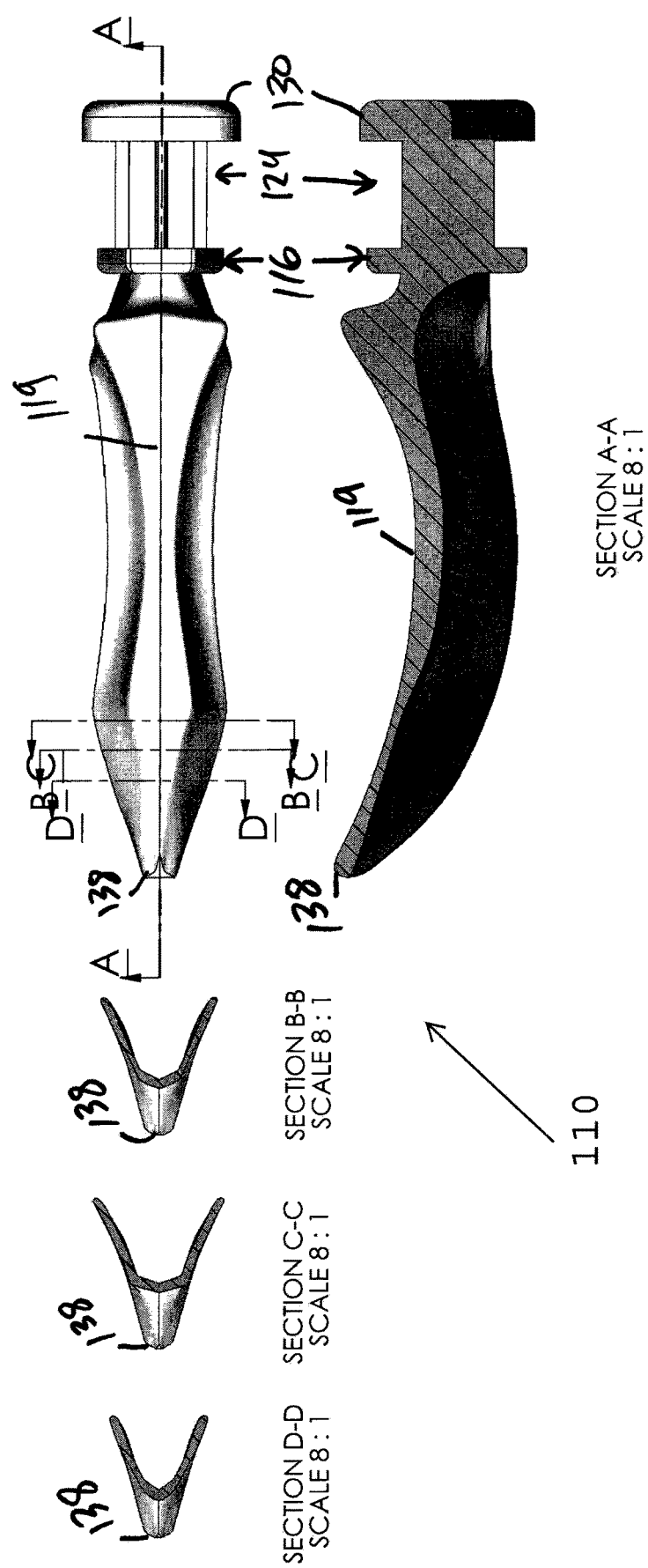
FIG. 20 shows cross-sectional views of the dental wedge of FIG. 17.
Figure 21:
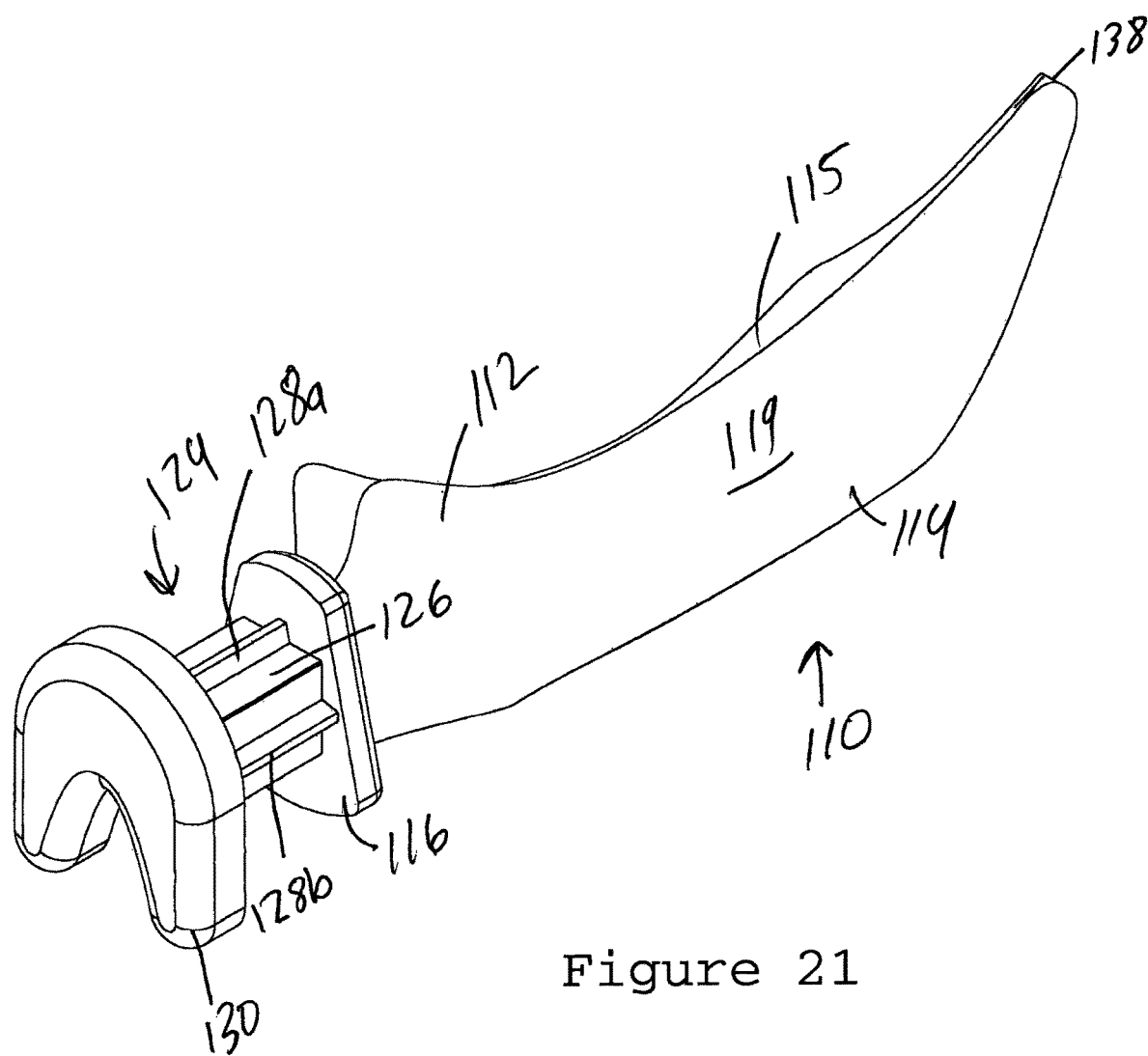
FIG. 21 is a top, right perspective view of the dental wedge of FIG. 17.
Figure 22:
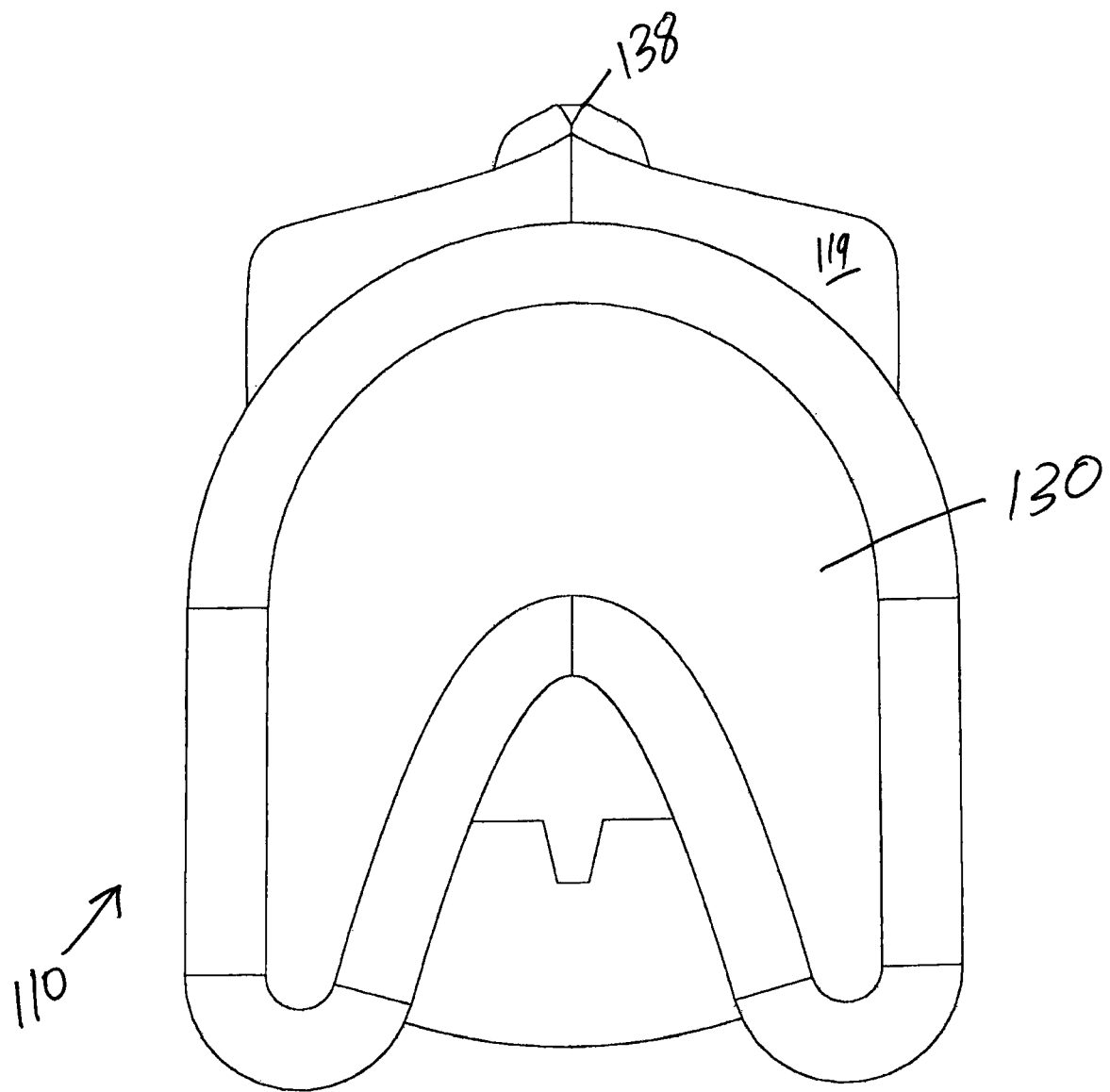
FIG. 22 is a front view of the dental wedge of FIG. 17.
Figure 23:
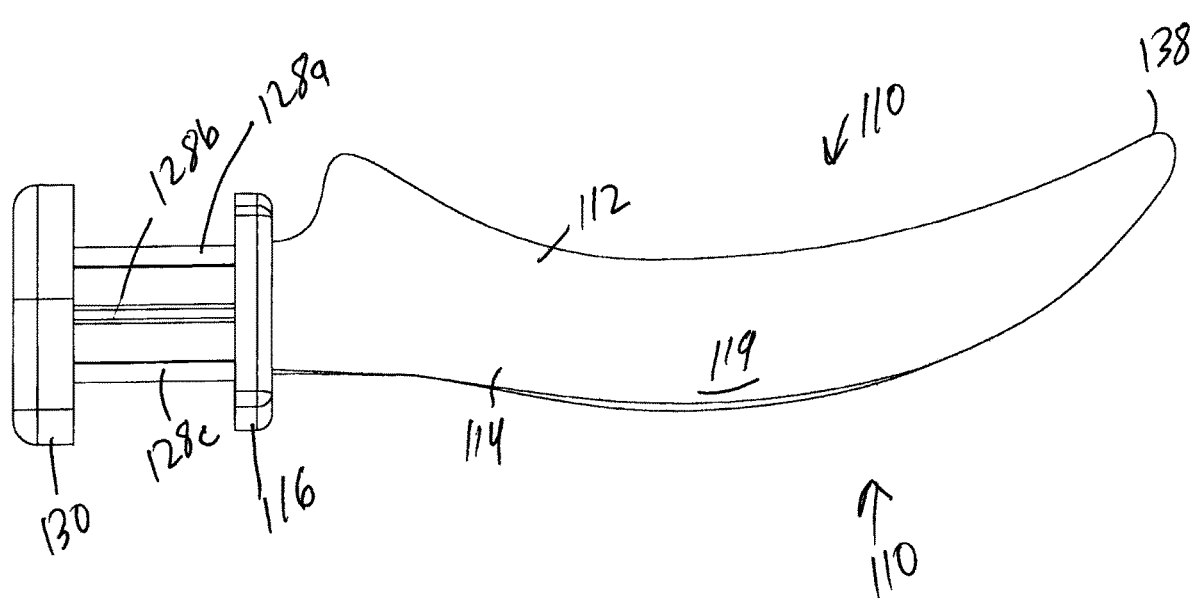
FIG. 23 is a right view of the dental wedge of FIG. 17.

FIG. 15 shows how inner end serrations 71 of a cotton pliers 73 can engage the splines 28a, 28b, 28c and 28d of the first grasping section 24 of the dental wedge 10. FIG. 16 shows the dental wedge 10 pressing a clear sectional dental matrix 81 against gingiva 82 and a tooth 83 being restored so that the matrix 81 seals the tooth 83 and keeps the filling material inside of the desired space with the wedge 10 separating adjacent teeth 83, 85 so that when the matrix 81 is removed after placing and hardening the filling material, the gap that is formed when the matrix 81 is removed is mitigated as the teeth 83, 85 "spring" back together and close the gap that was present when the matrix 81 was removed. The wedge 10 is inserted between the teeth 83, 85 with the collapsing distal tip 38 being inserted first while grasping the first grasping section 24 with the cotton pliers 73.

Looking at FIG. 16, a dentist may choose to use curable restorative material to fill interproximal cavity 87. Many curable dental restorative materials harden by polymerization reactions initiated by ultraviolet light or blue wavelengths. After placing curable restorative material between the matrix 81 and the tooth 83 being restored and in contact with the tooth 83 being restored, the dentist uses a dental curing light device to direct light onto the curable restorative material to initiate polymerization of the curable restorative material. The transparent or translucent top section 12 of the dental wedge 10 can receive and transmit light from such a dental curing light. Therefore, the top section 12 acts as a light pipe for light from the dental curing light. Light that is transmitted through the transparent or translucent top section 12 can also pass through the transparent or translucent matrix 81 onto the curable restorative material to initiate polymerization of the curable restorative material. Also, light that reaches an interface between the top section 12 and the bottom section 14 is reflected back due to the reflectant property of the opaque bottom section 14. The interface between the top section 12 and the bottom section 14 may include surface texturing to increase reflected back light due to the reflectant property of the opaque bottom section 14. The reflected light can pass through the transparent or translucent top section 12 and can also pass through the transparent or translucent matrix 81 onto the curable restorative material to initiate polymerization of the curable restorative material. In addition, polymeric materials for the bottom section 14 can include a fluorophore such that absorbed radiation from the curing light can cause re-emission of light at a different wavelength to further cure the curable restorative material.

Turning to FIGS. 17 to 24, a second embodiment of a dental wedge 110 according to the invention is shown. The dental wedge 110 includes a top section 112 and a bottom section 114. The use of relative terms such as "top", "bottom", "front", "rear", "inner", "left", "outer", "right", and the like when describing the dental wedge 110 of the invention is not intended to limit the orientation in which the dental wedge 110 may be used as explained above.

The top section 112 has a generally arcuate top surface 119 and a rounded top edge 115 that extends from a first vertical land area 116 to a paper thin (e.g., 0.001"-0.050") collapsing inner end distal tip 138 that is inward from the end of the wedge 110. The body 120 has a longitudinal intermediate wall 186 at the top surface 119, a longitudinal first side wall 187 connected to the intermediate wall 186, and a longitudinal second side wall 188 connected to the intermediate wall 186. Extending away from the vertical land area 116 opposite the tip 138 is a first grasping section 124 having a base 126 and splines 128a, 128b, 128c and 128d that extend outwardly from the base 126. The splines 128a, 128b, 128c and 128d are generally plate-like but can also have other shapes. Extending away from the first grasping section 124 opposite the first vertical land area 116 is a generally U-shaped second vertical land 130.

Figure 24:
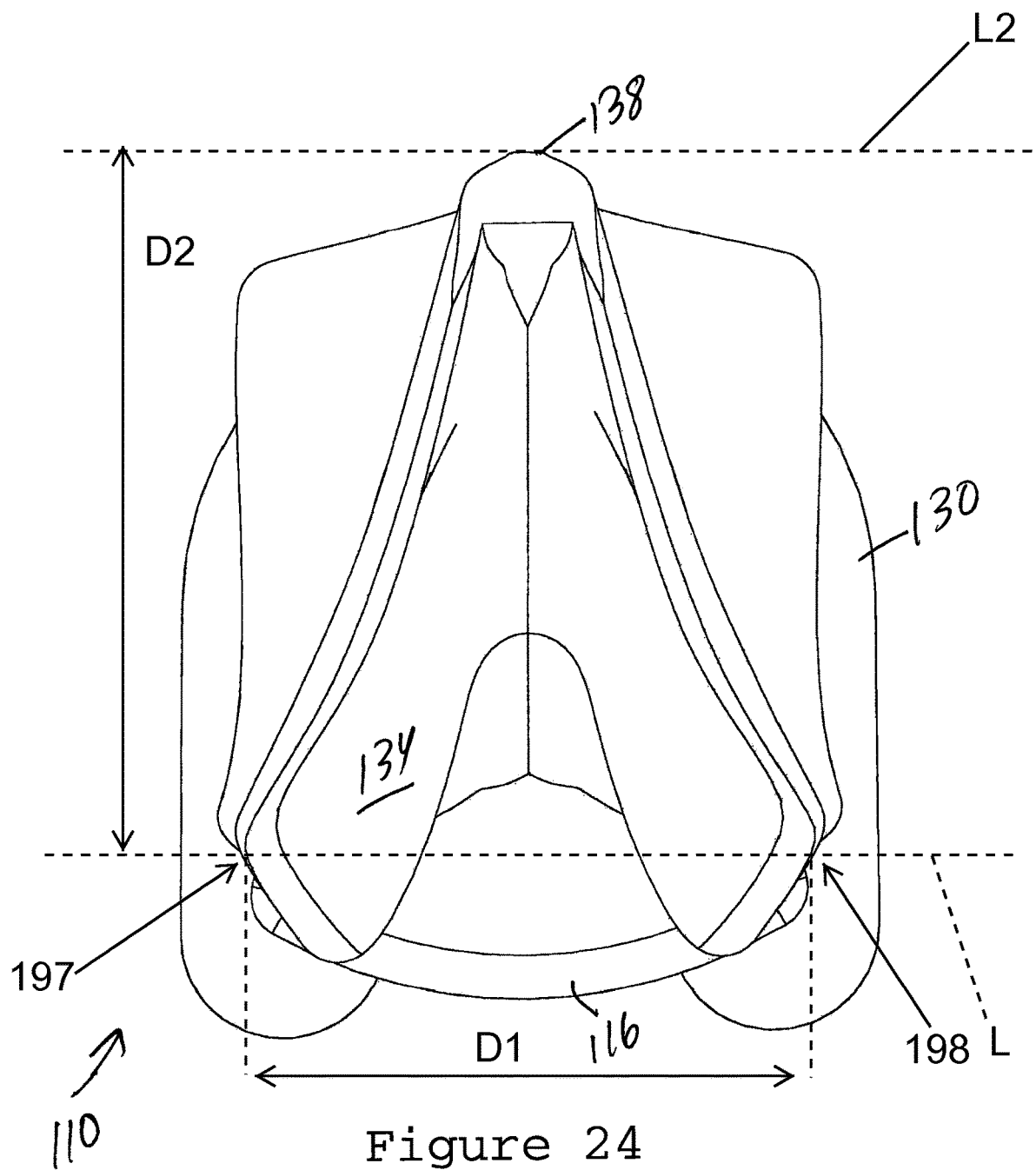
FIG. 24 is a rear view of the dental wedge of FIG. 17.
Figure 25:
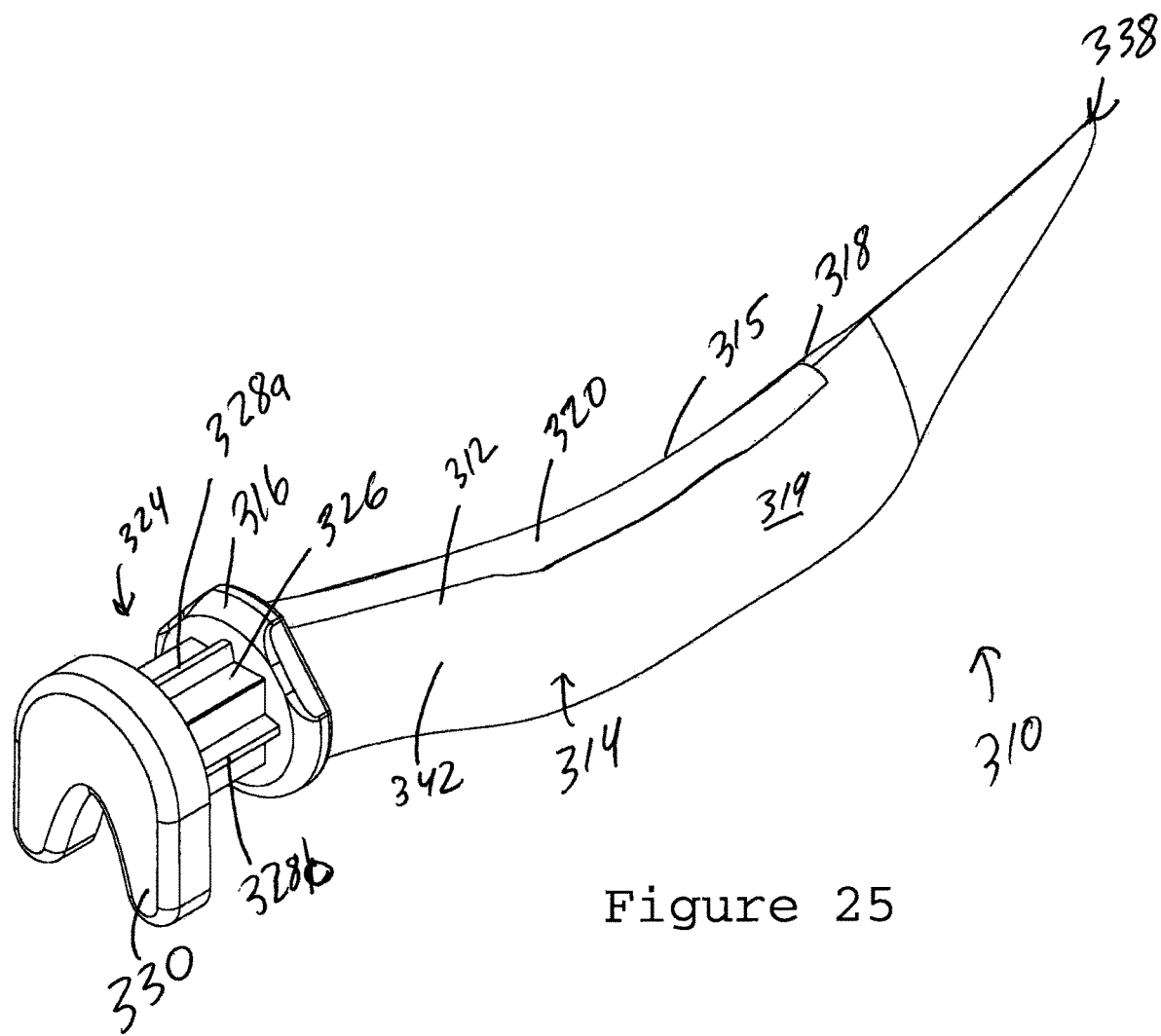
FIG. 25 is a top, right perspective view of a third embodiment of a dental wedge according to the invention.
Figure 26:
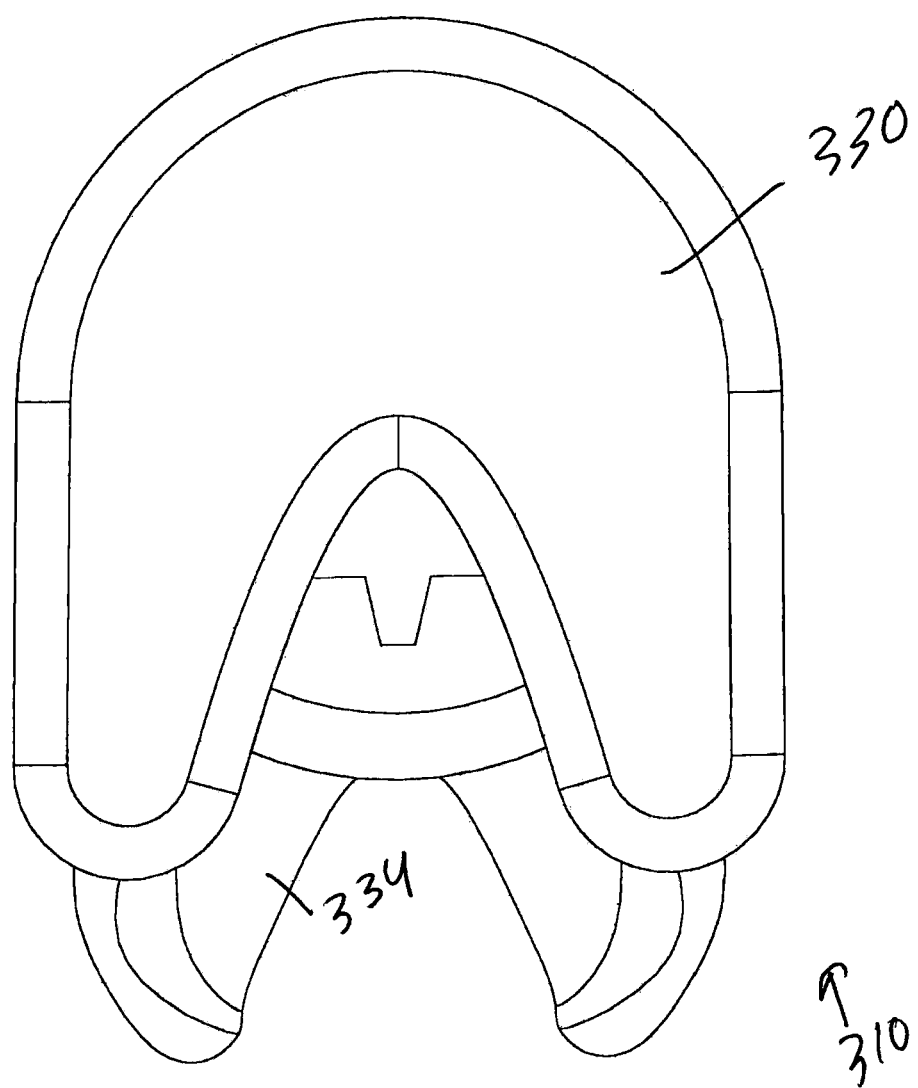
FIG. 26 is a front view of the dental wedge of FIG. 25.
Figure 27:
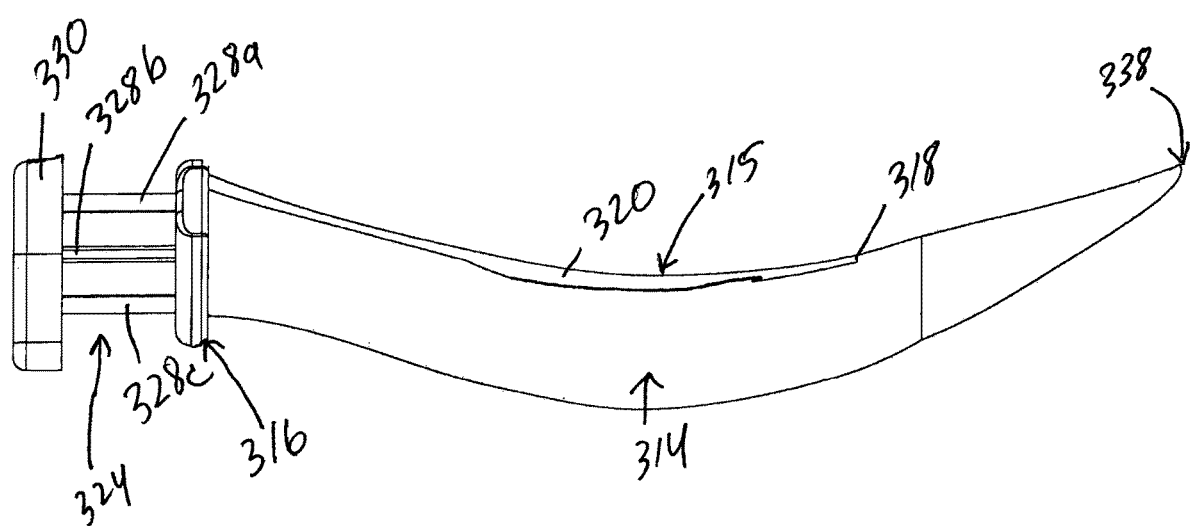
FIG. 27 is a right view of the dental wedge of FIG. 25.
Figure 28:
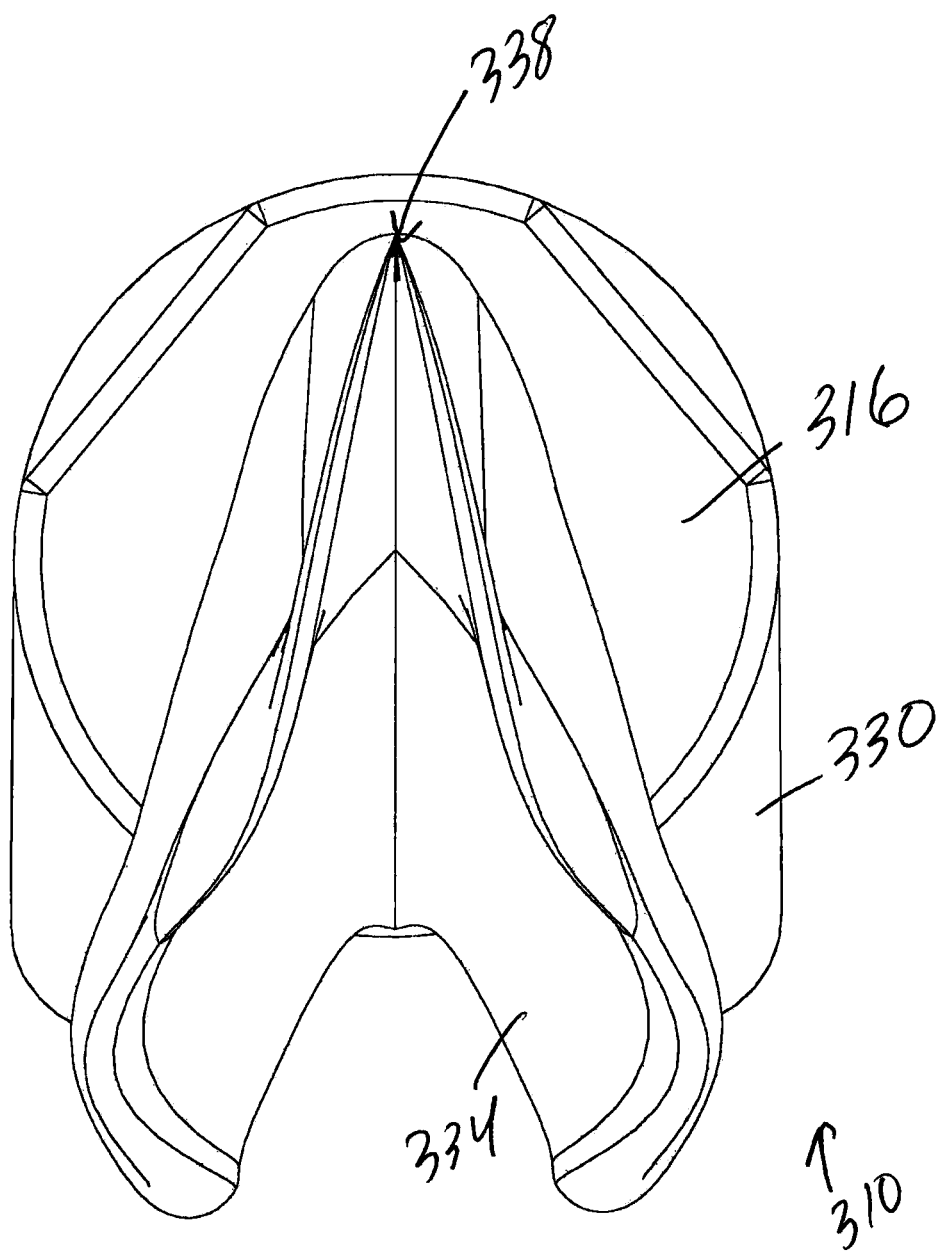
FIG. 28 is a rear view of the dental wedge of FIG. 25.
Figure 29:
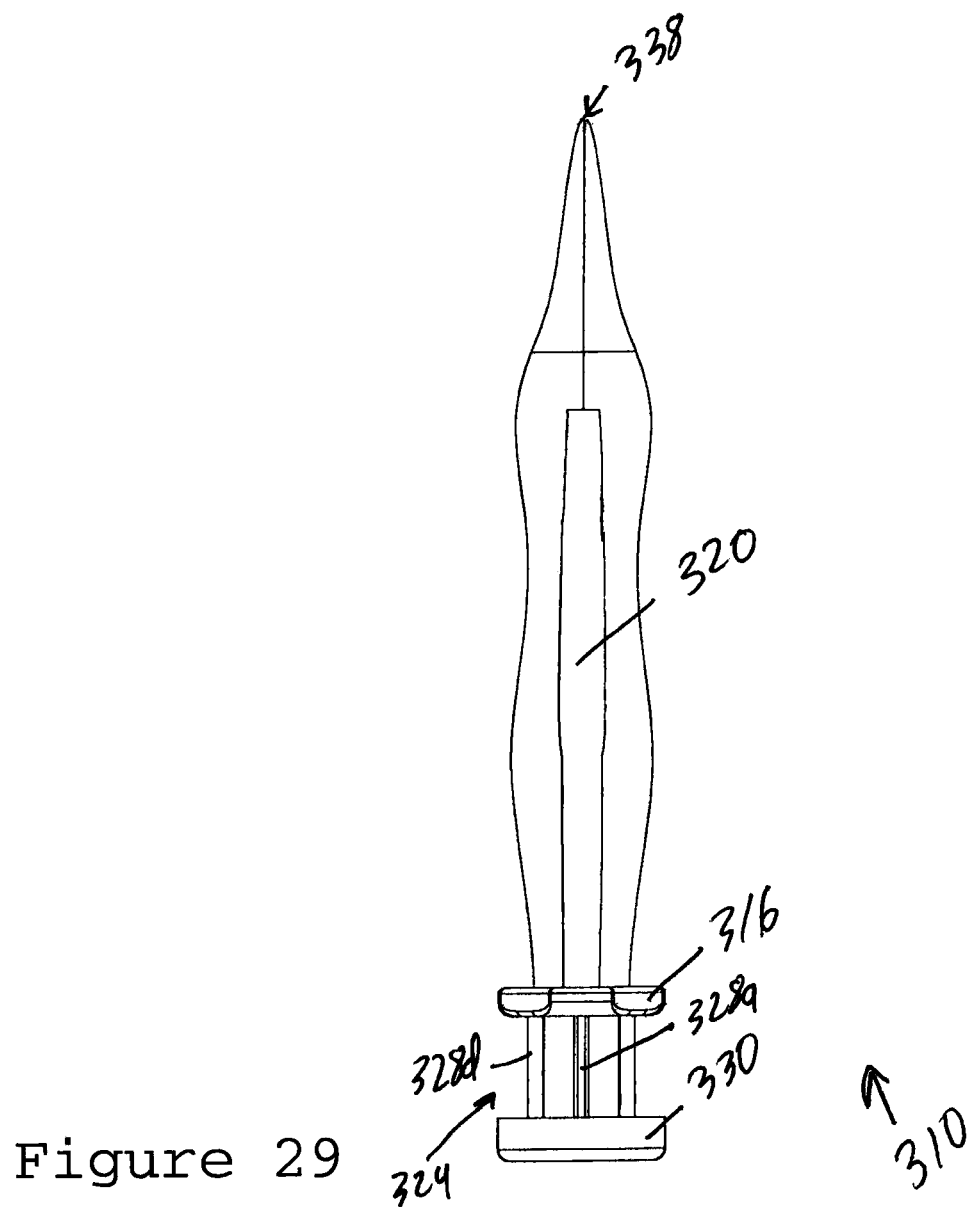
FIG. 29 is a top view of the dental wedge of FIG. 25.
Figure 30:
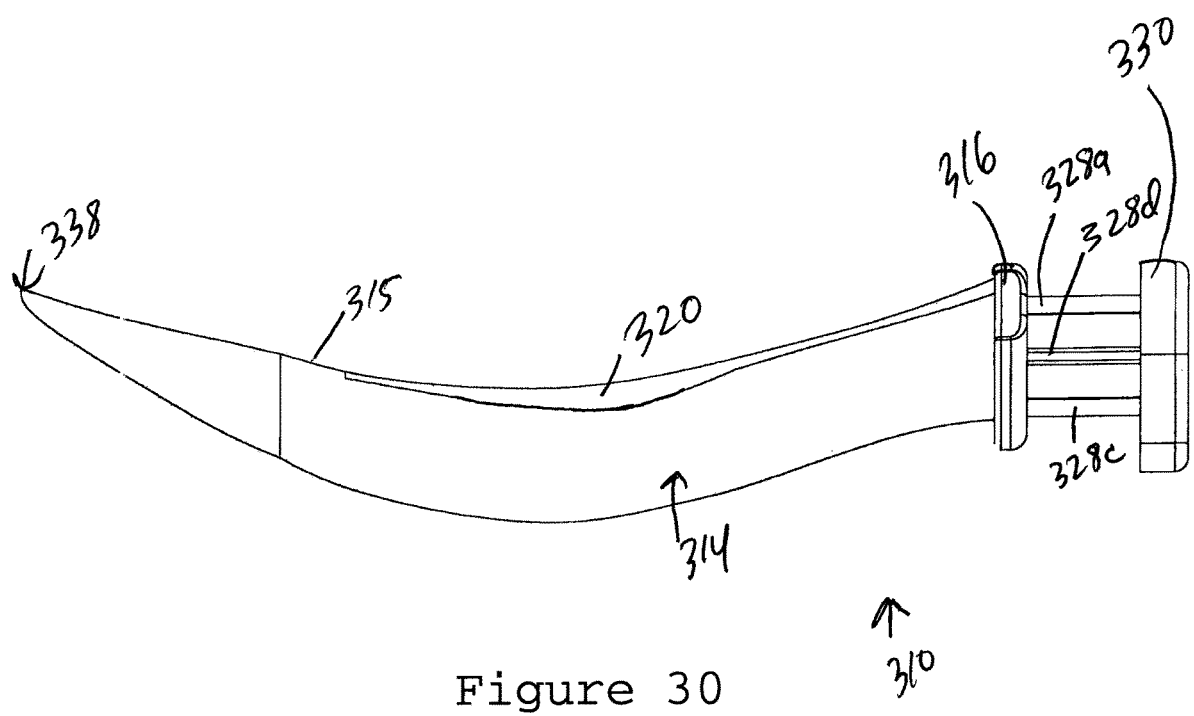
FIG. 30 is a left view of the dental wedge of FIG. 25.
Figure 31:
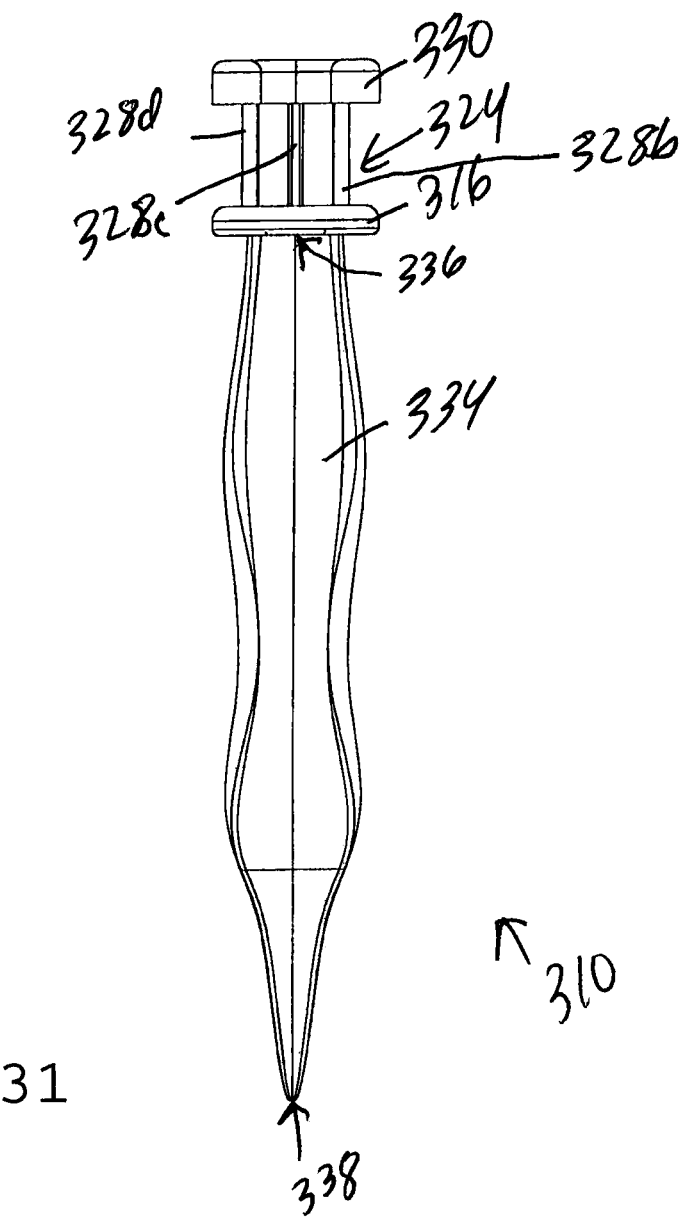
FIG. 31 is a bottom view of the dental wedge of FIG. 25.
Figure 32:
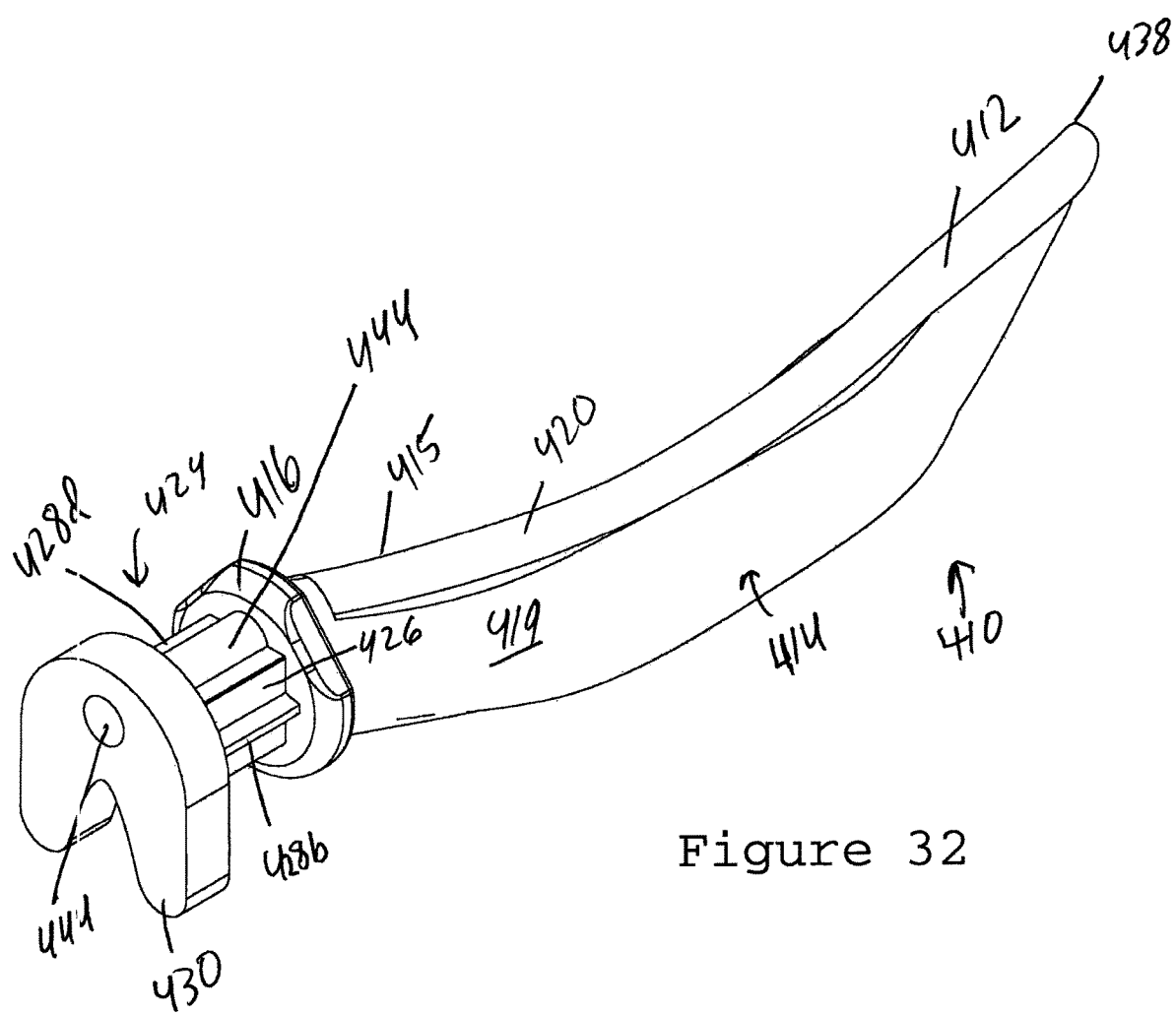
FIG. 32 is a top, right perspective view of a fourth embodiment of a dental wedge according to the invention.
Figure 33:
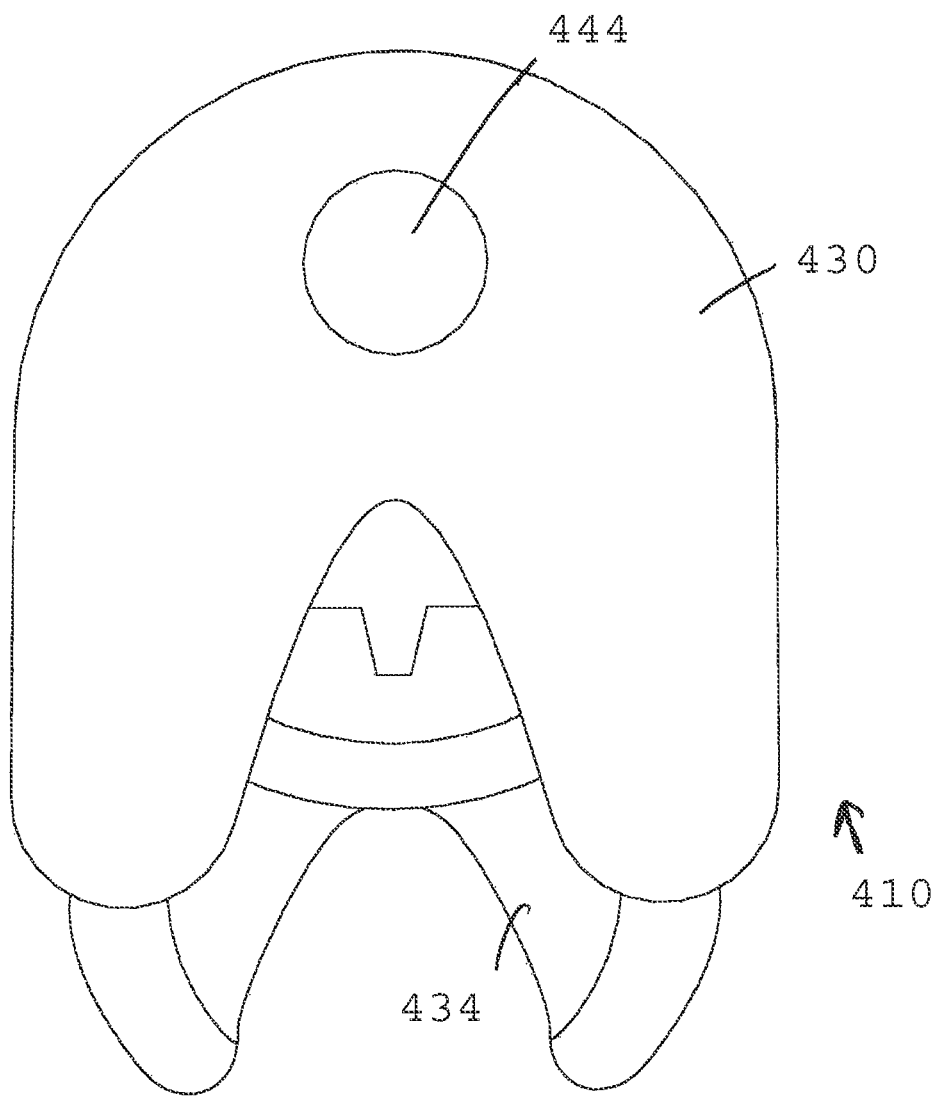
FIG. 33 is a front view of the dental wedge of FIG. 32.
Figure 34:
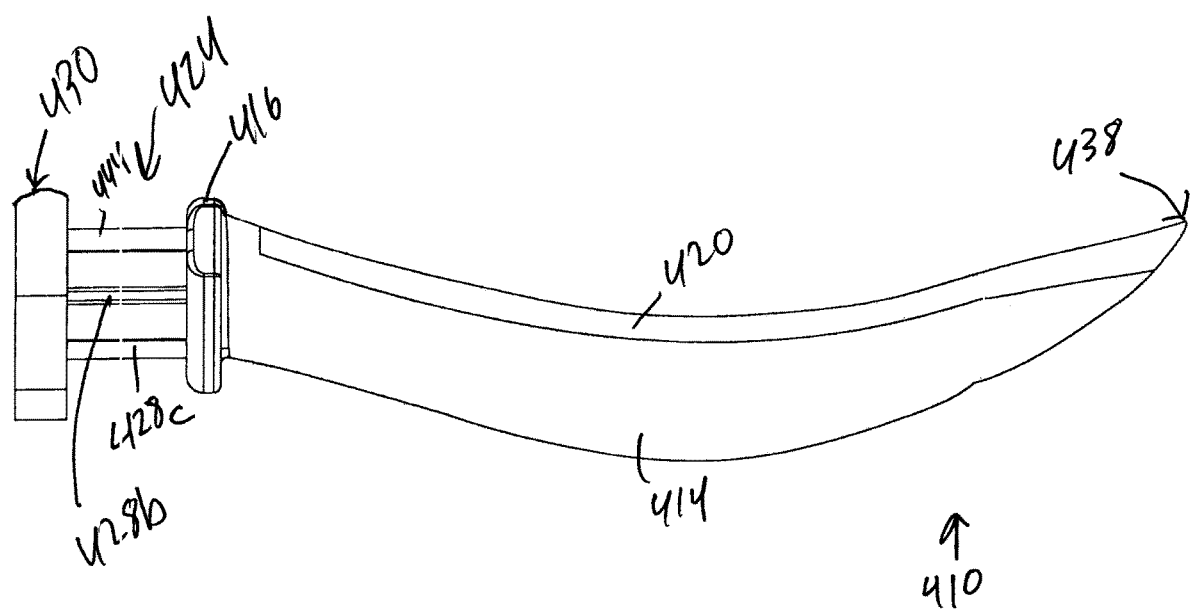
FIG. 34 is a right view of the dental wedge of FIG. 32.
Figure 35:
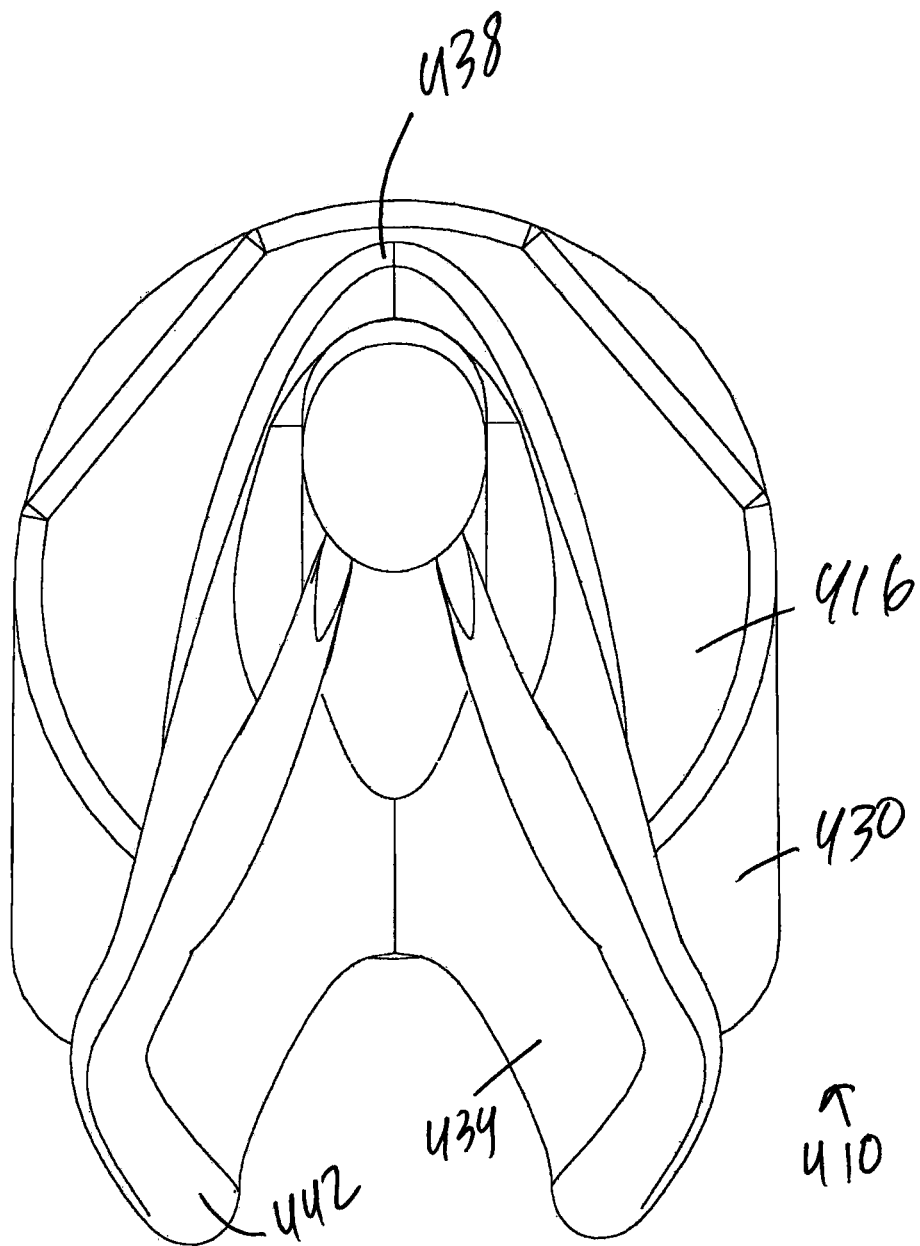
FIG. 35 is a rear view of the dental wedge of FIG. 32.
Figure 36:
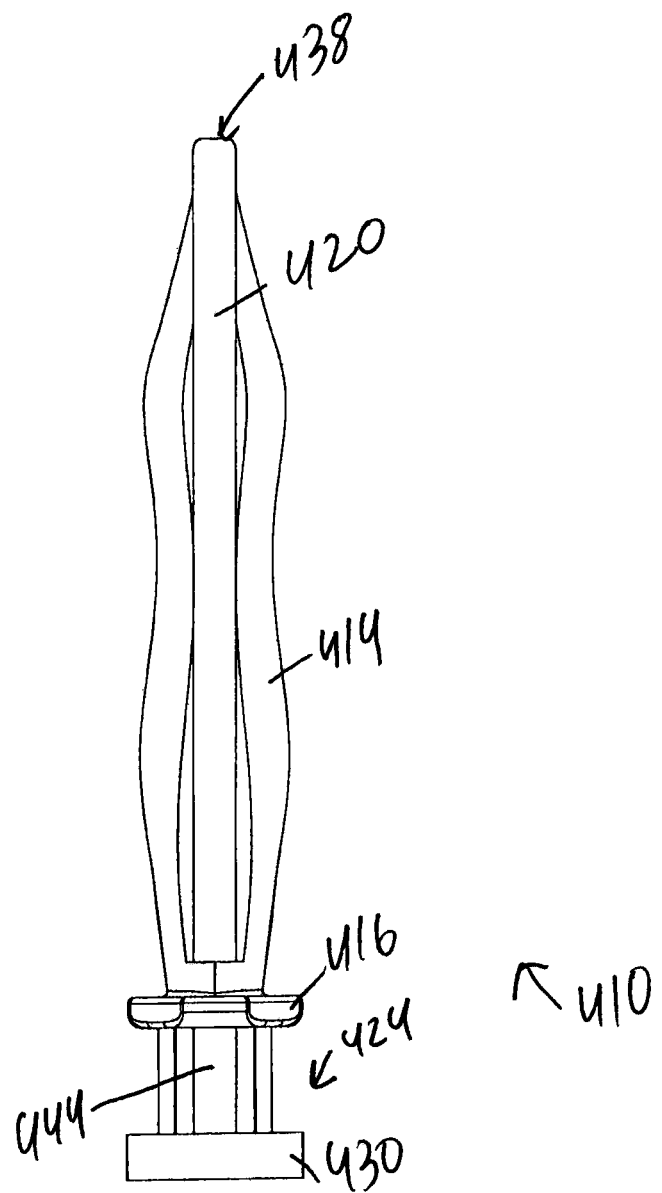
FIG. 36 is a top view of the dental wedge of FIG. 32.
Figure 37:
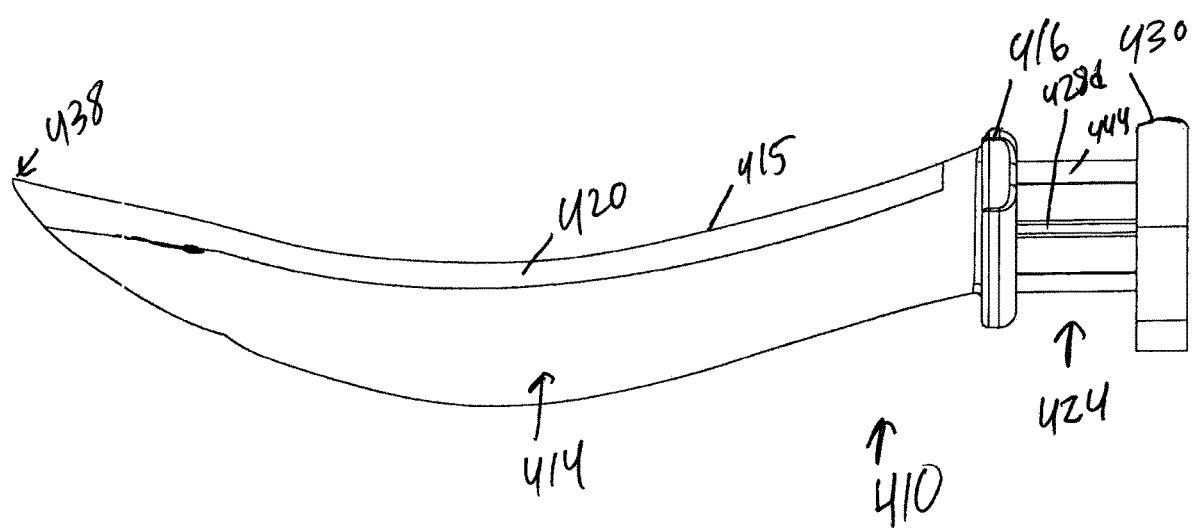
FIG. 37 is a left view of the dental wedge of FIG. 32.
Figure 38:
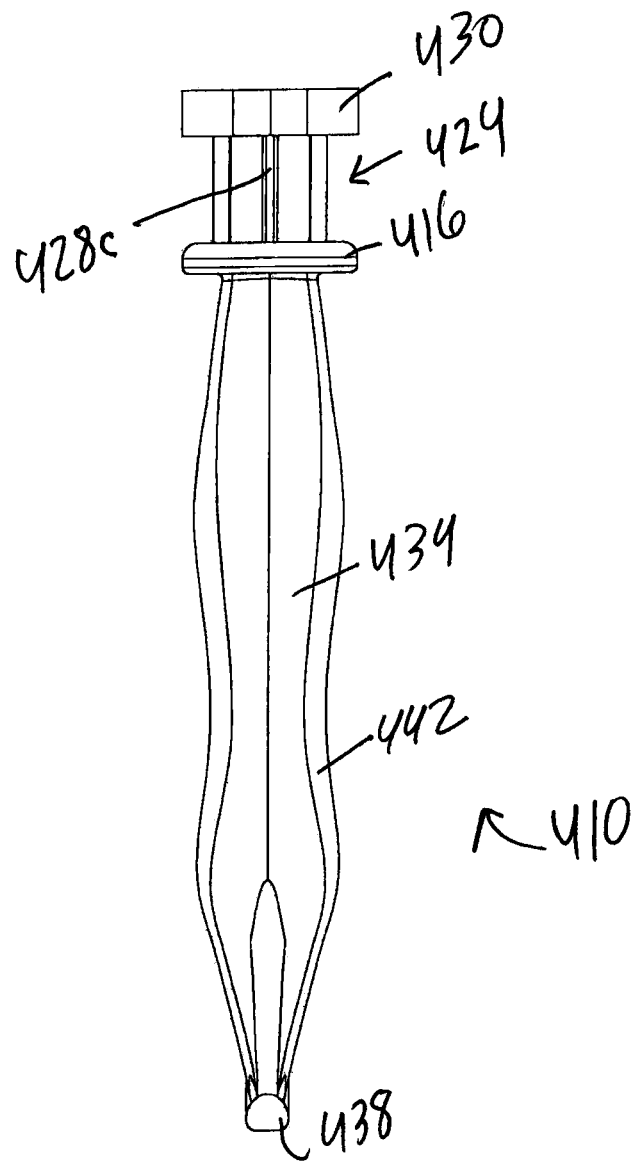
FIG. 38 is a bottom view of the dental wedge of FIG. 32.

The bottom section 114 of the dental wedge 110 has a generally arcuate bottom surface 134 that extends from an outer end 136 to paper thin collapsing inner end distal tip 138. Looking at FIG. 20, the configuration of cross-sections of the wedge 110 are shown. Referring to FIG. 24, a wedge width is defined by a first distance D1 of the first reference line L extending from the first distal end 197 of the first side wall 187 to the second distal end 198 of the second side wall 188, and a wedge height is defined by a second distance D2 between the first reference line L and a second reference line L2 that is tangent to the top edge of the top surface 119 of the wedge body.

Various polymeric materials can be used to mold the dental wedge 110. Preferably, the dental wedge 110 is molded from a polymeric material that forms an opaque wedge. "Opaque" means the polymeric material transmits very little light, and therefore reflects, scatters, or absorbs most of it. Non-limiting examples of polymeric materials for forming an opaque wedge include polyoxymethylene (e.g., Delrin® with a modulus of about 3,000 MPa).

The opacity of these polymeric materials for the wedge 110 can be controlled by including within the polymeric material various amounts of a pigment having a high refractive index such as titanium dioxide. The pigment can be dispersed throughout the wedge 110. Also, it can be beneficial to lower the coefficient of friction of the surface of the wedge 110. Slip additives can be added to the polymeric material to modify the surface properties of the wedge 110 and thus lower the coefficient of friction of the surface of the wedge 110. Fatty acid amides are suitable slip additives.

Inner end serrations 71 of a cotton pliers 73 can engage the splines 128a, 128b, 128c and 128d of the first grasping section 124 of the dental wedge 110 in a similar manner as shown in FIG. 15. Similar to FIG. 16, the dental wedge 110 can press a clear sectional dental matrix 81 against gingiva 82 and a tooth 83 being restored so that the matrix 81 seals the tooth 83 and keeps the filling material inside of the desired space with the wedge 110 separating adjacent teeth 83, 85 so that when the matrix 81 is removed after placing and hardening the filling material, the gap that is formed when the matrix 81 is removed is mitigated as the teeth 83, 85 "spring" back together and close the gap that was present when the matrix 81 was removed. The wedge 110 is inserted between the teeth 83, 85 with the collapsing distal tip 138 being inserted first while grasping the first grasping section 124 with the cotton pliers 73.

Turning to FIGS. 25-31, a third embodiment of a dental wedge 310 according to the invention is shown. The dental wedge 310 includes a top section 312 and a bottom section 314. The use of relative terms such as "top", "bottom", "front", "rear", "inner", "left", "outer", "right", and the like when describing the dental wedge 310 is not intended to limit the orientation in which the dental wedge 310 may be used as explained above.

The top section 312 has a generally arcuate top surface 319 and a rounded top edge 315 that extends from a first vertical land area 316 to an end 318 that is inward from the end of the wedge 310. The top section 312 has a central longitudinal body 320 that extends from the land area 316 to the end 318. The body 320 is located below the top surface 319. Extending away from the first vertical land area 316 opposite the end 318 is a first grasping section 324 having a base 326 and splines 328a, 328b, 328c and 328d that extend outwardly from the base 326. The splines 328a, 328b, 328c and 328d are generally plate-like but can also have other shapes. Extending away from the first grasping section 324 opposite the first vertical land area 316 is a generally U-shaped second vertical land 330.

The bottom section 314 of the dental wedge 310 has a generally arcuate bottom surface 334 that extends from an outer end 336 to paper thin collapsing inner end distal tip 338. A body 342 of the bottom section 314 is located above the bottom surface 334.

The dental wedge 310 can be formed using an overmolding process. A suitable polymeric material is first molded into the bottom section 314. Then another polymeric material is overmolded on the bottom section 314 to form the top section 312 and the second land 330 of the dental wedge 310. Alternatively, the top section 312 and the second land 330 can be molded first and then the bottom section 314 can be overmolded. During the overmolding process, the fluid polymeric materials allow for the creation of mechanical interlocks between the top section 312 and the bottom section 314.

Various polymeric materials can be used to mold the top section 312 and the second land 330 of the dental wedge 310. Preferably, the top section 312 and the second land 330 are molded from a polymeric material that forms a transparent or translucent top section 312 and second land 330. Non-limiting examples of polymeric materials for forming a transparent or translucent top section 312 and the second land 330 include polycarbonates (e.g., Lexan® polycarbonate), acrylics (e.g., polymethylmethacrylate), polyesters (e.g., polyethylene terephthalate) and polyolefins (e.g., polyethylene, polypropylene).

Various polymeric materials can be used to mold the bottom section 314 of the dental wedge 310. Preferably, the bottom section 314 is molded from a polymeric material that forms an opaque bottom section 314. "Opaque" means the polymeric material transmits very little light, and therefore reflects (as in specular reflection from the interface between the top section 312 and the bottom section 314), scatters (as in diffuse reflection from the interface between the top section 312 and the bottom section 314), or absorbs most of it. Non-limiting examples of polymeric materials for forming an opaque bottom section 314 include polyoxymethylene (e.g., Delrin® with a modulus of about 3,000 MPa).

The opacity of these polymeric materials for the bottom section 314 can be controlled by including within the polymeric material various amounts of a pigment having a high refractive index such as titanium dioxide. The pigment can be dispersed throughout the bottom section 314, or can be located at surface areas or at the interface of the top section 312 and the bottom section 314. Also, it can be beneficial to lower the coefficient of friction of the surface of the opaque bottom section 314. Slip additives can be added to the polymeric material to modify the surface properties of the opaque bottom section 314 and thus lower the coefficient of friction of the surface of the opaque bottom section 314. Fatty acid amides are suitable slip additives.

Inner end serrations 71 of a cotton pliers 73 can engage the splines 328a, 328b, 328c and 328d of the first grasping section 324 of the dental wedge 310 in a similar manner as shown in FIG. 15. Similar to FIG. 16, the dental wedge 310 can press a clear sectional dental matrix 81 against gingiva 82 and a tooth 83 being restored so that the matrix 81 seals the tooth 83 and keeps the filling material inside of the desired space with the wedge 310 separating adjacent teeth 83, 85 so that when the matrix 81 is removed after placing and hardening the filling material, the gap that is formed when the matrix 81 is removed is mitigated as the teeth 83, 85 "spring" back together and close the gap that was present when the matrix 81 was removed. The wedge 310 is inserted between the teeth 83, 85 with the collapsing distal tip 338 being inserted first while grasping the first grasping section 324 with the cotton pliers 73.

Turning to FIGS. 32-38, a fourth embodiment of a dental wedge 410 according to the invention is shown. The dental wedge 410 includes a top section 412 and a bottom section 414. The use of relative terms such as "top", "bottom", "front", "rear", "inner", "left", "outer", "right", and the like when describing the dental wedge 410 is not intended to limit the orientation in which the dental wedge 410 may be used as explained above.

The top section 412 has a generally arcuate top surface 419 and a rounded top edge 415 that extends from a first vertical land area 416 to a paper thin collapsing distal tip 438 that is inward from the end of the wedge 410. The top section 412 has a central longitudinal body 420 that extends from the land area 416 to the distal tip 438. The body 420 is located below the top surface 419. Extending away from the first vertical land area 416 opposite the end 418 is a first grasping section 424 having a base 426 and splines 428b, 428c and 428d that extend outwardly from the base 426. The splines 428b, 428c and 428d are generally plate-like but can also have other shapes. Extending away from the first grasping section 424 opposite the first vertical land area 416 is a generally U-shaped second vertical land 430. A light pipe 444 starts in the second land 430, extends through the first vertical land area 416, and extends to the body 420.

The bottom section 414 of the dental wedge 410 has a generally arcuate bottom surface 434 that extends from an outer end 436 to the paper thin collapsing inner end distal tip 438. A body 442 of the bottom section 414 is located above the bottom surface 434.

The dental wedge 410 can be formed using an overmolding process. A suitable polymeric material is first molded into the bottom section 414. Then another polymeric material is overmolded on the bottom section 414 to form the top section 412 and the light pipe 444 of the dental wedge 410. Alternatively, the top section 412 and the light pipe 444 can be molded first and then the bottom section 414 can be overmolded. During the overmolding process, the fluid polymeric materials allow for the creation of mechanical interlocks between the top section 412 and the bottom section 414.

Various polymeric materials can be used to mold the top section 412 and the light pipe 444 of the dental wedge 410. Preferably, the top section 412 and the light pipe 444 are molded from a polymeric material that forms a transparent or translucent top section 412 and light pipe 444. Non-limiting examples of polymeric materials for forming a transparent or translucent top section 412 and the light pipe 444 include polycarbonates (e.g., Lexan® polycarbonate), acrylics (e.g., polymethylmethacrylate), polyesters (e.g., polyethylene terephthalate) and polyolefins (e.g., polyethylene, polypropylene).

Various polymeric materials can be used to mold the bottom section 414 of the dental wedge 410. Preferably, the bottom section 414 is molded from a polymeric material that forms an opaque bottom section 414. "Opaque" means the polymeric material transmits very little light, and therefore reflects (as in specular reflection from the interface between the top section 412 and the bottom section 414), scatters (as in diffuse reflection from the interface between the top section 412 and the bottom section 414), or absorbs most of it. Non-limiting examples of polymeric materials for forming an opaque bottom section 414 include polyoxymethylene (e.g., Delrin® with a modulus of about 3,000 MPa).

The opacity of these polymeric materials for the bottom section 414 can be controlled by including within the polymeric material various amounts of a pigment having a high refractive index such as titanium dioxide. The pigment can be dispersed throughout the bottom section 414, or can be located at surface areas or at the interface of the top section 412 and the bottom section 414. Also, it can be beneficial to lower the coefficient of friction of the surface of the opaque bottom section 414. Slip additives can be added to the polymeric material to modify the surface properties of the opaque bottom section 414 and thus lower the coefficient of friction of the surface of the opaque bottom section 414. Fatty acid amides are suitable slip additives.

Inner end serrations 71 of a cotton pliers 73 can engage the splines 428b, 428c and 428d of the first grasping section 424 of the dental wedge 410 in a similar manner as shown in FIG. 15. Similar to FIG. 16, the dental wedge 410 can press a clear sectional dental matrix 81 against gingiva 82 and a tooth 83 being restored so that the matrix 81 seals the tooth 83 and keeps the filling material inside of the desired space with the wedge 410 separating adjacent teeth 83, 85 so that when the matrix 81 is removed after placing and hardening the filling material, the gap that is formed when the matrix 81 is removed is mitigated as the teeth 83, 85 "spring" back together and close the gap that was present when the matrix 81 was removed. The wedge 410 is inserted between the teeth 83, 85 with the collapsing distal tip 438 being inserted first while grasping the first grasping section 424 with the cotton pliers 73.

Figure 39:
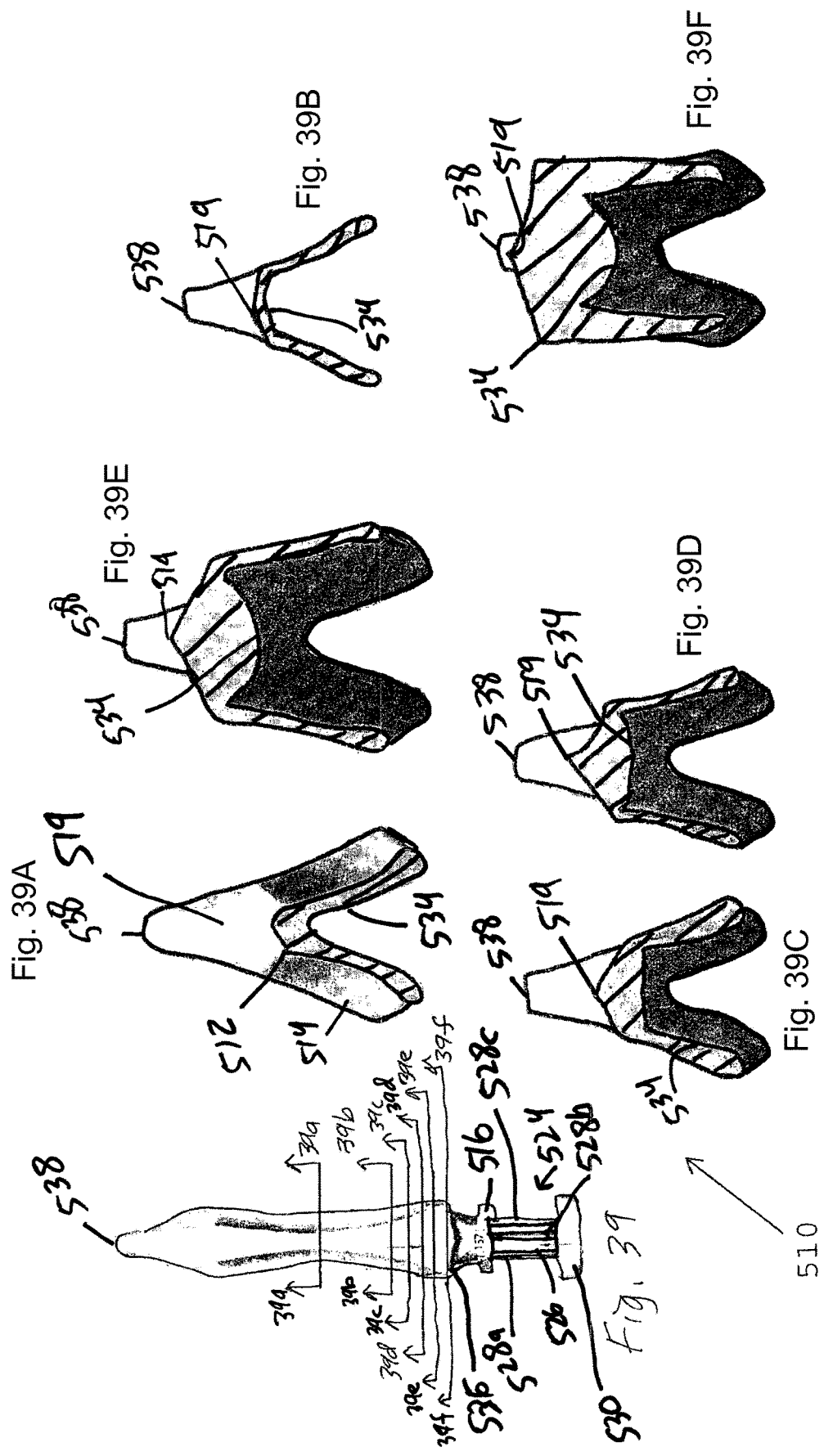
FIG. 39 shows a top view of a fifth embodiment of a dental wedge according to the invention.
Figure 40:
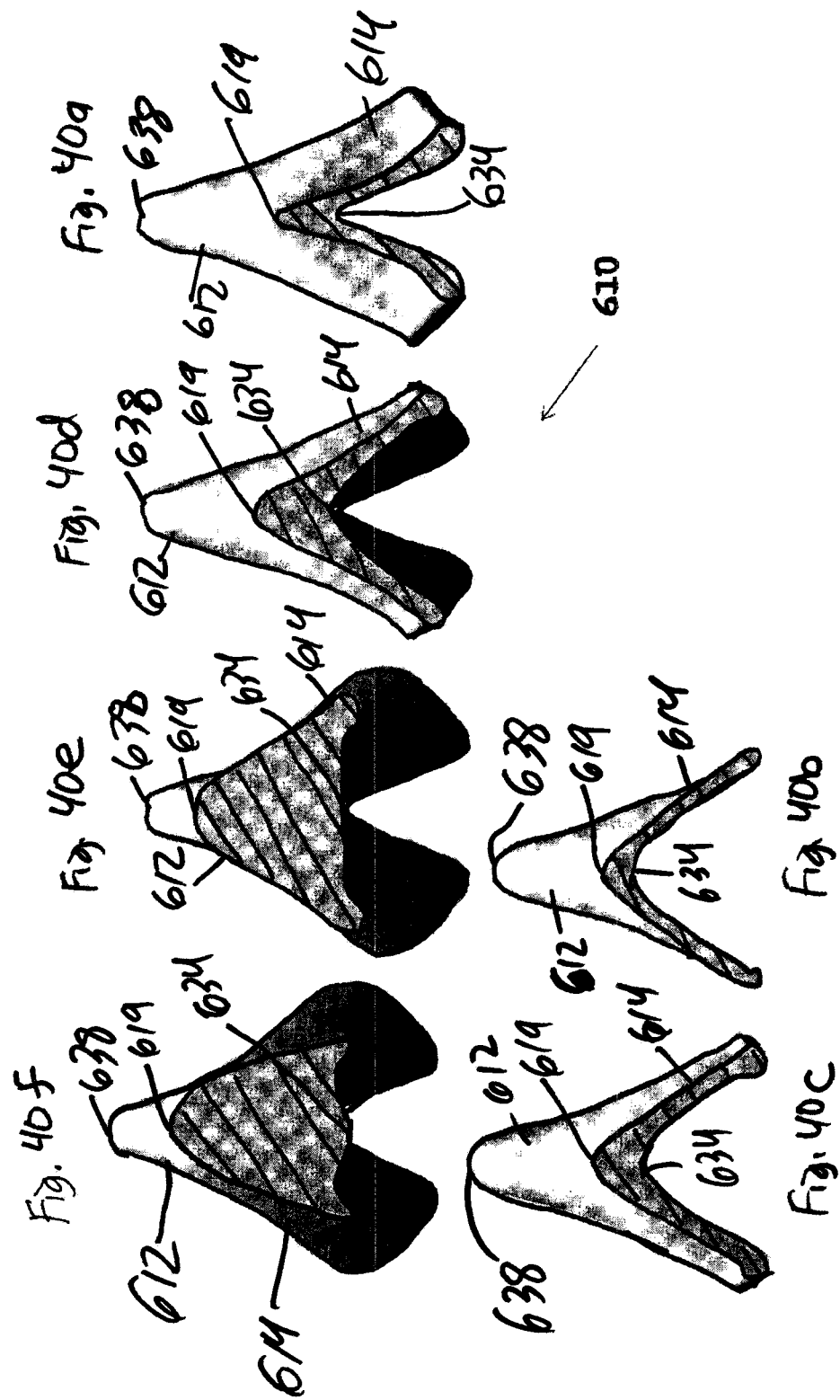
FIG. 40a shows cross-sectional view of a sixth embodiment of a dental wedge according to the invention at a location similar to line 39a-39a of FIG. 39.
FIG. 40b shows cross-sectional view of a sixth embodiment of a dental wedge according to the invention at a location similar to line 41b-41b of FIG. 39.
FIG. 40c shows cross-sectional view of a sixth embodiment of a dental wedge according to the invention at a location similar to line 41c-41c of FIG. 39.
FIG. 40d shows cross-sectional view of a sixth embodiment of a dental wedge according to the invention at a location similar to line 39b-39b of FIG. 39.
FIG. 40e shows cross-sectional view of a sixth embodiment of a dental wedge according to the invention at a location similar to line 39e-39e of FIG. 39.
FIG. 40f shows cross-sectional view of a sixth embodiment of a dental wedge according to the invention at a location similar to line 39f-39f of FIG. 39.

FIGS. 39 to 39f show a top view and cross-sectional views of a fifth embodiment of a dental wedge 510 according to the invention.

The dental wedge 510 includes a top section 512 and a bottom section 514. The use of relative terms such as "top", "bottom", "front", "rear", "inner", "left", "outer", "right", and the like when describing the dental wedge 510 of the invention is not intended to limit the orientation in which the dental wedge 510 may be used as explained above.

The top section 512 has a top surface 519 that extends from a first vertical land area 516 to a paper thin (e.g., 0.001"-0.050") collapsing distal tip 538 that is inward from the end of the wedge 510. Extending away from the first vertical land area 516 opposite the tip 538 is a first grasping section 524 having a base 526 and splines 528a, 528b and 528c that extend outwardly from the base 526. The splines 528a, 528b, 528c are generally plate-like but can also have other shapes. Extending away from the first grasping section 524 opposite the first vertical land area 516 is a generally U-shaped second vertical land 530. The bottom section 514 of the dental wedge 510 has a bottom surface 534 that extends from an outer end 536 to the paper thin collapsing inner end distal tip 538. Looking at FIGS. 39a to 39f, the configuration of cross-sections of the wedge 510 are shown.

Various opaque, translucent or transparent materials can be used to mold the dental wedge 510. Also, it can be beneficial to lower the coefficient of friction of the surface of the wedge 510. Slip additives can be added to the polymeric material to modify the surface properties of the wedge 510 and thus lower the coefficient of friction of the surface of the wedge 510. Inner end serrations 71 of a cotton pliers 73 can engage the splines 528a, 528b, 528c of the first grasping section 524 of the dental wedge 510 in a similar manner as shown in FIG. 15.

FIGS. 40a to 40f show cross-sectional views of a sixth embodiment of a dental wedge 610 according to the invention. The dental wedge 610 includes a top section 612 and a bottom section 614. The use of relative terms such as "top", "bottom", "front", "rear", "inner", "left", "outer", "right", and the like when describing the dental wedge 610 of the invention is not intended to limit the orientation in which the dental wedge 610 may be used as explained above.

The top section 612 has a top surface 619 that extends from a first vertical land area (similar to FIG. 39) to a paper thin (e.g., 0.001"-0.050") collapsing distal tip 638 that is inward from the end of the wedge 610. Extending away from the first vertical land area opposite the tip 638 is a first grasping section having a base and splines (similar to FIG. 39) that extend outwardly from the base. The splines are generally plate-like but can also have other shapes. Extending away from the first grasping section opposite the first vertical land area is a generally U-shaped second land (similar to FIG. 39). The bottom section 614 of the dental wedge 610 has a bottom surface 634 that extends from an outer end to the paper thin collapsing inner end distal tip 638. Looking at FIGS. 40a to 40f, the configuration of cross-sections of the wedge 610 are shown.

Various opaque, translucent or transparent materials can be used to mold the dental wedge 610. Also, it can be beneficial to lower the coefficient of friction of the surface of the wedge 610. Slip additives can be added to the polymeric material to modify the surface properties of the wedge 610 and thus lower the coefficient of friction of the surface of the wedge 610. Inner end serrations 71 of a cotton pliers 73 can engage the splines of the first grasping section of the dental wedge 610 in a similar manner as shown in FIG. 15.

Figure 41:
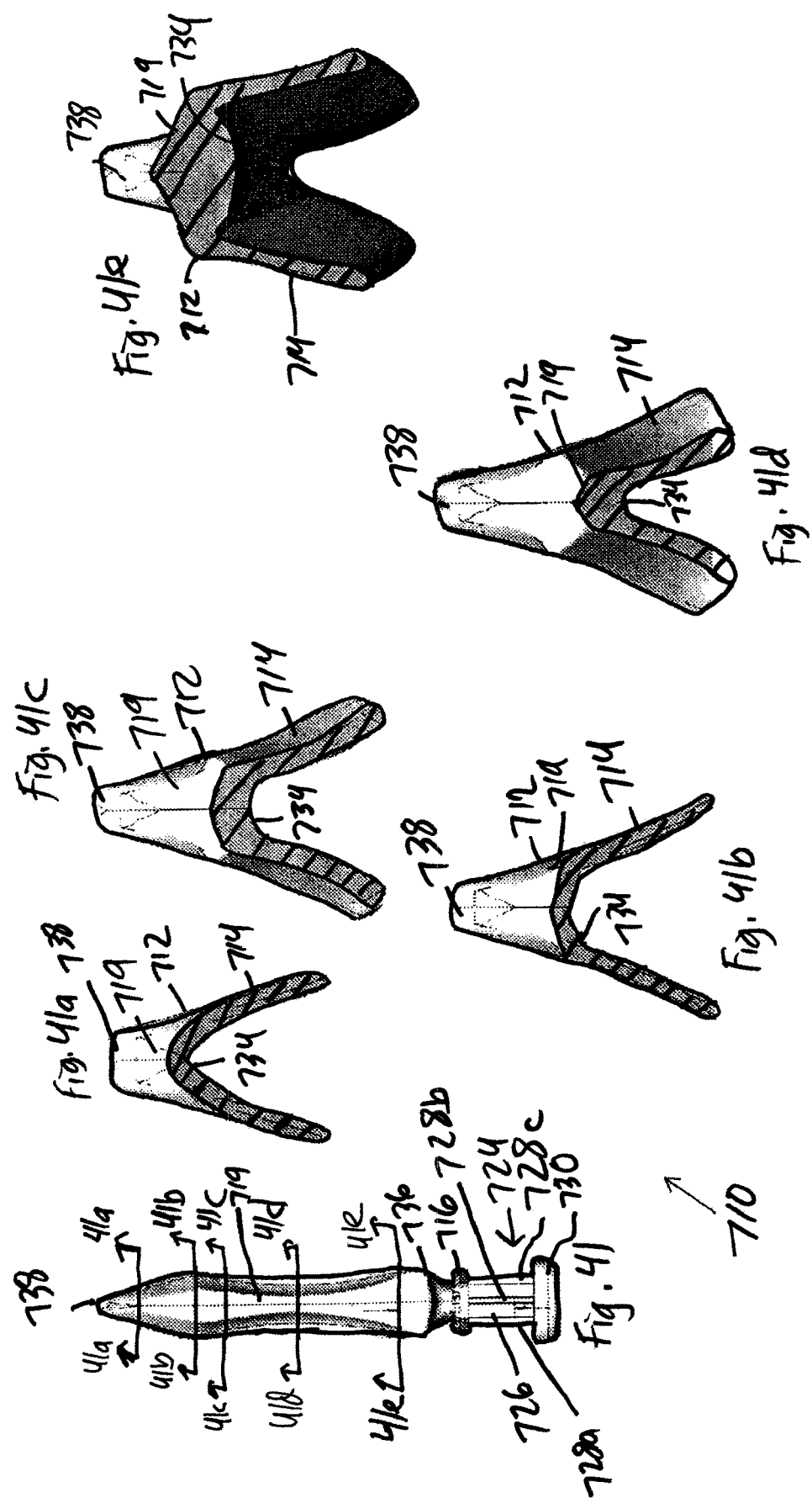
FIG. 41 shows a top view of a seventh embodiment of a dental wedge according to the invention.

FIGS. 41 to 41e show a top view and cross-sectional views of a seventh embodiment of a dental wedge 710 according to the invention. The dental wedge 710 includes a top section 712 and a bottom section 714. The use of relative terms such as "top", "bottom", "front", "rear", "inner", "left", "outer", "right", and the like when describing the dental wedge 710 of the invention is not intended to limit the orientation in which the dental wedge 710 may be used as explained above.

The top section 712 has a top surface 719 that extends from a first vertical land area 716 to a paper thin (e.g., 0.001"-0.050") collapsing distal tip 738 that is inward from the end of the wedge 710. Extending away from the first vertical land area 716 opposite the tip 738 is a first grasping section 724 having a base 726 and splines 728a, 728b and 728c that extend outwardly from the base 726. The splines 728a, 728b, 728c are generally plate-like but can also have other shapes. Extending away from the first grasping section 724 opposite the first vertical land area 716 is a generally U-shaped second vertical land 730. The bottom section 714 of the dental wedge 710 has a bottom surface 734 that extends from an outer end 736 to paper thin collapsing inner end distal tip 738. Looking at FIGS. 41a to 41e, the configuration of cross-sections of the wedge 710 are shown.

Figure 42:
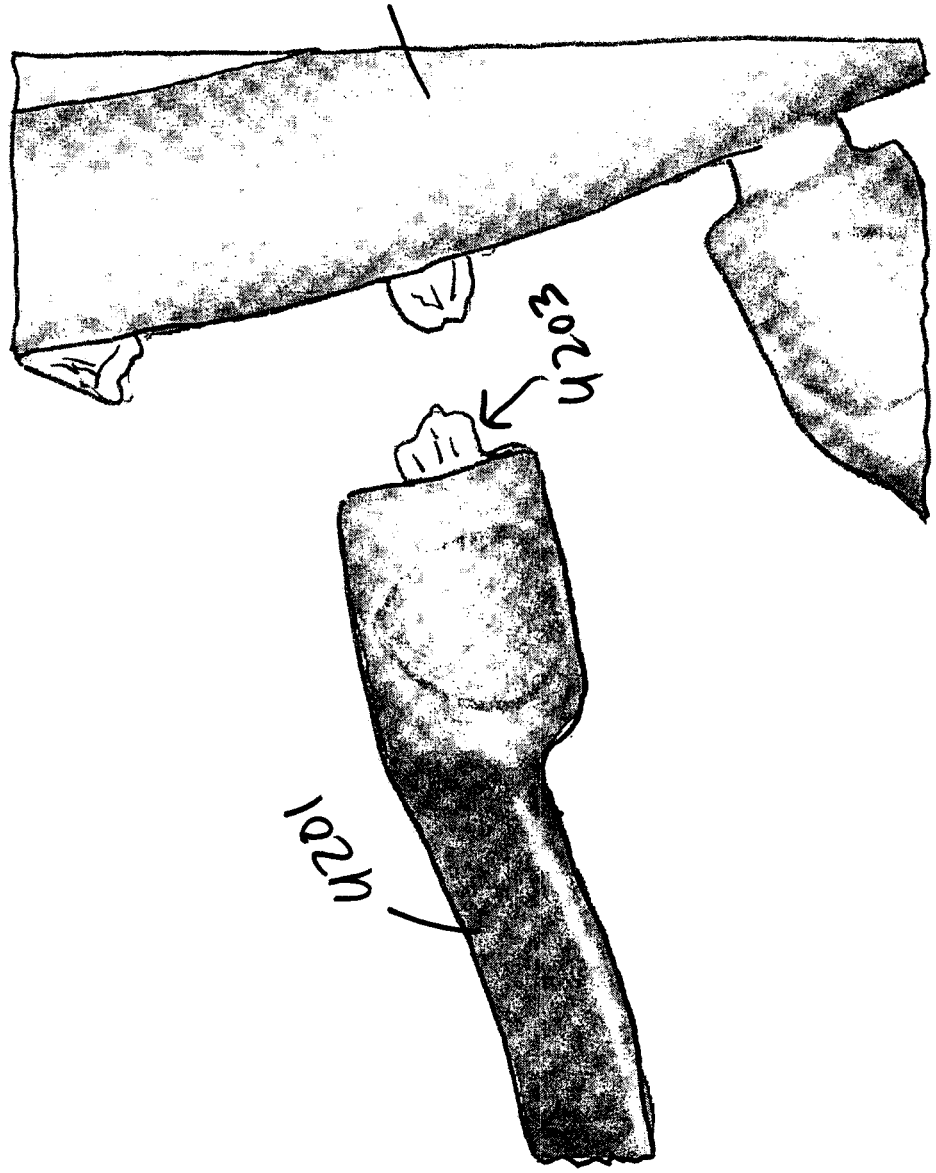
FIG. 42 shows a traditional prior art dental wedge breaking free from a "runner" area of an injection mold that feeds resin to the wedge, and the resultant vestige of extra resin on the end of the wedge.
Figure 43:
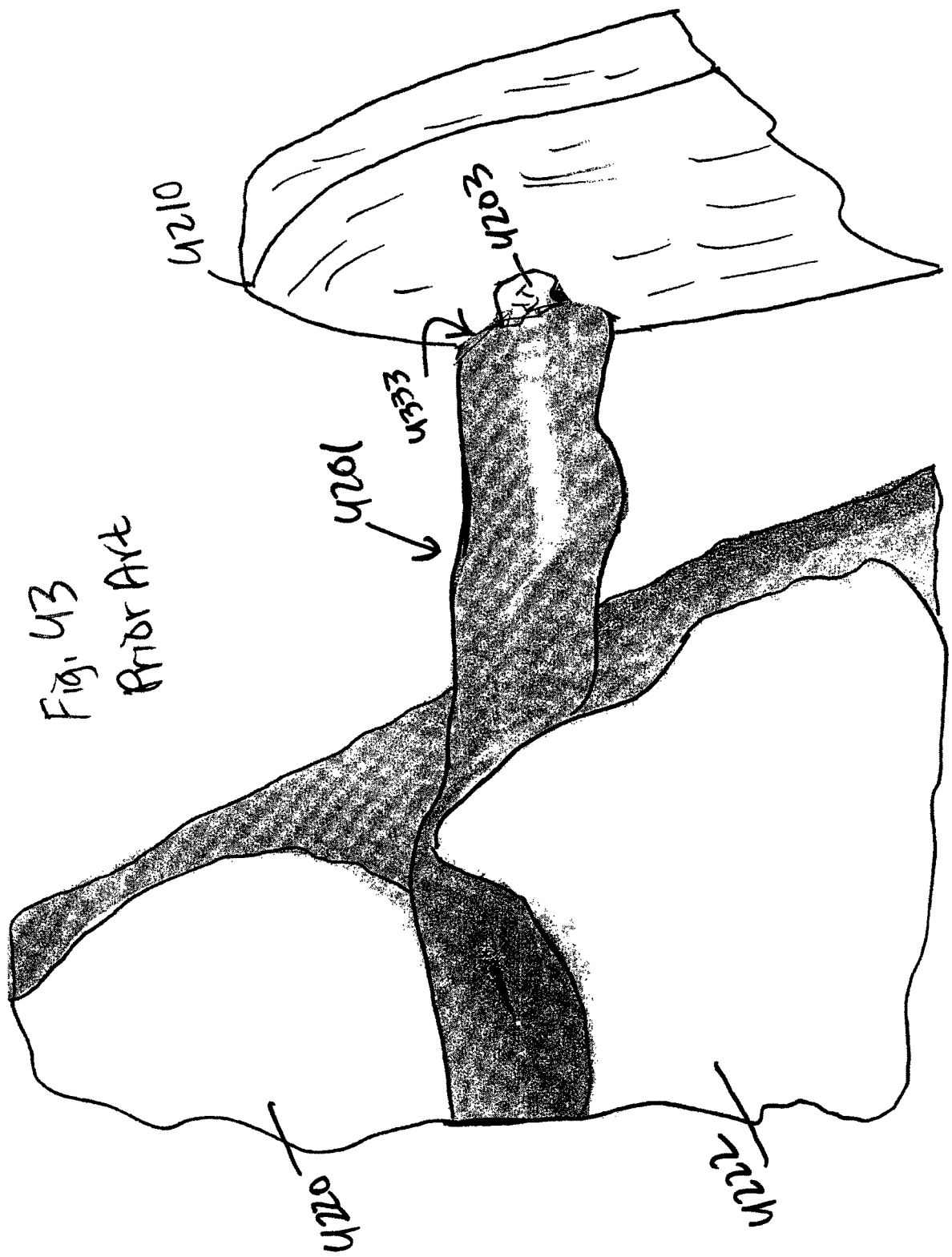
FIG. 43 shows final pressure to seat the dental wedge of FIG. 42 with the larger flat handle of the pliers that were rotated 180 degrees in the hand of the dentist after the wedge was initially inserted but needed significantly more pressure to be driven completely between the teeth (simultaneously spreading the teeth apart).

FIG. 42 shows a prior art dental wedge 4201 breaking free from a "runner" area 4202 of an injection mold that feeds resin to the wedge 4201, and the resultant vestige 4203 of extra resin on the end of the wedge 4201. FIG. 43 shows final pressure to seat the prior art dental wedge 4201 of FIG. 42 with the larger flat handle of the pliers 4210 that were rotated 180 degrees in the hand of the dentist after the wedge was initially inserted but needed significantly more pressure to be driven completely between the teeth 4220, 4222 (simultaneously spreading the teeth apart). The vestige 4203 makes it difficult to apply pressure from the pliers 4210 to the end surface 4333 of the wedge as the pliers 4210 can slip off the vestige.

Figure 44:
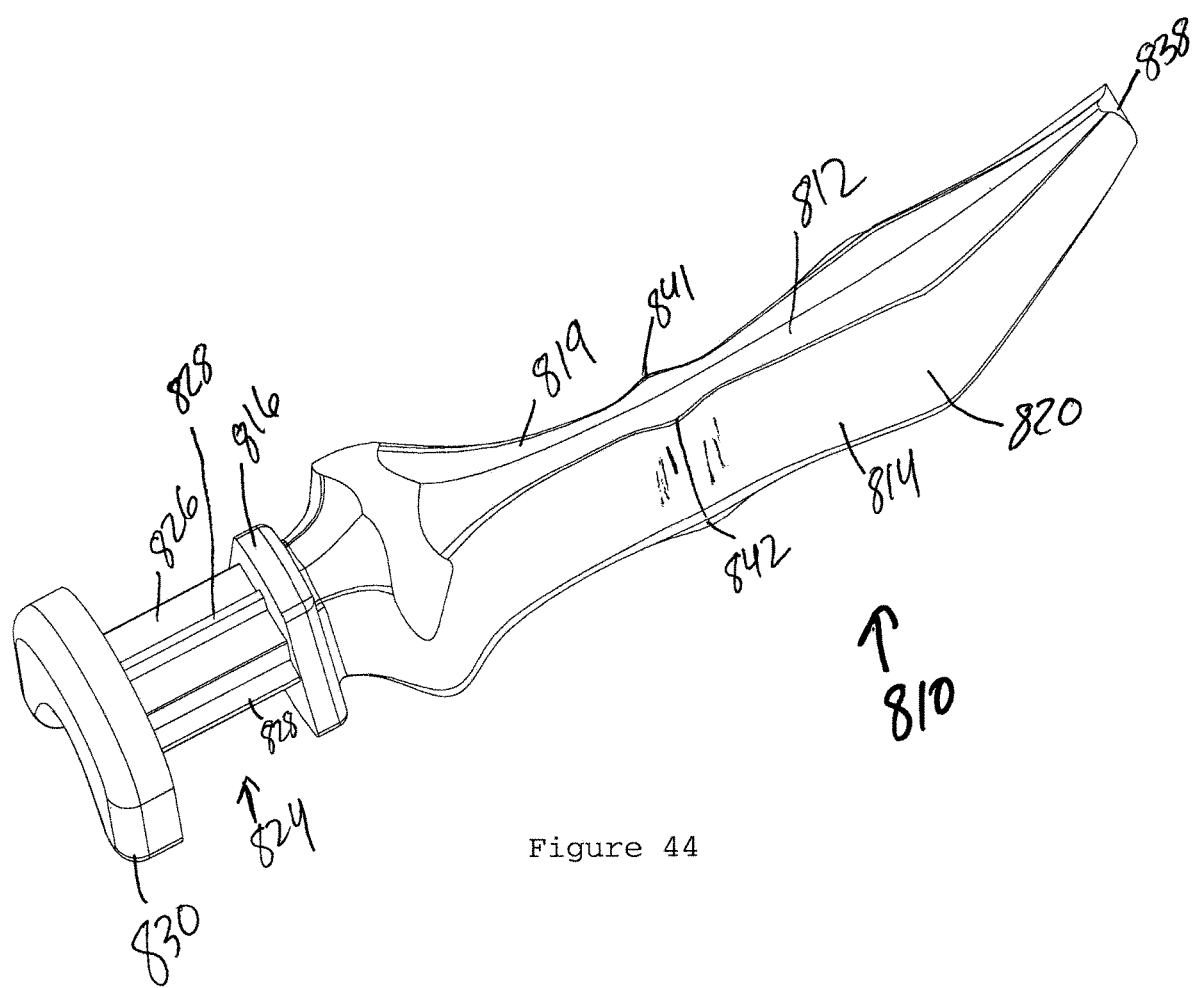
FIG. 44 is a top, right perspective view of an eighth embodiment of a dental wedge according to the invention.
Figure 45:
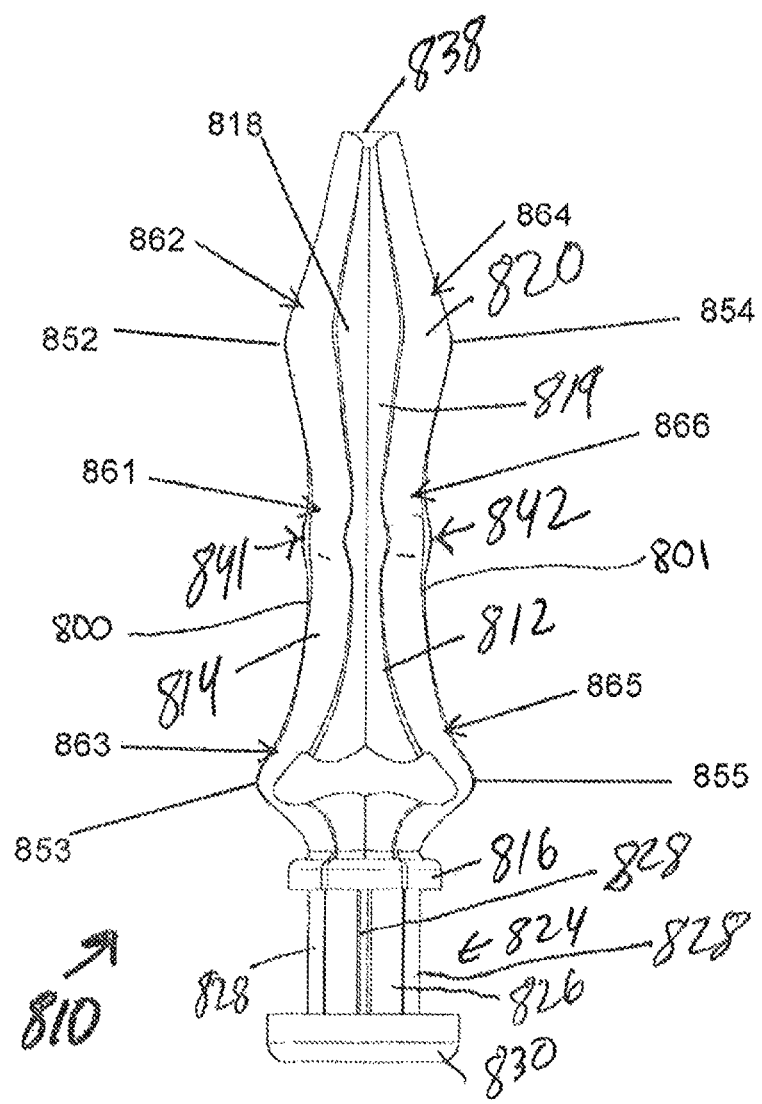
FIG. 45 is a top view of the dental wedge of FIG. 44.
Figure 46:
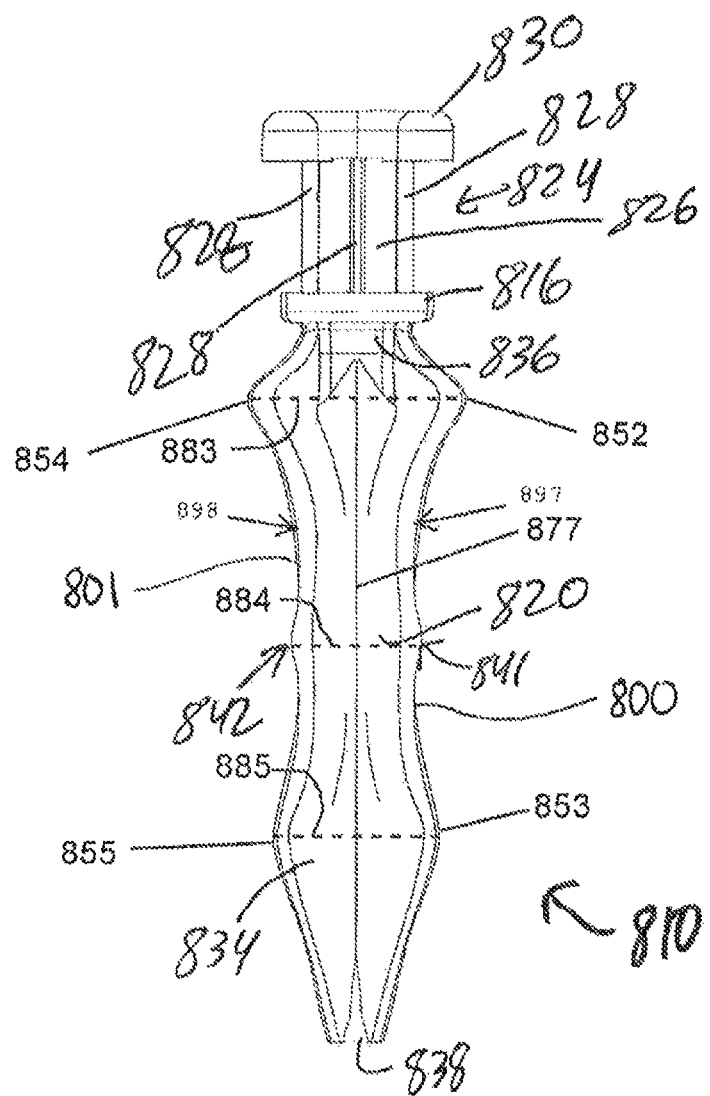
FIG. 46 is a bottom view of the dental wedge of FIG. 44.

FIGS. 44 to 46 show an eighth embodiment of a dental wedge 810 according to the invention. The furca is the area where a tooth root divides. A furcal concavity is a depression naturally present in the furcation area of the root of a tooth. The inward dimension of the furcal concavity is larger closer to the apex of the root. However, the concavity is also present near the crown. The inward dimension of the furcal concavity may also be larger from inward decay due to the age of the patient. The dental wedge 810 includes features that allow the wedge 810 to seat more precisely within the furcation area of the tooth.

The dental wedge 810 includes a central longitudinal body 820 that extends from a land area 816 to a distal tip 838. The body 820 is located below the top surface 819. The body 820 has a top section 812 and a bottom section 814. The body 820 has a longitudinal intermediate wall 818 at the top surface 819, a longitudinal first side wall 897 connected to the intermediate wall, and a longitudinal second side wall 898 connected to the intermediate wall. Extending away from the first vertical land area 816 is a first grasping section 824 having a base 826 and splines 828 that extend outwardly from the base 826. The splines 828 are generally plate-like but can also have other shapes. Extending away from the first grasping section 824 opposite the first vertical land area 816 is a generally U-shaped second vertical land 830. The wedge 810 has a generally arcuate bottom surface 834 that extends from an outer end 836 to the paper thin collapsing inner end distal tip 838.

In order to seat the wedge 810 more precisely within the furcation area of the tooth, the wedge 810 includes first and sixth central outward protrusions 841, 842 on opposite sides of the wedge 810. The convexity of the protrusions 841, 842 provide contact with a tooth surface that may have inward furcation and/or fluting from decay due to the age of the patient. The protrusions 841, 842 can extend from the top section 812 to the bottom section 814 of the wedge 810. The protrusions 841, 842 can be located at the centerpoint of the body 820, or in the intermediate section of the body 820 adjacent the centerpoint. Looking at FIGS. 45 and 46, the wedge 810 also includes second and fourth outward protrusions 852, 854 on opposite sides of the wedge 810, and third and fifth outward protrusions 853, 855 on opposite sides of the wedge 810. First outward protrusion 841 is located at a first part 861 of the top surface 819 of the wedge 810. Second outward protrusion 852 is located at a second part 862 of the top surface 819 of the wedge 810. Third outward protrusion 853 is located at a third part 863 of the top surface 819 of the wedge 810. Fourth outward protrusion 854 is located at a fourth part 864 of the top surface 819 of the wedge 810. Fifth outward protrusion 855 is located at a fifth part 865 of the top surface 819 of the wedge 810. Sixth outward protrusion 842 is located at a sixth part 866 of the top surface 819 of the wedge 810. Lateral edges 800 and 801 run from the outer end 836 to the inner end distal tip 838.

Inner end serrations 71 of a cotton pliers 73 can engage the splines 828 of the first grasping section 824 of the dental wedge 810 in a similar manner as shown in FIG. 15. Similar to FIG. 16, the dental wedge 810 can press a clear sectional dental matrix 81 against gingiva 82 and a tooth 83 being restored so that the matrix 81 seals the tooth 83 and keeps the filling material inside of the desired space with the wedge 810 separating adjacent teeth 83, 85 so that when the matrix 81 is removed after placing and hardening the filling material, the gap that is formed when the matrix 81 is removed is mitigated as the teeth 83, 85 "spring" back together and close the gap that was present when the matrix 81 was removed. The wedge 810 is inserted between the teeth 83, 85 with the collapsing distal tip 838 being inserted first while grasping the first grasping section 424 with the cotton pliers 73.

Various polymeric materials can be used to mold the dental wedge 810. The wedge 810 can molded from a polymeric material that forms an opaque body. "Opaque" means the polymeric material transmits very little light, and therefore reflects, scatters, or absorbs most of it. Non-limiting examples of polymeric materials for forming the wedge 810 include polyoxymethylene (e.g., Delrin® with a modulus of about 3,000 MPa).

Figure 47:
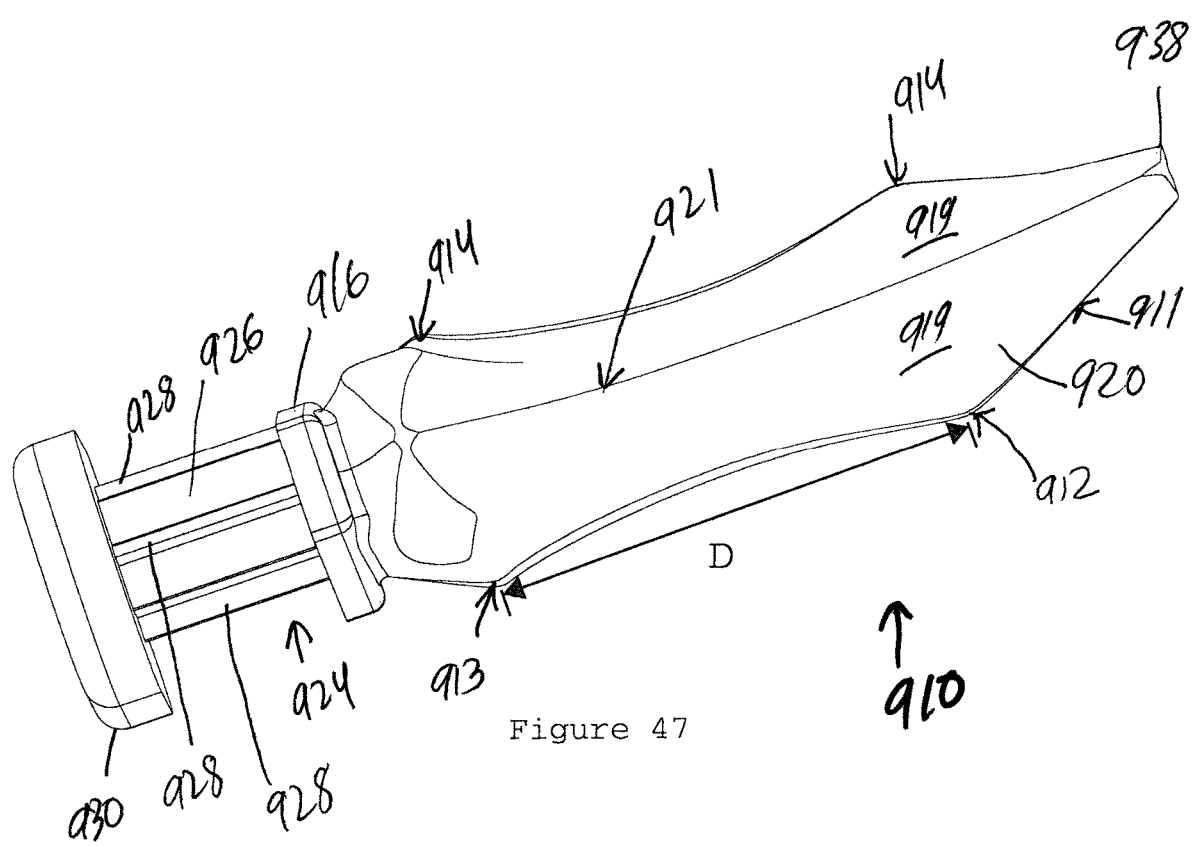
FIG. 47 is a top, right perspective view of a ninth embodiment of a dental wedge according to the invention.
Figure 48:
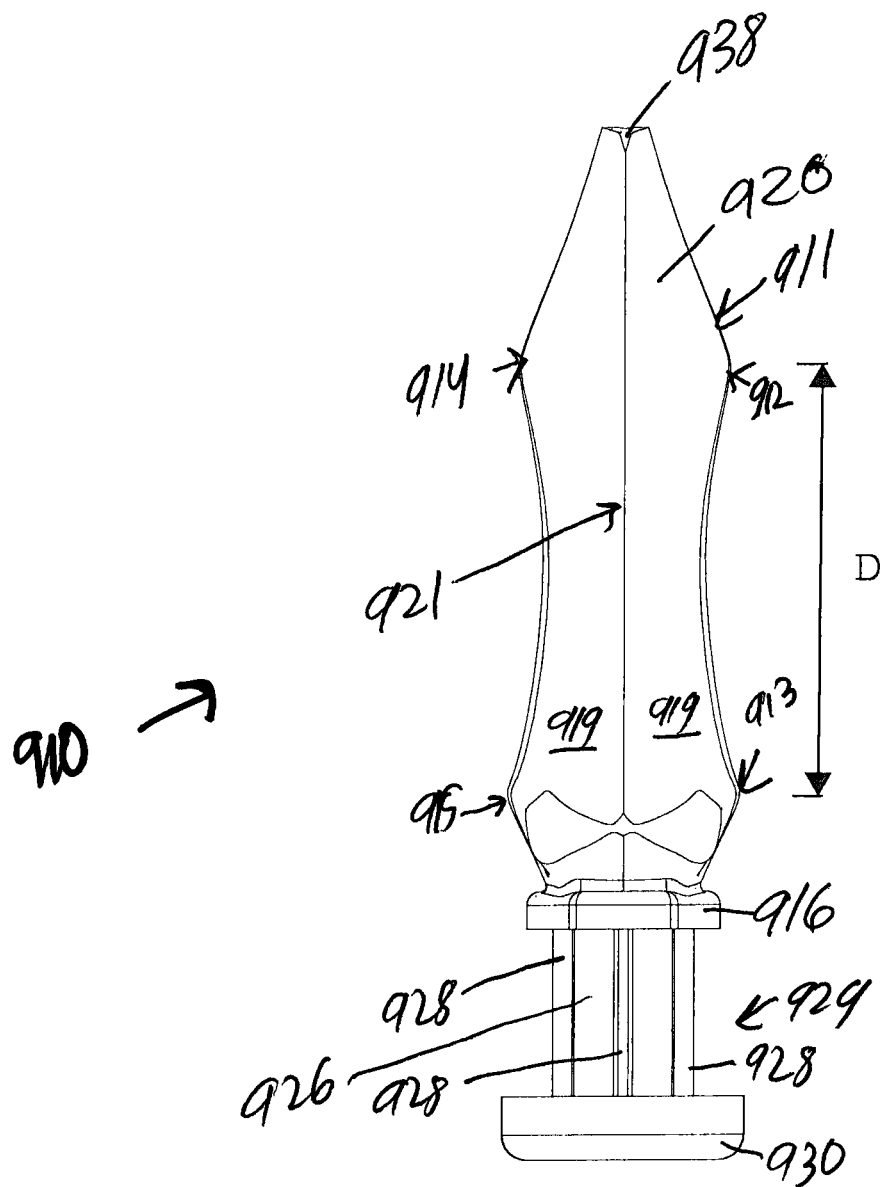
FIG. 48 is a top view of the dental wedge of FIG. 47.

FIGS. 47 to 48 show a ninth embodiment of a dental wedge 910 according to the invention. The dental wedge 910 includes a central longitudinal body 920 that extends from a land area 916 to a distal tip 938. The lower edge 911 of the body 920 defines protruding regions 912, 913, 914, 915. Extending away from the first vertical land area 916 is a first grasping section 924 having a base 926 and splines 928 that extend outwardly from the base 926. The splines 928 are generally plate-like but can also have other shapes. Extending away from the first grasping section 924 opposite the first vertical land area 916 is a generally U-shaped second vertical land 930. The wedge 910 has a generally arcuate bottom surface.

In order to seat the wedge 910 more precisely between anterior teeth and bicuspids, the wedge 910 has a dimension D between protruding regions 912, 913 and between protruding regions 914, 915 of about 2 to about 8 millimeters, or about 3 to about 7 millimeters, or about 4 to about 6 millimeters, or about 5 millimeters. In contrast, this dimension can be about 7.5-8.0 millimeters for a wedge used between molars. Also, the top surface 919 of the wedge 910 can include a single pitch on each side of a top ridge 921.

Inner end serrations 71 of a cotton pliers 73 can engage the splines 928 of the first grasping section 924 of the dental wedge 910 in a similar manner as shown in FIG. 15. Similar to FIG. 16, the dental wedge 910 can press a clear sectional dental matrix 81 against gingiva 82 and a tooth 83 being restored so that the matrix 81 seals the tooth 83 and keeps the filling material inside of the desired space with the wedge 910 separating adjacent teeth 83, 85 so that when the matrix 81 is removed after placing and hardening the filling material, the gap that is formed when the matrix 81 is removed is mitigated as the teeth 83, 85 "spring" back together and close the gap that was present when the matrix 81 was removed. The wedge 910 is inserted between the teeth 83, 85 with the collapsing distal tip 938 being inserted first while grasping the first grasping section 424 with the cotton pliers 73.

Various polymeric materials can be used to mold the dental wedge 910. The wedge 810 can molded from a polymeric material that forms an opaque body. "Opaque" means the polymeric material transmits very little light, and therefore reflects, scatters, or absorbs most of it. Non-limiting examples of polymeric materials for forming the wedge 910 include polyoxymethylene (e.g., Delrin® with a modulus of about 3,000 MPa).

Figure 49:
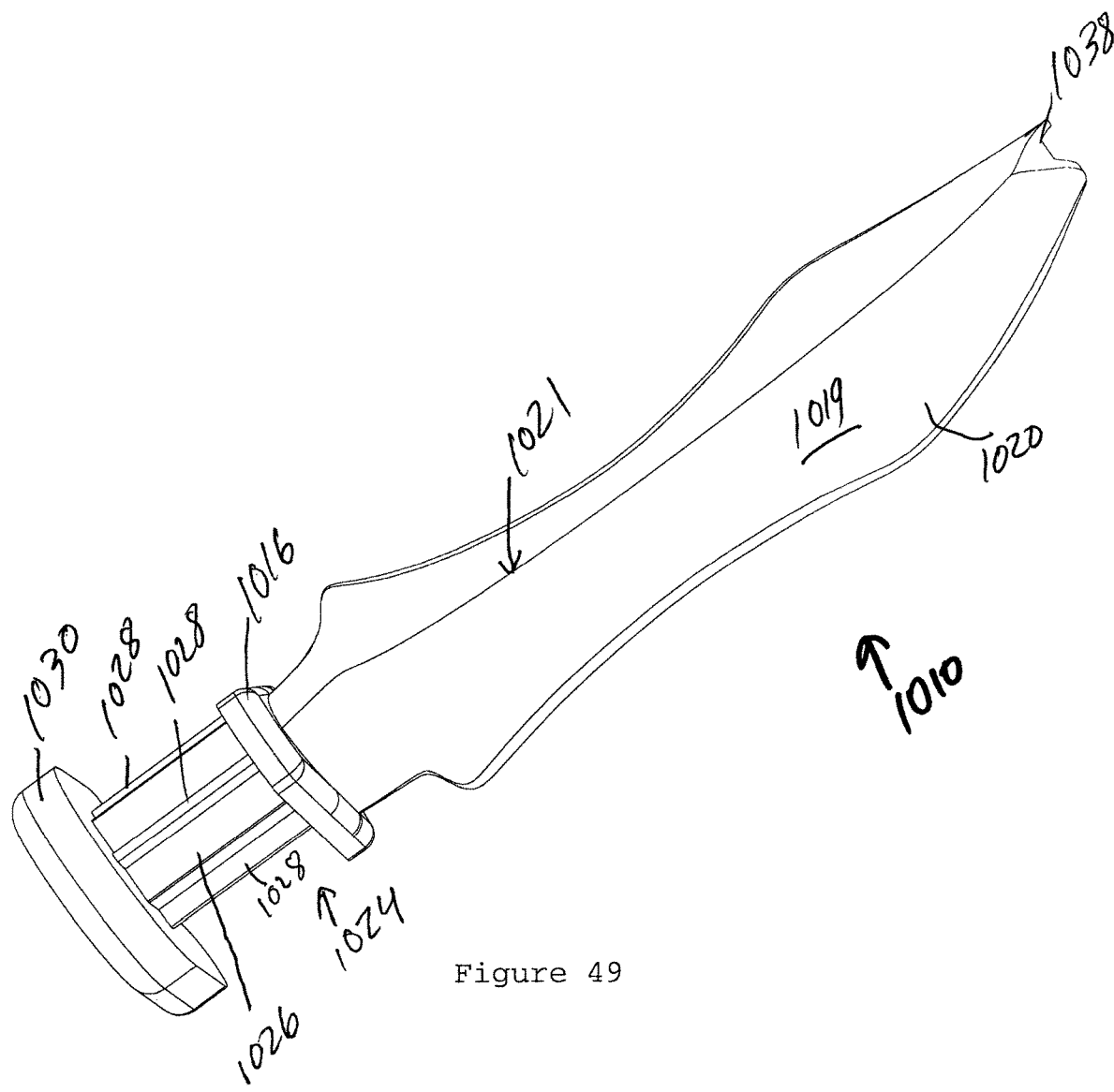
FIG. 49 is a top, right perspective view of a tenth embodiment of a dental wedge according to the invention.
Figure 50:
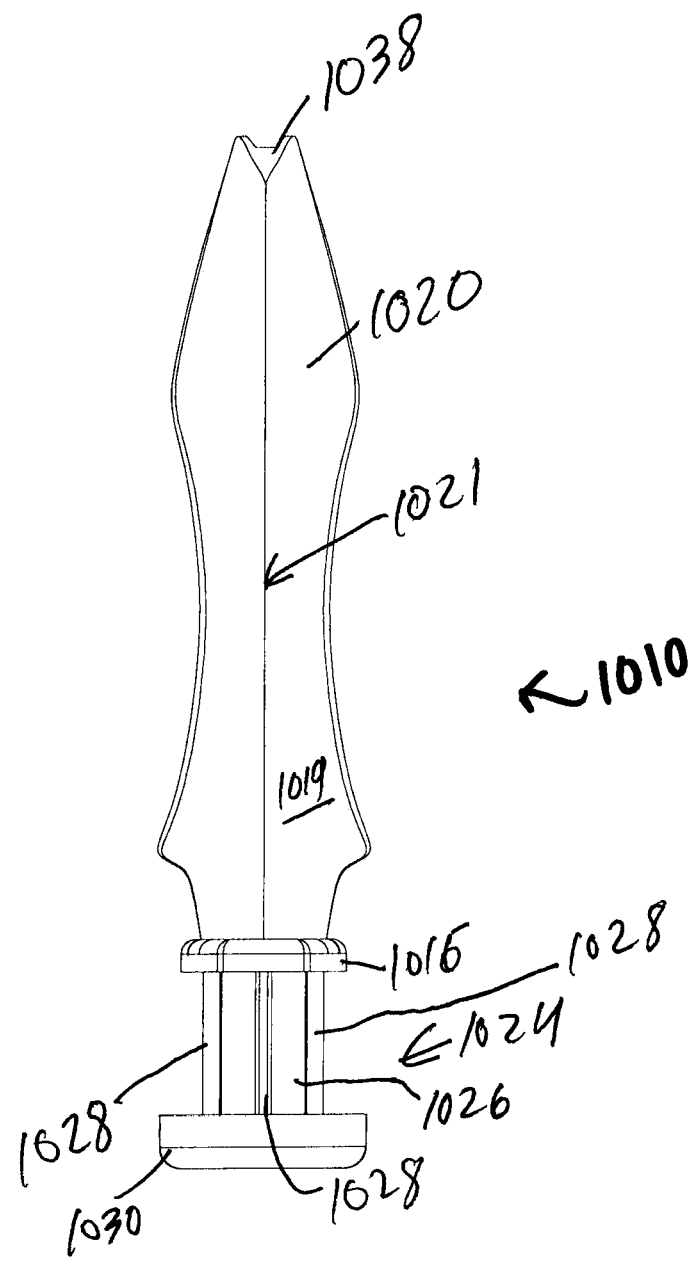
FIG. 50 is a top view of the dental wedge of FIG. 49.
Figure 51:
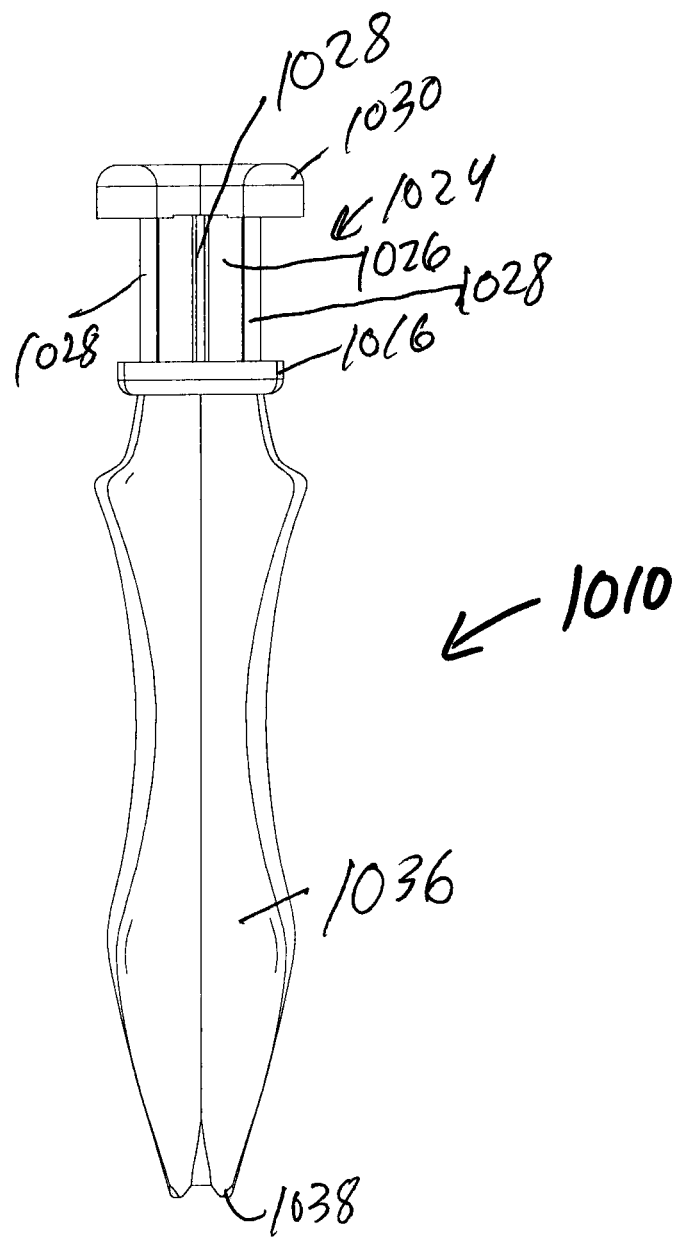
FIG. 51 is a bottom view of the dental wedge of FIG. 50.

FIGS. 49 to 51 show a tenth embodiment of a dental wedge 1010 according to the invention. The dental wedge 1010 includes a central longitudinal body 1020 that extends from a land area 1016 to a distal tip 1038. Extending away from the first vertical land area 1016 is a first grasping section 1024 having a base 1026 and splines 1028 that extend outwardly from the base 1026. The splines 1028 are generally plate-like but can also have other shapes. Extending away from the first grasping section 1024 opposite the first vertical land area 1016 is a generally U-shaped second land 1030. The wedge 1010 has a generally arcuate bottom surface 1036. The top surface 1019 of the wedge 1010 can include a single pitch on each side of a top ridge 1021. The pitch on each side of the ridge 1021 is less steep and therefore, the wedge 1010 is quire advantageous for use with deep caries.

Inner end serrations 71 of a cotton pliers 73 can engage the splines 1028 of the first grasping section 1024 of the dental wedge 1010 in a similar manner as shown in FIG. 15. Similar to FIG. 16, the dental wedge 1010 can press a clear sectional dental matrix 81 against gingiva 82 and a tooth 83 being restored so that the matrix 81 seals the tooth 83 and keeps the filling material inside of the desired space with the wedge 1010 separating adjacent teeth 83, 85 so that when the matrix 81 is removed after placing and hardening the filling material, the gap that is formed when the matrix 81 is removed is mitigated as the teeth 83, 85 "spring" back together and close the gap that was present when the matrix 81 was removed. The wedge 1010 is inserted between the teeth 83, 85 with the collapsing distal tip 1038 being inserted first while grasping the first grasping section 424 with the cotton pliers 73.

Various polymeric materials can be used to mold the dental wedge 1010. The wedge 810 can molded from a polymeric material that forms an opaque body. "Opaque" means the polymeric material transmits very little light, and therefore reflects, scatters, or absorbs most of it. Non-limiting examples of polymeric materials for forming the wedge 1010 include polyoxymethylene (e.g., Delrin® with a modulus of about 3,000 MPa).

Thus, the invention provides an improved dental wedge that may be used in the restoration of a decayed portion of a tooth.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A dental wedge for creating space between adjacent teeth, the dental wedge comprising:
an elongated body extending from an outer end to an opposite inner end, the elongated body comprising a longitudinal intermediate wall, a longitudinal first side wall connected to the longitudinal intermediate wall, and a longitudinal second side wall connected to the longitudinal intermediate wall, the longitudinal first side wall and the longitudinal second side wall each flaring away from the longitudinal intermediate wall such that a first distal end of the longitudinal first side wall and a second distal end of the longitudinal second side wall are spaced apart creating an inverted generally V-shaped transverse section for the elongated body, the elongated body having a top surface formed by the longitudinal intermediate wall, the longitudinal first side wall and the longitudinal second side wall, the elongated body having a bottom surface formed by the longitudinal intermediate wall, the longitudinal first side wall and the longitudinal second side wall; and a grasping section connected to the outer end of the elongated body, wherein a hollow region is defined by the bottom surface and a first reference line extending from the first distal end of the longitudinal first side wall to the second distal end of the longitudinal second side wall, wherein a first part of the top surface of the longitudinal first side wall includes a first outwardly directed protrusion, wherein a second part of the top surface of the longitudinal first side wall includes a second outwardly directed protrusion, wherein a third part of the top surface of the longitudinal first side wall includes a third outwardly directed protrusion, wherein the second outwardly directed protrusion and the third outwardly directed protrusion are on opposite sides of the first outwardly directed protrusion, wherein the first outwardly directed protrusion and the second outwardly directed protrusion and the third outwardly directed protrusion are spaced apart such that the first outwardly directed protrusion contacts an inward furcation of one of the adjacent teeth when the wedge is seated between the adjacent teeth, wherein a lateral edge running from the outer end of the elongated body to the inner end of the elongated body flares outwardly from a central longitudinal reference line of the longitudinal intermediate wall at the outer end of the elongated body and then inward towards the reference line defining the third outwardly directed protrusion, flares outwardly from the reference line and then inward towards the reference line defining the first outwardly directed protrusion, and flares outwardly from the reference line and then inward towards the reference line at the inner end of the elongated body defining the second outwardly directed protrusion, wherein the second and the third outwardly directed protrusions both flare farther outwardly from the reference line than the first outwardly directed protrusion, wherein the grasping section includes a first vertical land connected to the outer end of the elongated body, a second vertical land spaced apart from the first vertical land, and an intermediate section connected to the first vertical land and the second vertical land, and wherein the grasping section includes splines that are dimensioned to engage serrations of a dental pliers, the splines extending outwardly from a surface of the intermediate section of the grasping section.

2. The dental wedge of claim 1 wherein:
the first part of the top surface is located intermediate the outer end and the inner end of the elongated body.

3. The dental wedge of claim 1 wherein:
the inner end comprises a blunt collapsing distal tip.

4. The dental wedge of claim 1 wherein:
a fourth part of the top surface of the longitudinal second side wall includes a fourth outwardly directed protrusion.

5. The dental wedge of claim 4 wherein:
a fifth part of the top surface of the longitudinal second side wall includes a fifth outwardly directed protrusion.

6. The dental wedge of claim 5 wherein:
a sixth part of the top surface of the longitudinal second side wall includes a sixth outwardly directed protrusion.

7. The dental wedge of claim 6 wherein:
the fourth outwardly directed protrusion and the fifth outwardly directed protrusion are on opposite sides of the sixth outwardly directed protrusion.

8. The dental wedge of claim 7 wherein:
the fourth outwardly directed protrusion and the fifth outwardly directed protrusion and the sixth outwardly directed protrusion are spaced apart such that the sixth outwardly directed protrusion contacts an inward furcation of the other of the adjacent teeth when the wedge is seated between the adjacent teeth.

9. The dental wedge of claim 1 wherein:
a radius of the second vertical land is greater than a radius of the first vertical land.

10. The dental wedge of claim 9 wherein:
the splines have a generally plate-like shape.

11. The dental wedge of claim 9 wherein:
the first vertical land has a generally triangular shape.

12. The dental wedge of claim 9 wherein:
the first vertical land has an outer perimeter that is spaced outward from the top surface of the elongated body.

13. The dental wedge of claim 9 wherein:
the intermediate section has an outer perimeter that is spaced inward from an outer perimeter of the first vertical land and an outer perimeter of the second vertical land.

14. The dental wedge of claim 1 wherein:
a wedge width is defined by a first distance of the first reference line extending from the first distal end of the first side wall to the second distal end of the second side wall,
a wedge height is defined by a second distance between the first reference line and a second reference line tangent to a top edge of the top surface of the elongated body, and
the wedge width is greater than the wedge height.

15. The dental wedge of claim 1 wherein:
the first side wall and the second side wall have a thickness that varies from the inner end to the outer end of the wedge.

16. A dental wedge for creating space between adjacent teeth, the dental wedge comprising:
an elongated body extending from an outer end to an opposite inner end, the elongated body comprising a longitudinal intermediate wall, a longitudinal first side wall connected to the longitudinal intermediate wall, and a longitudinal second side wall connected to the longitudinal intermediate wall, the longitudinal first side wall and the longitudinal second side wall each flaring away from the longitudinal intermediate wall such that a first distal end of the longitudinal first side wall and a second distal end of the longitudinal second side wall are spaced apart creating an inverted generally V-shaped transverse section for the elongated body, the elongated body having a top surface formed by the longitudinal intermediate wall, the longitudinal first side wall and the longitudinal second side wall, the elongated body having a bottom surface formed by the longitudinal intermediate wall, the longitudinal first side wall and the longitudinal second side wall; and a grasping section connected to the outer end of the elongated body, the grasping section including a first vertical land connected to the outer end of the elongated body, a second vertical land spaced apart from the first vertical land, and an intermediate section connected to the first vertical land and the second vertical land, the grasping section including splines extending outwardly from a surface of the intermediate section of the grasping section, the splines being dimensioned to engage serrations of a dental pliers, wherein a hollow region is defined by the bottom surface and a first reference line extending from the first distal end of the longitudinal first side wall to the second distal end of the longitudinal second side wall, wherein a first part of the top surface of the longitudinal first side wall includes a first outwardly directed protrusion, and wherein a second part of the top surface of the longitudinal first side wall includes a second outwardly directed protrusion.

17. The dental wedge of claim 16 wherein: a third part of the top surface of the longitudinal first side wall includes a third outwardly directed protrusion, the first outwardly directed protrusion and the second outwardly directed protrusion are on opposite sides of the third outwardly directed protrusion, and the first outwardly directed protrusion and the second outwardly directed protrusion and the third outwardly directed protrusion are spaced apart such that the third outwardly directed protrusion contacts an inward furcation of one of the adjacent teeth when the wedge is seated between the adjacent teeth.

18. The dental wedge of claim 16 wherein:
the splines have a generally plate-like shape.

19. The dental wedge of claim 16 wherein:
a radius of the second vertical land is greater than a radius of the first vertical land.

* * * * *